United States Patent
Sasaki et al.

(10) Patent No.: US 6,259,585 B1
(45) Date of Patent: Jul. 10, 2001

(54) INVERTED HYBRID THIN FILM MAGNETIC HEAD AND METHOD OF MANUFACTURING THE SAME

(75) Inventors: Yoshitaka Sasaki, Yokohama; Makoto Yoshida, Saku; Nobuya Oyama, Saku; Tsutomu Koyanagi, Saku, all of (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/013,593

(22) Filed: Jan. 26, 1998

(30) Foreign Application Priority Data

| Jan. 25, 1997 | (JP) | 9-026175 |
| Jan. 25, 1997 | (JP) | 9-026176 |
| Oct. 21, 1997 | (JP) | 9-288919 |

(51) Int. Cl.$^7$ ........................... G11B 5/39
(52) U.S. Cl. ........................... 360/317
(58) Field of Search ........................... 360/113, 126, 360/317

(56) References Cited

U.S. PATENT DOCUMENTS

| 3,908,194 | 9/1975 | Romankiw | 360/113 |
| 4,928,195 | 5/1990 | Ezaki et al. | 360/103 |
| 5,640,753 | 6/1997 | Schultz et al. | 29/603.08 |

FOREIGN PATENT DOCUMENTS

| 0 670 570 A2 | 9/1995 | (EP) . |
| 0 747 887 A2 | 11/1996 | (EP) . |
| 0 752 700 A2 | 1/1997 | (EP) . |
| 58-189818 | 11/1983 | (JP) . |
| 59-35088 | 8/1984 | (JP) . |
| 62-145527 | 6/1987 | (JP) . |
| 64-21713 | 1/1989 | (JP) . |
| 2-91807 | 3/1990 | (JP) . |
| 3-263603 | 11/1991 | (JP) . |
| 5-46943 | 2/1993 | (JP) . |
| 7-31362 | 7/1995 | (JP) . |

*Primary Examiner*—George J. Letscher
(74) *Attorney, Agent, or Firm*—Oliff & Berridge, PLC

(57) ABSTRACT

An inverted hybrid type thin film magnetic head including a substrate, an inductive recording element provided on the substrate and a magnetoresistive reading element provided on the inductive recording element. The inductive recording element having a first magnetic film provided on an inner surface of a recessed portion formed in the surface of the substrate and on the surface of the substrate to constitute a pole portion, a thin film coil formed within the recessed portion, a gap film formed on the pole portion of the first magnetic film and on an insulating film which supports and isolates coil turns, and a second magnetic film applied on the gap film and having a pole portion which is opposed to the pole portion of the first magnetic film via the gap film. The magnetoresistive reading element includes a magnetoresistive film formed within a shield gap film provided on the second magnetic film and a third magnetic film formed on the shield gap film. The pole portion of the second magnetic film is preferably formed by a protrusion projecting into a groove. A bonding pad electrically connected to one end of the thin film coil is provided on a side wall of a slider such that a center of the bonding pad situates within a pattern of the coil. Remaining bonding pads connected to the other end of the coil as well as to both ends of the magnetoresistive film are also provided on the side wall of the slider.

19 Claims, 75 Drawing Sheets

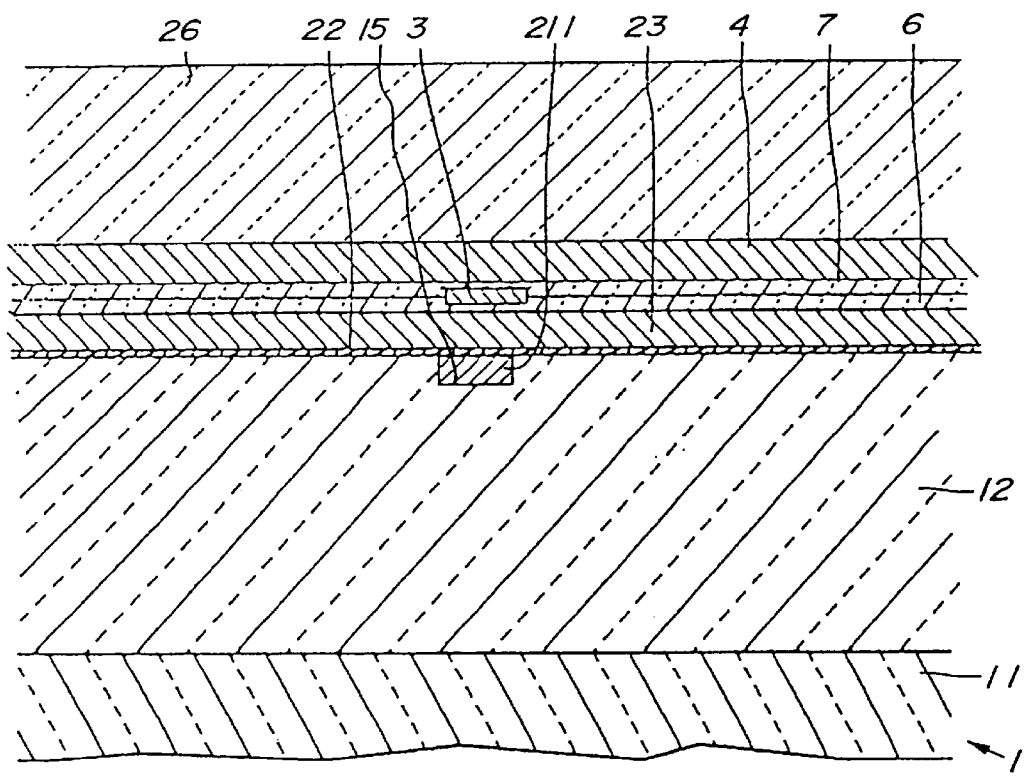

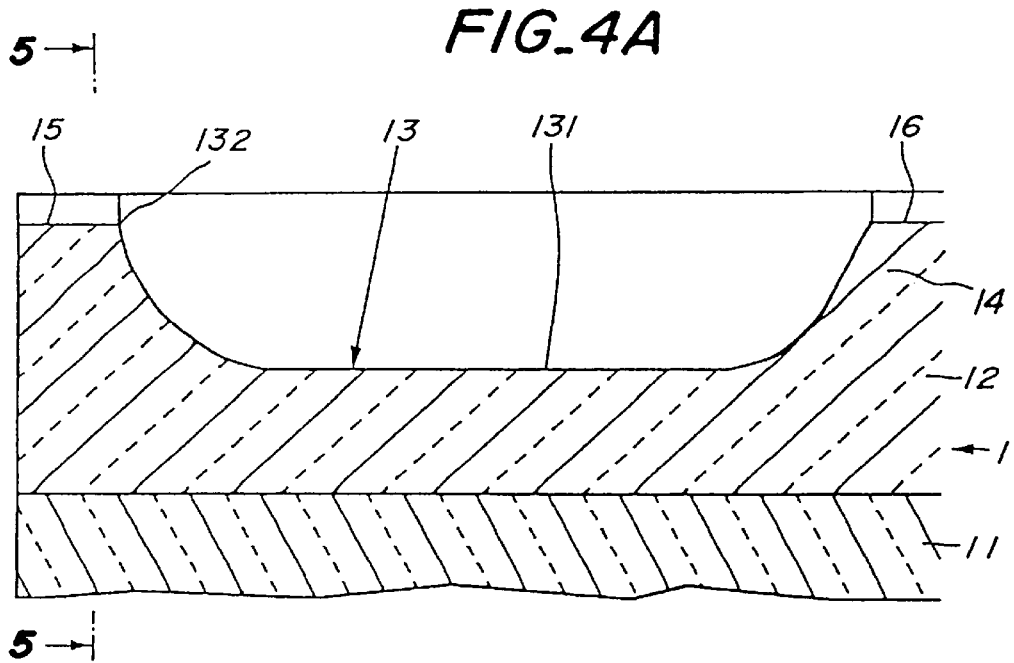
*FIG_4A*
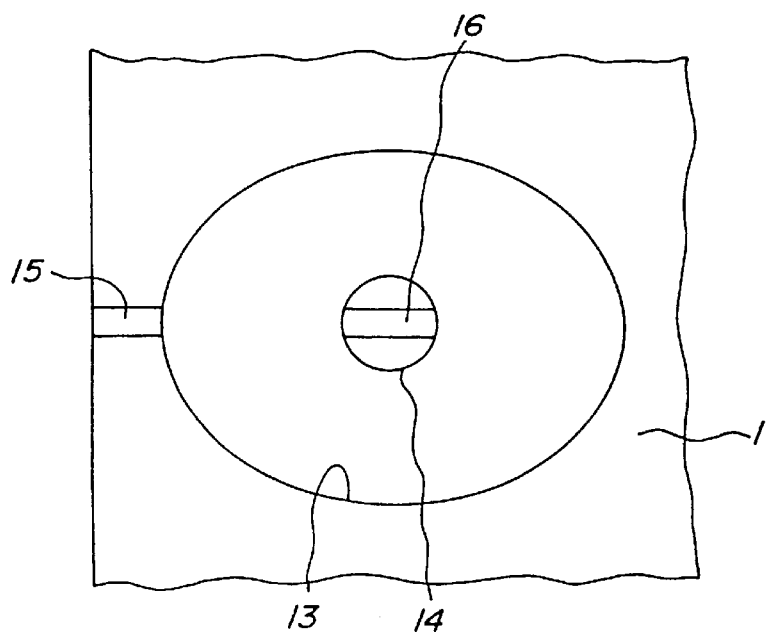
*FIG_4B*

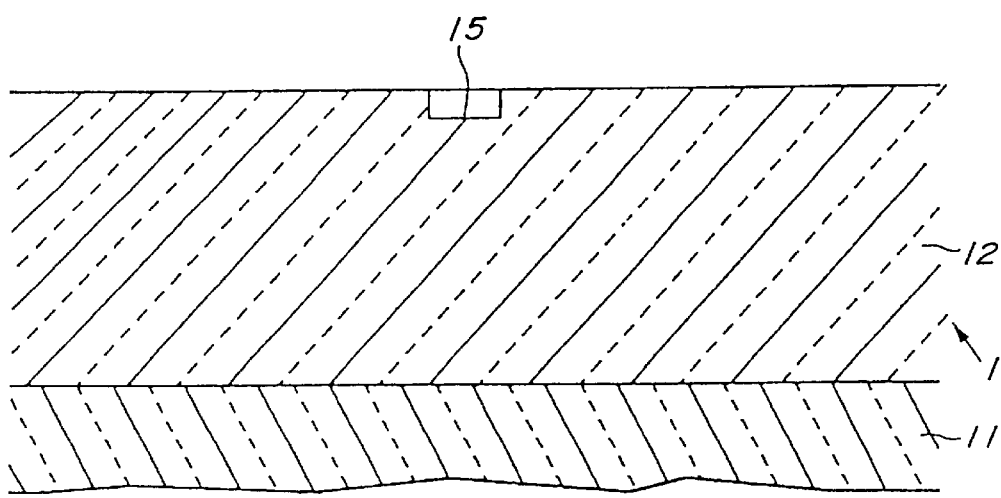
FIG_5

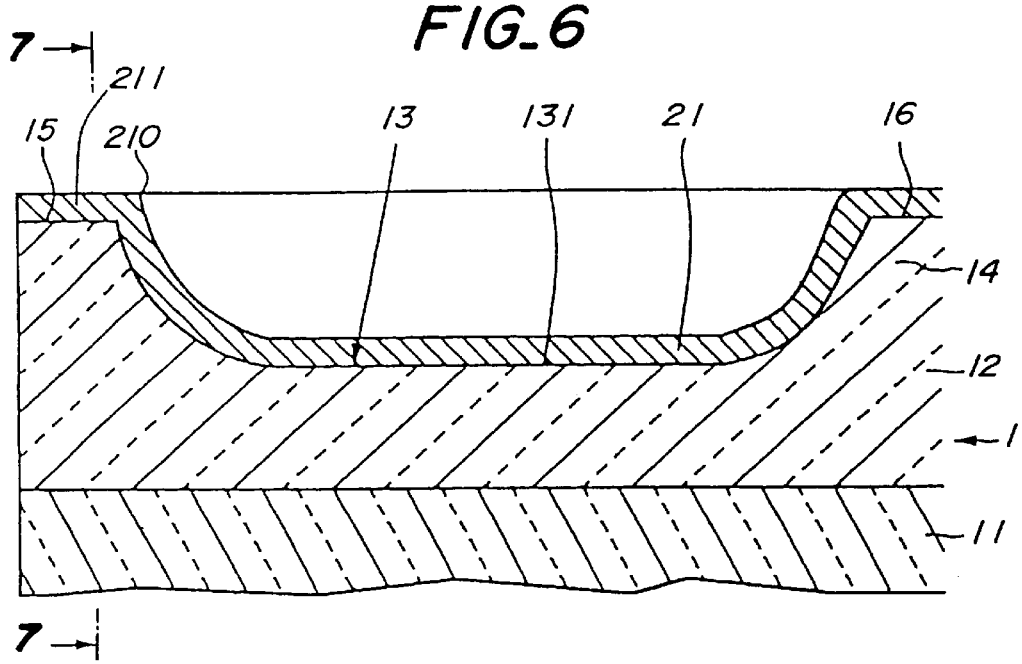
FIG_6
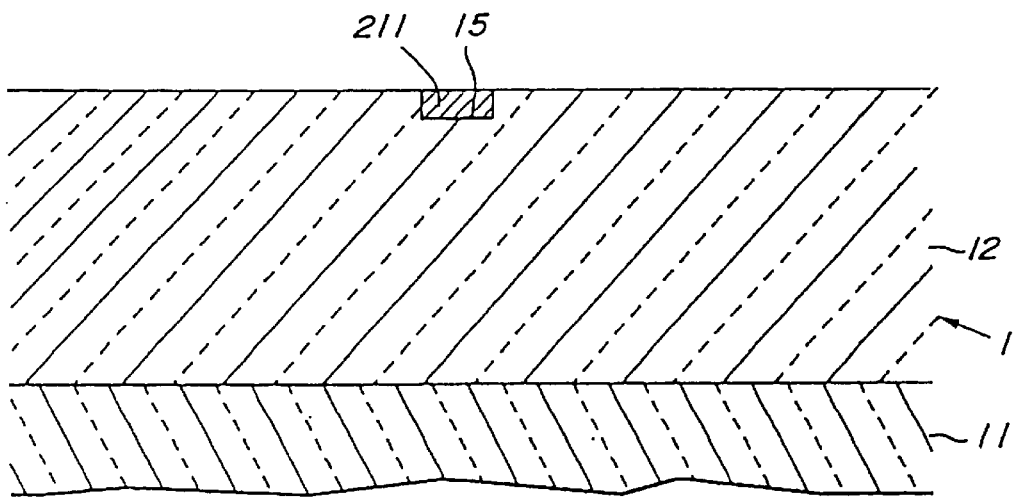
FIG_7

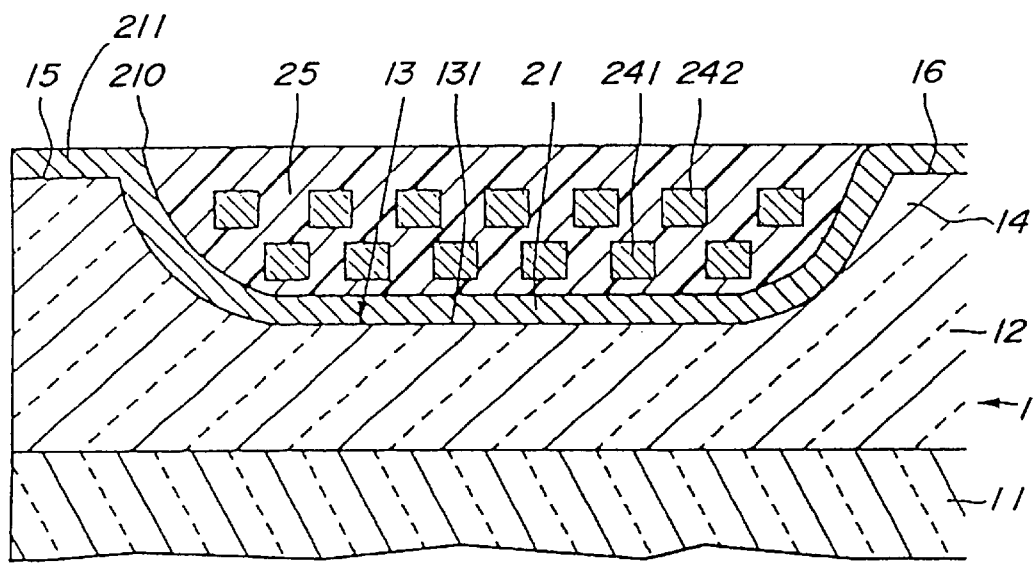
FIG_8

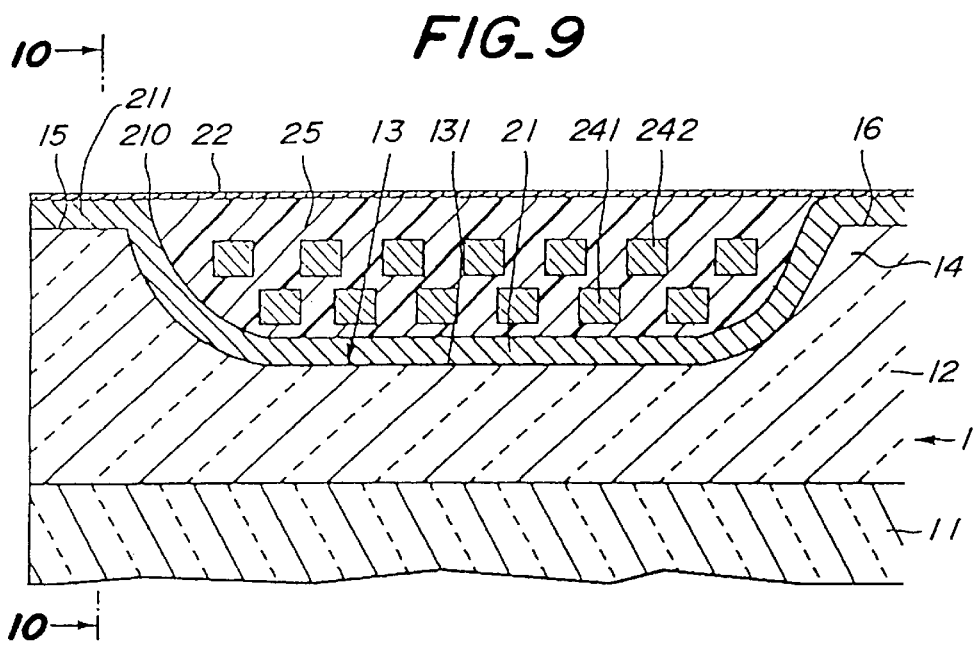
FIG_9
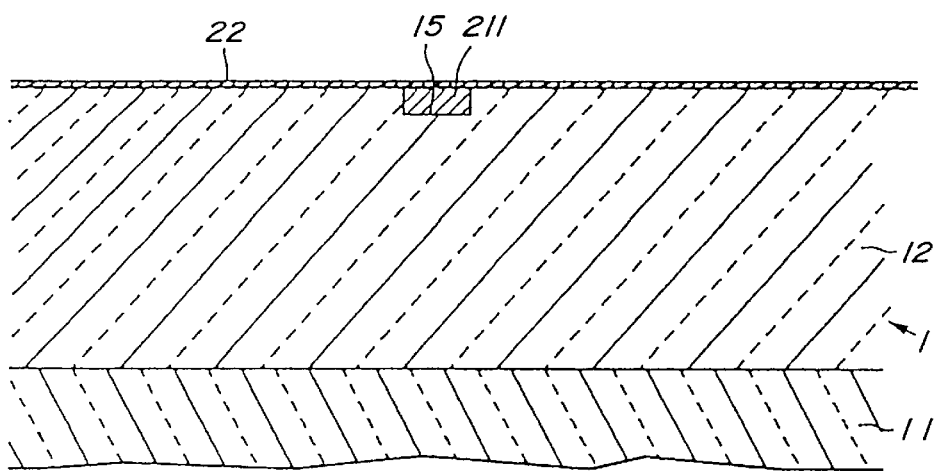
FIG_10

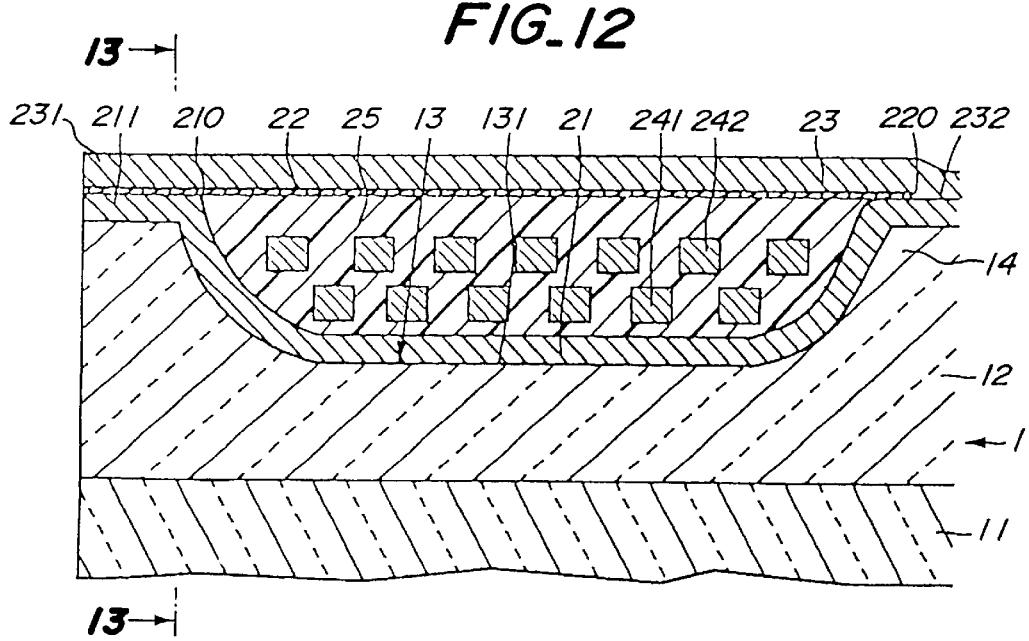
FIG_12
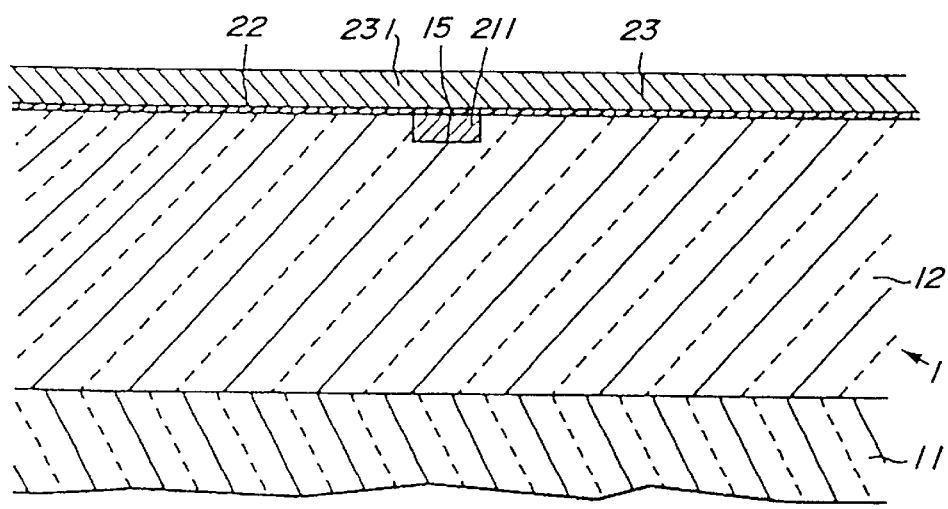
FIG_13

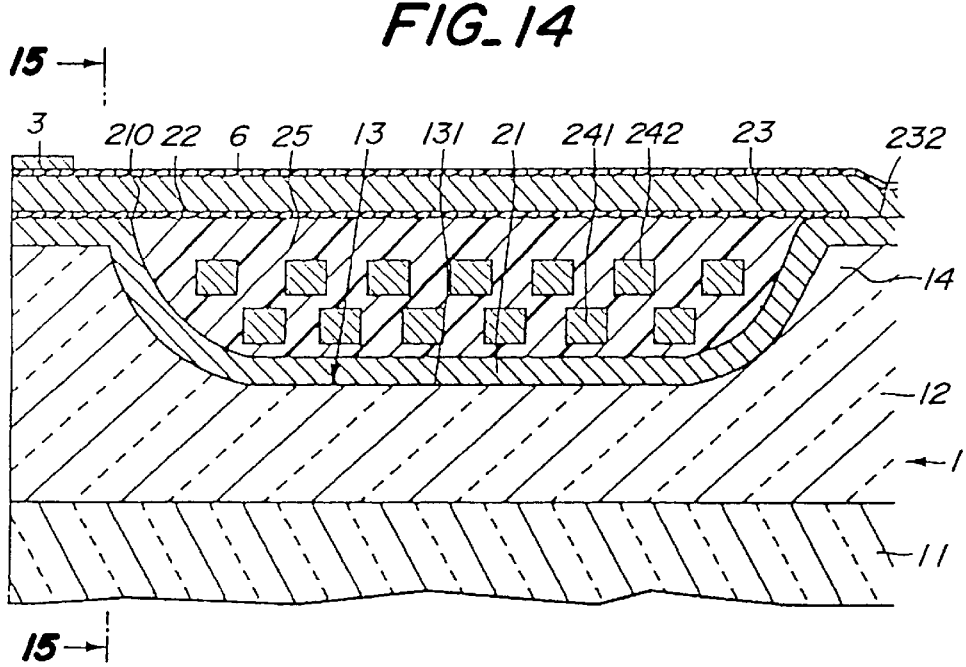
FIG_14
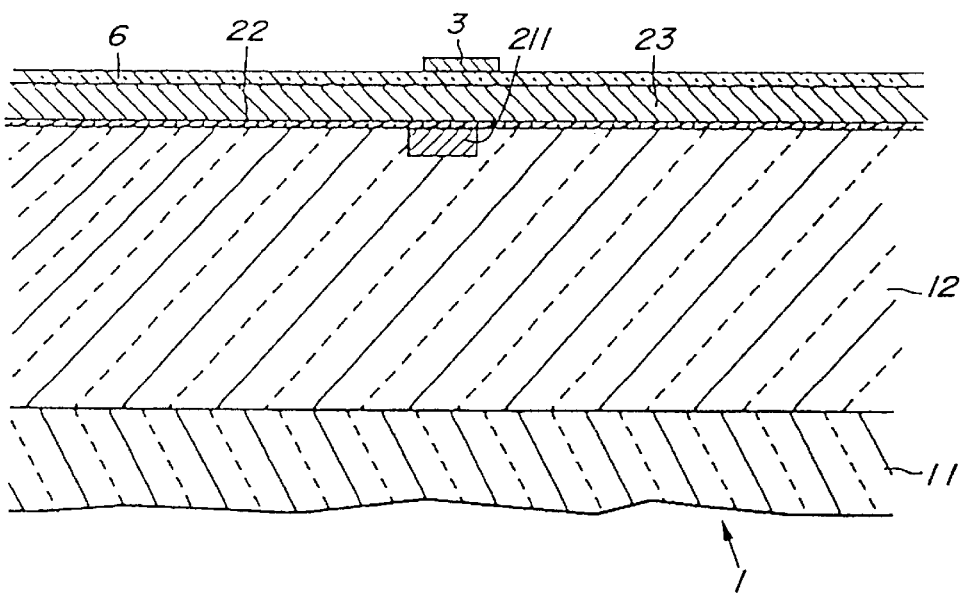
FIG_15

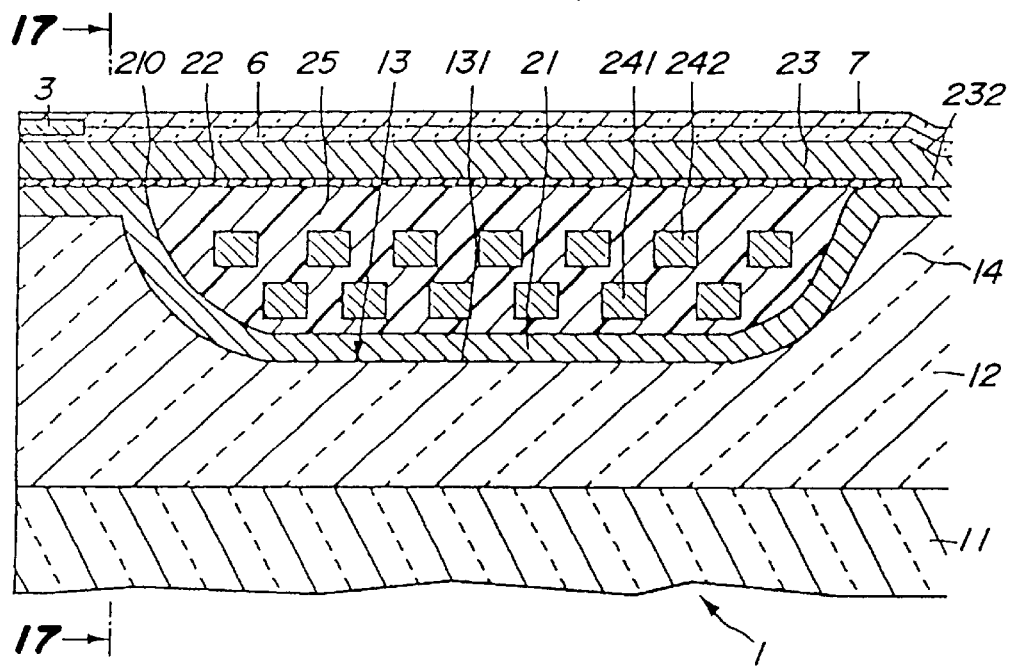
FIG_16
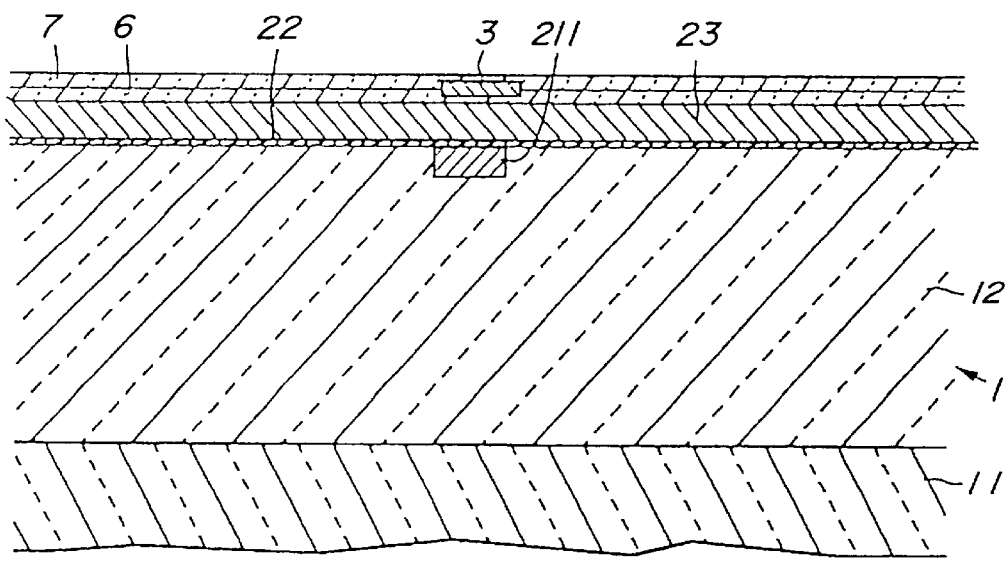
FIG_17

FIG_18
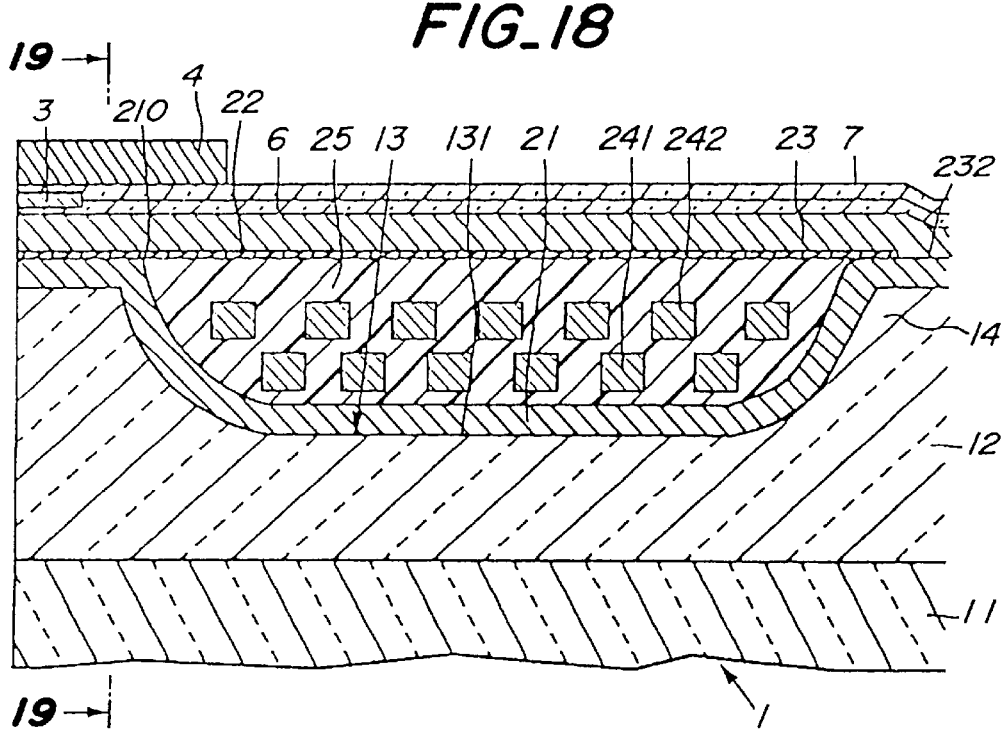
FIG_19
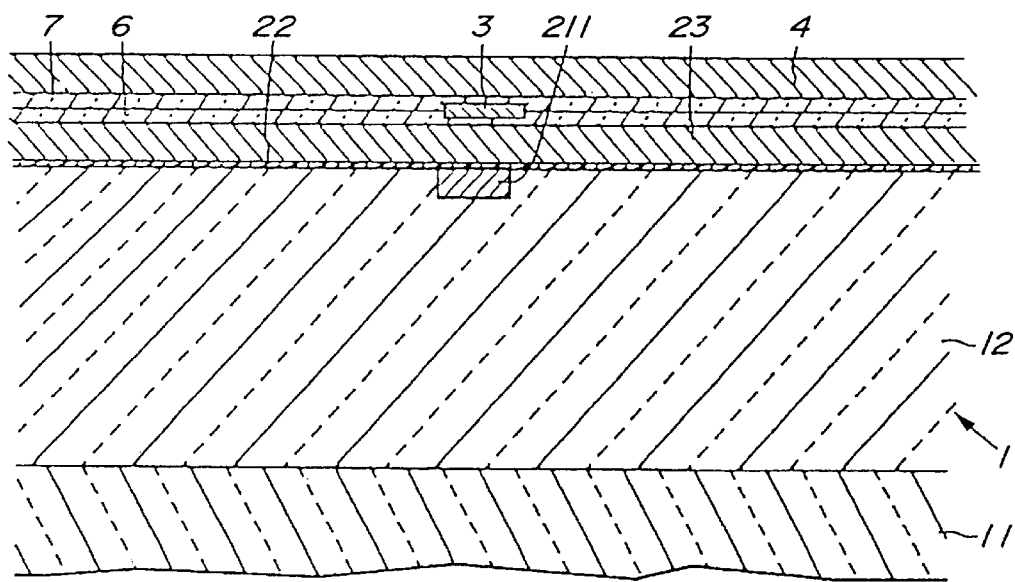

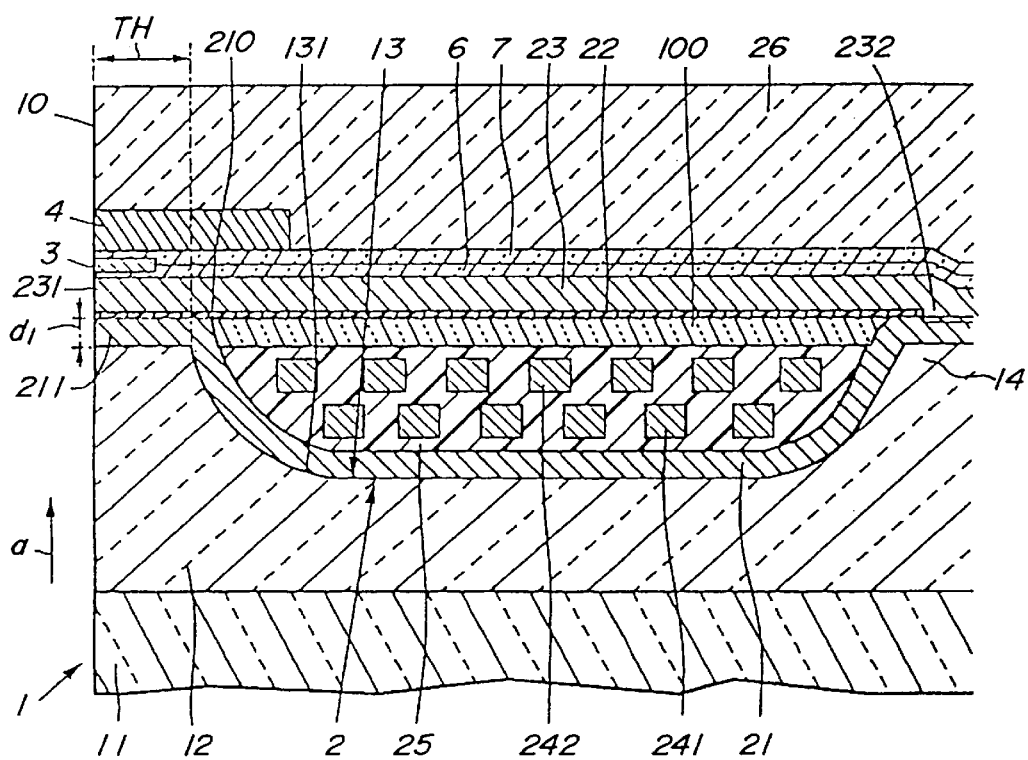
FIG_20

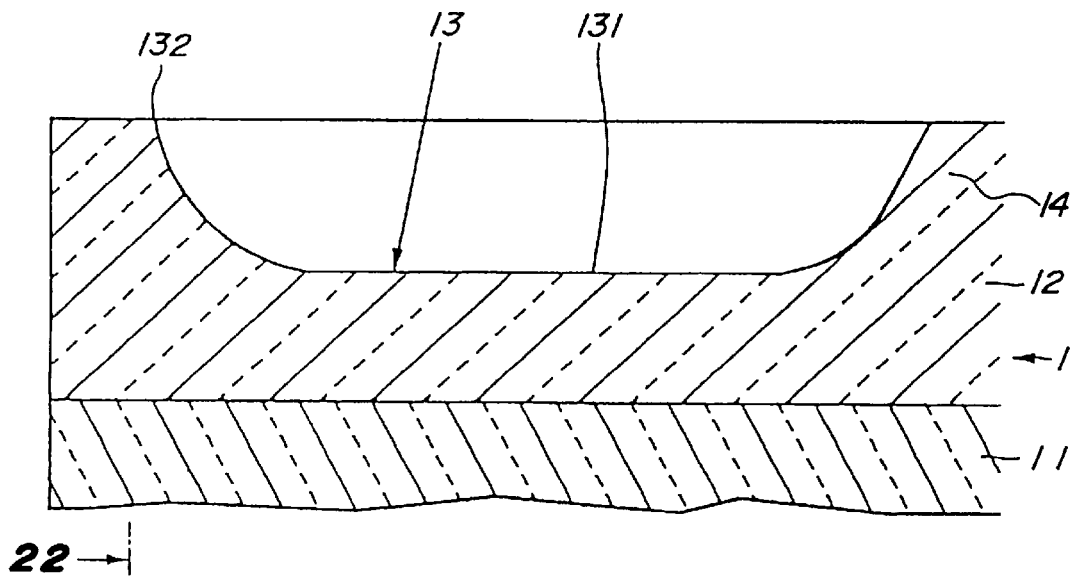
FIG_21
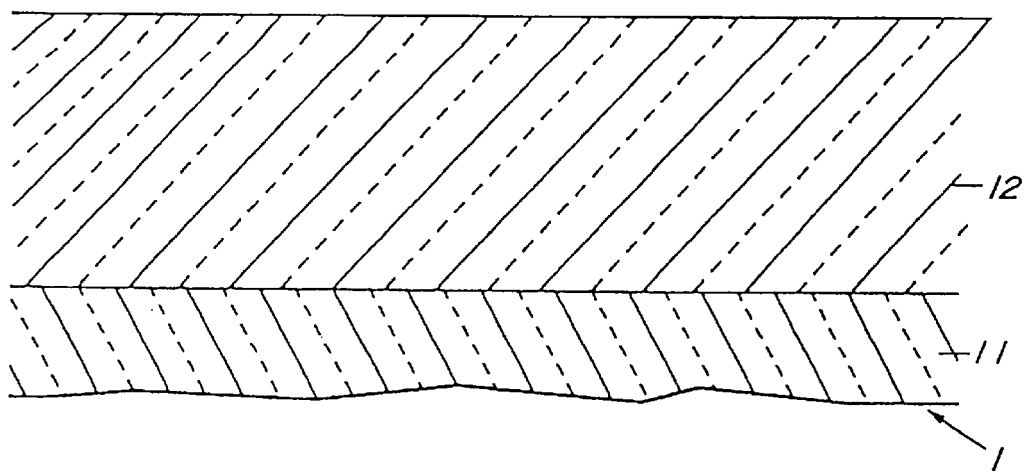
FIG_22

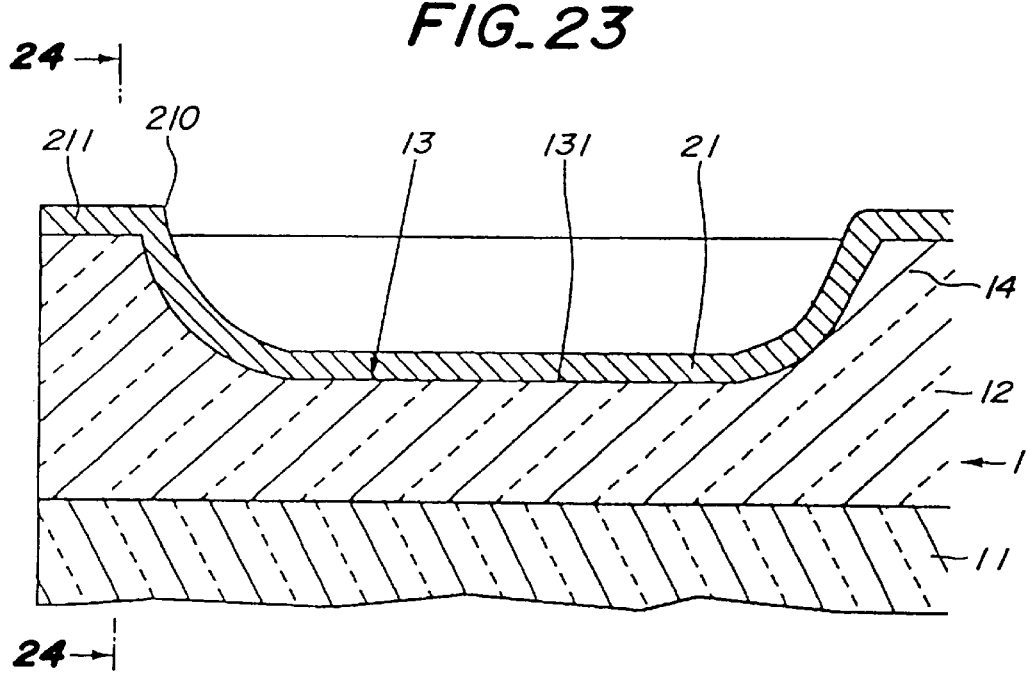
FIG._23
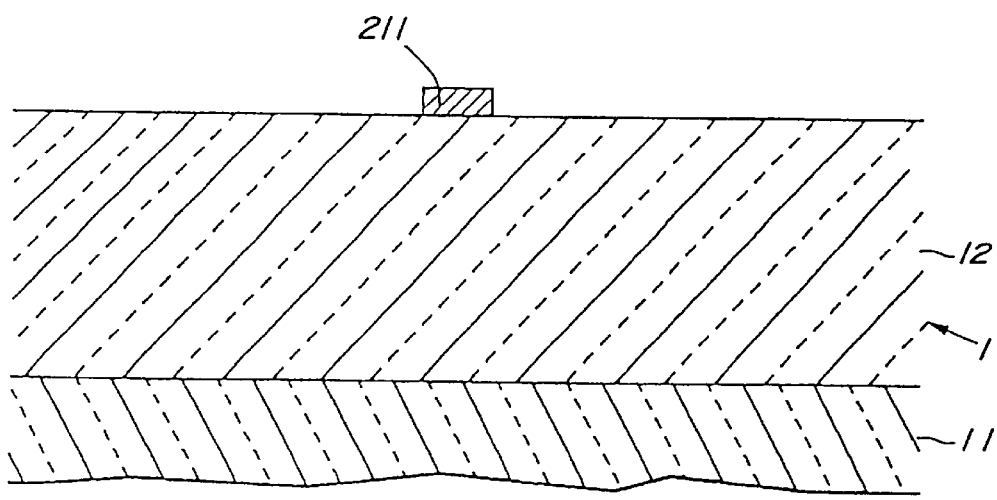
FIG._24

FIG_26
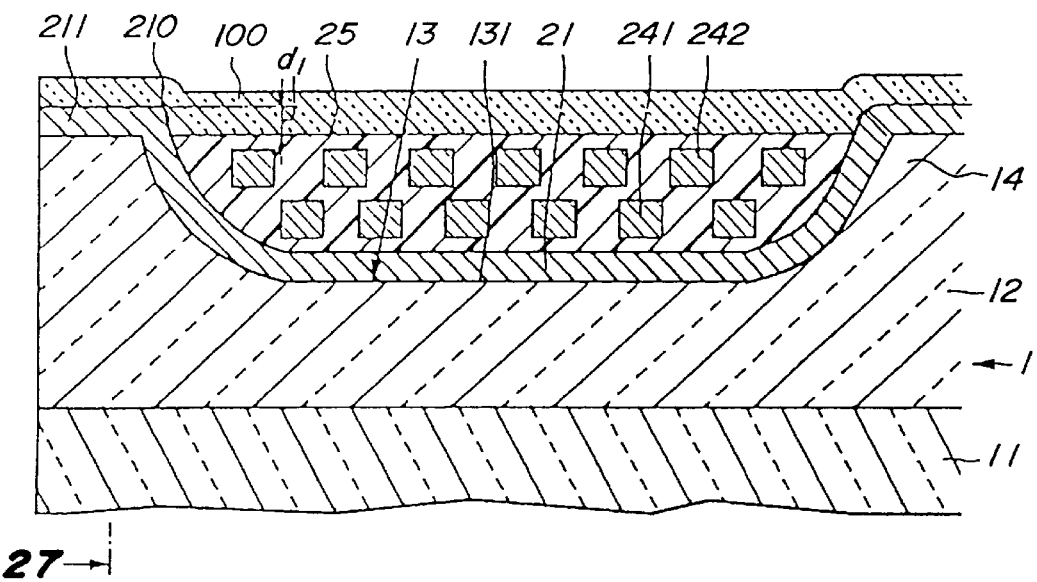
FIG_27
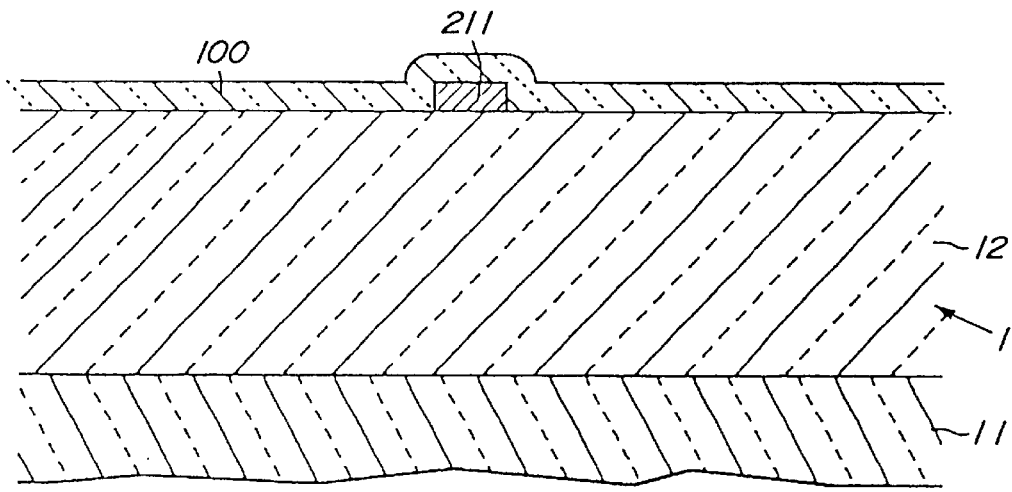

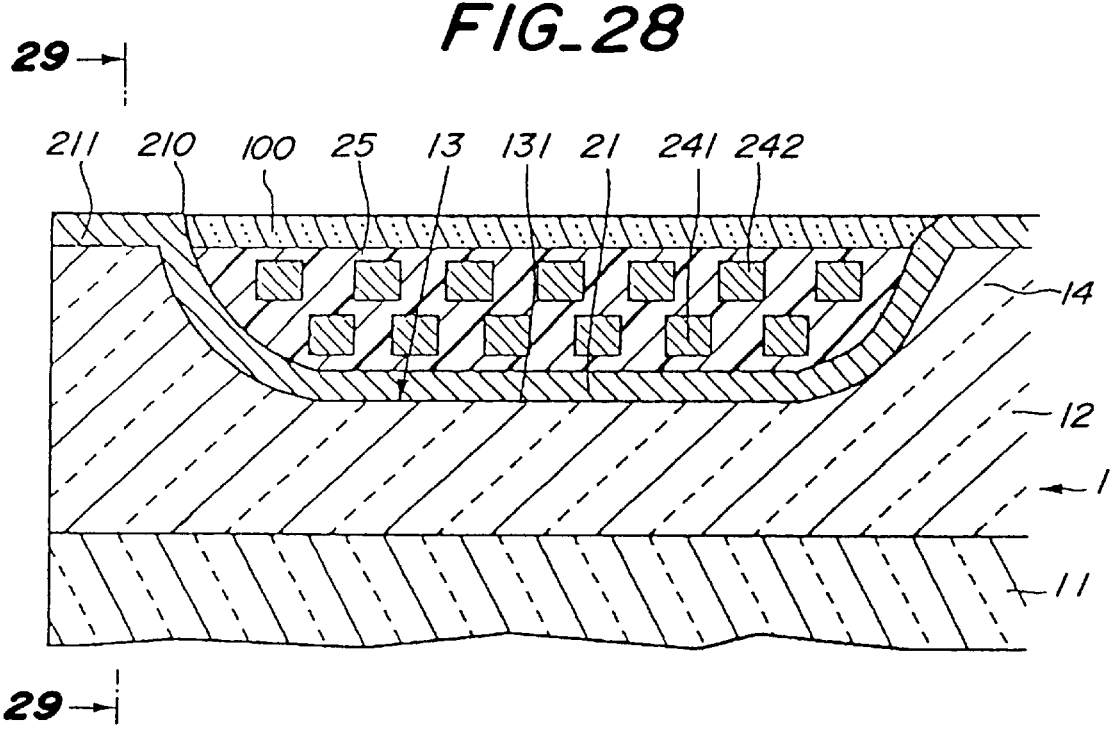
FIG_28
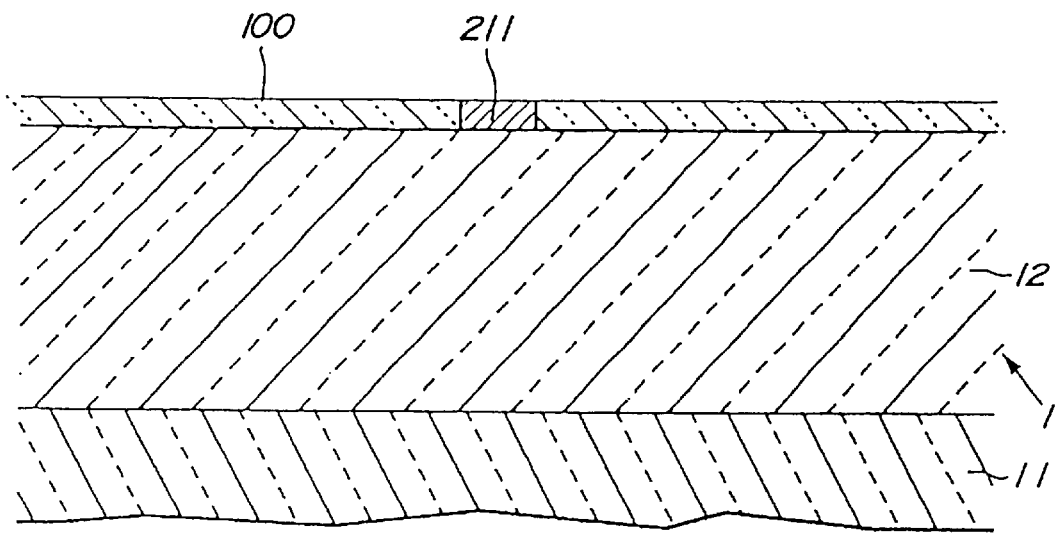
FIG_29

FIG_30
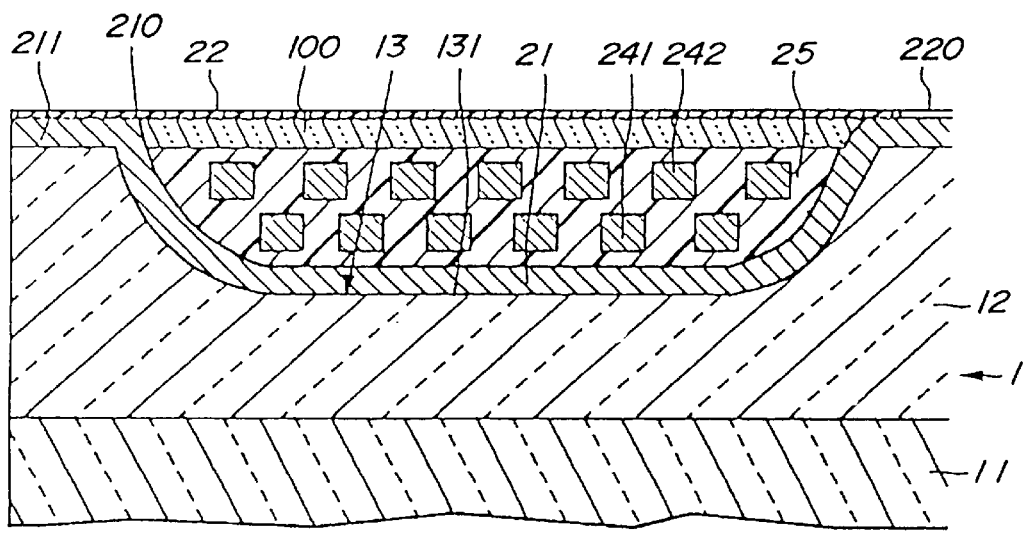
FIG_31
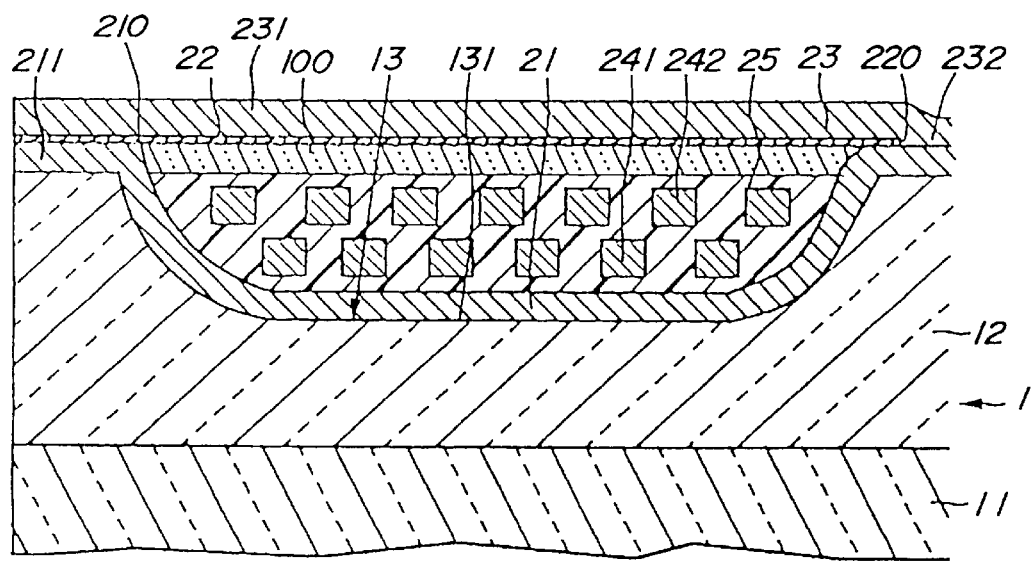

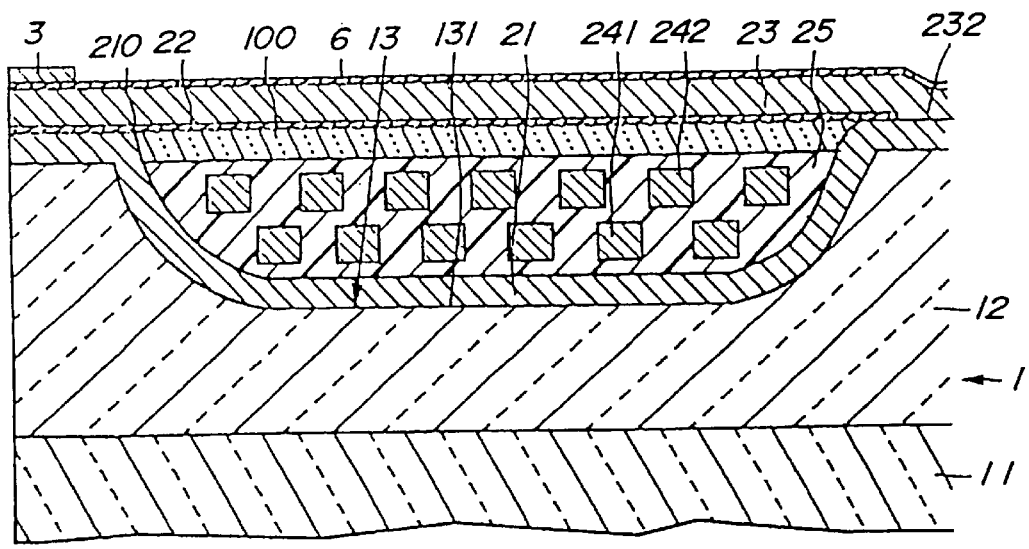
FIG_32
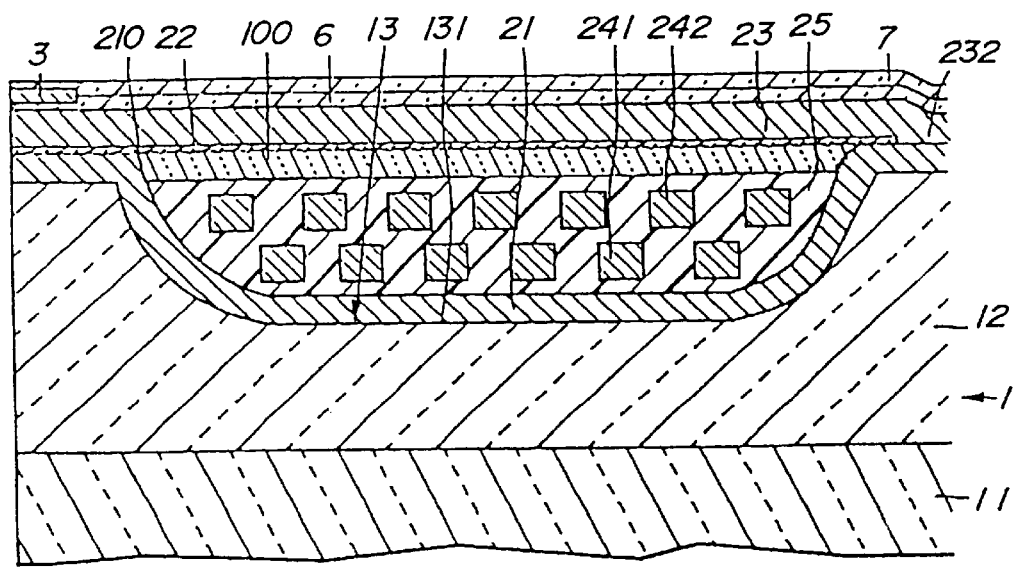
FIG_33

FIG_34
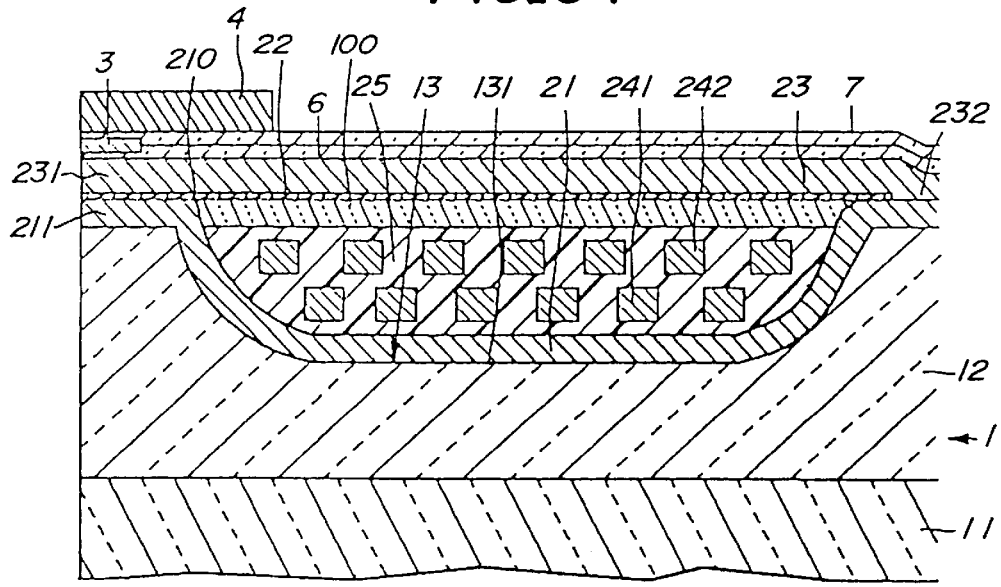
FIG_35
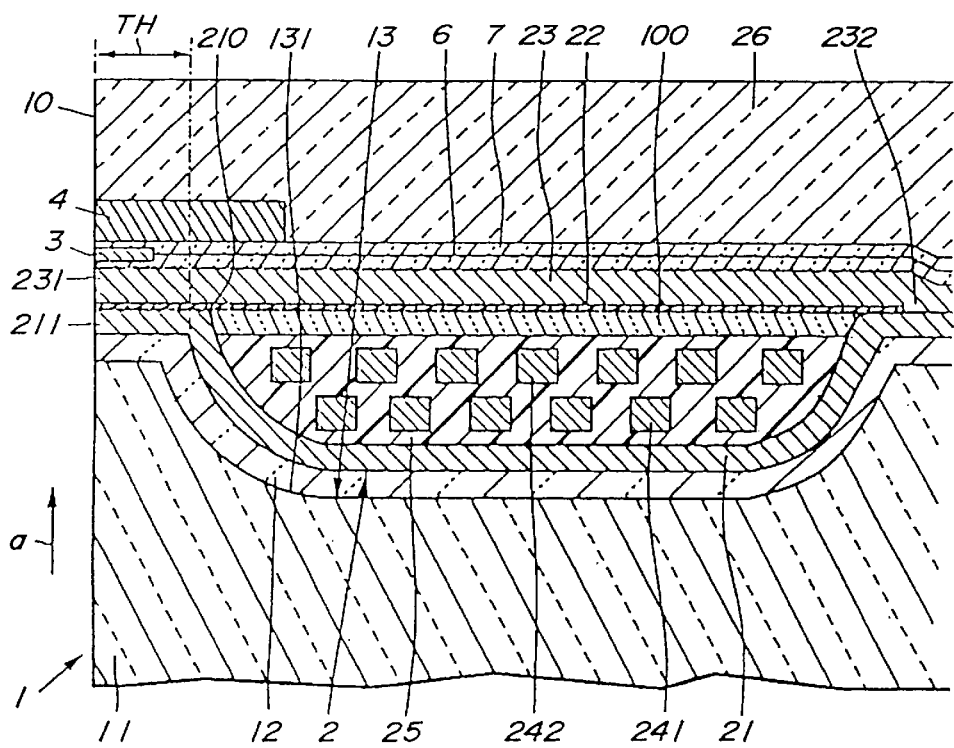

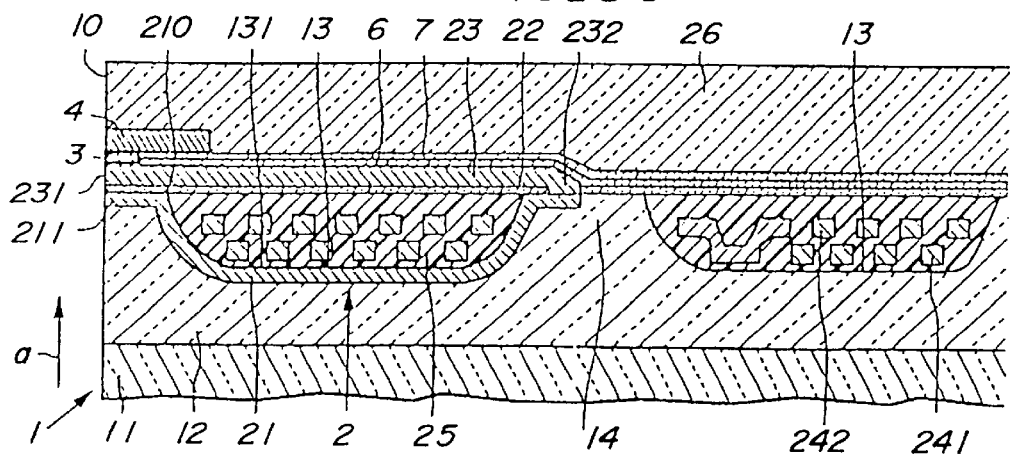
FIG_36
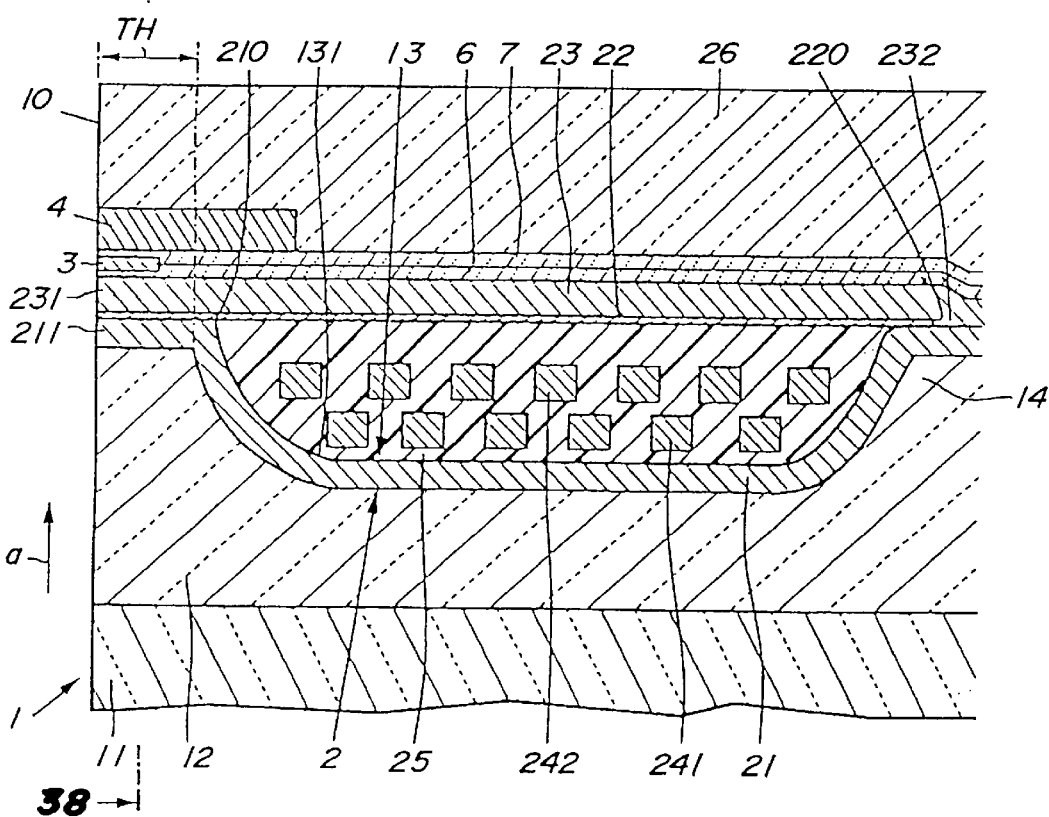
FIG_37

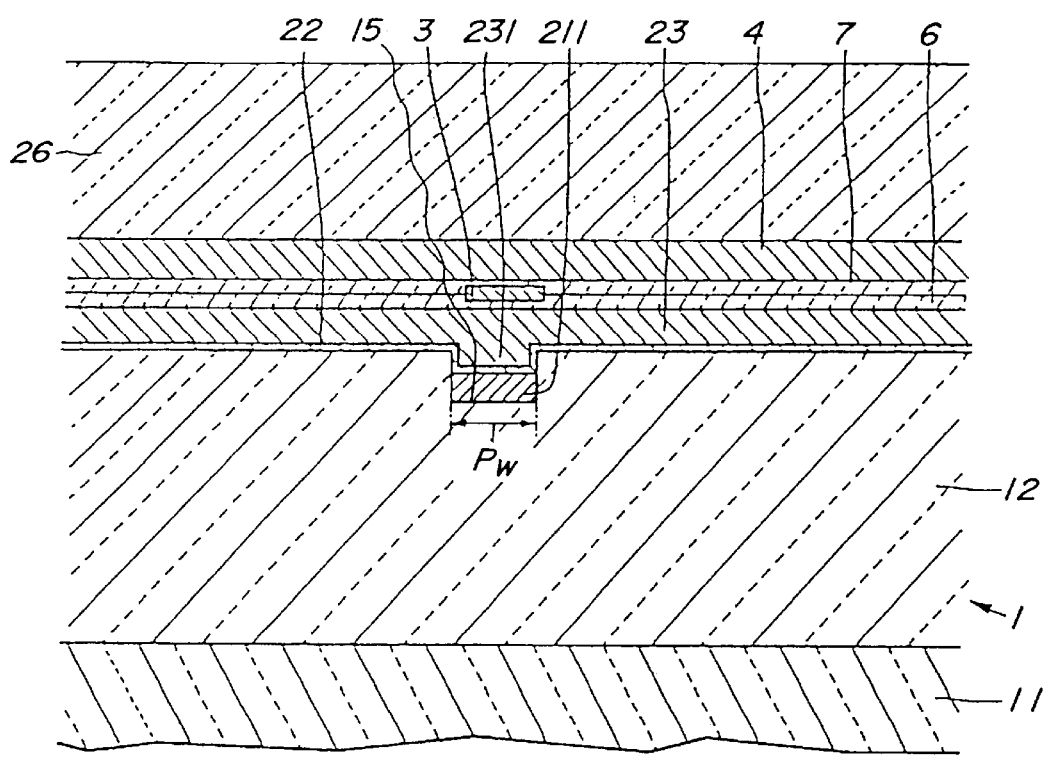
FIG_38

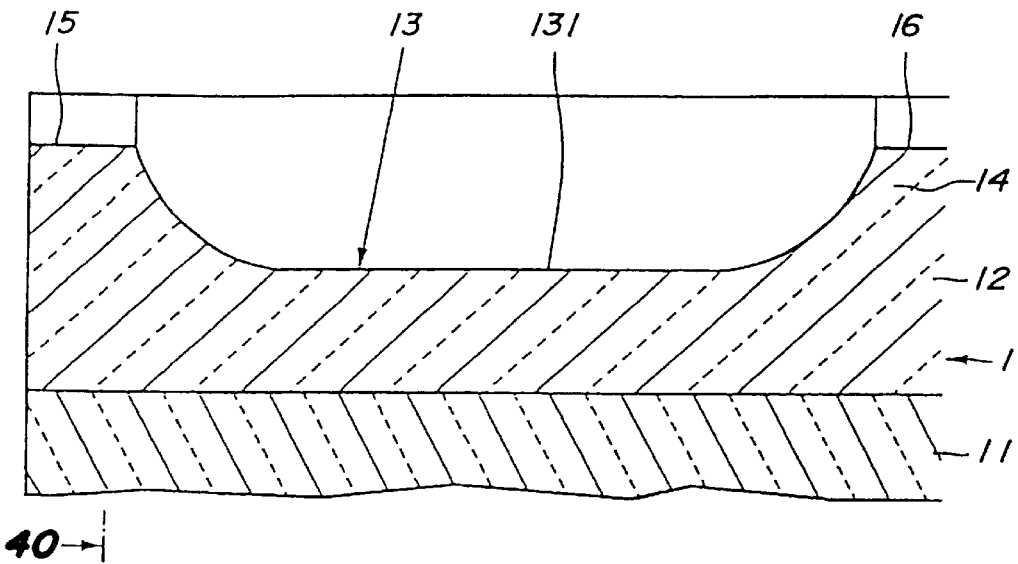
FIG_39
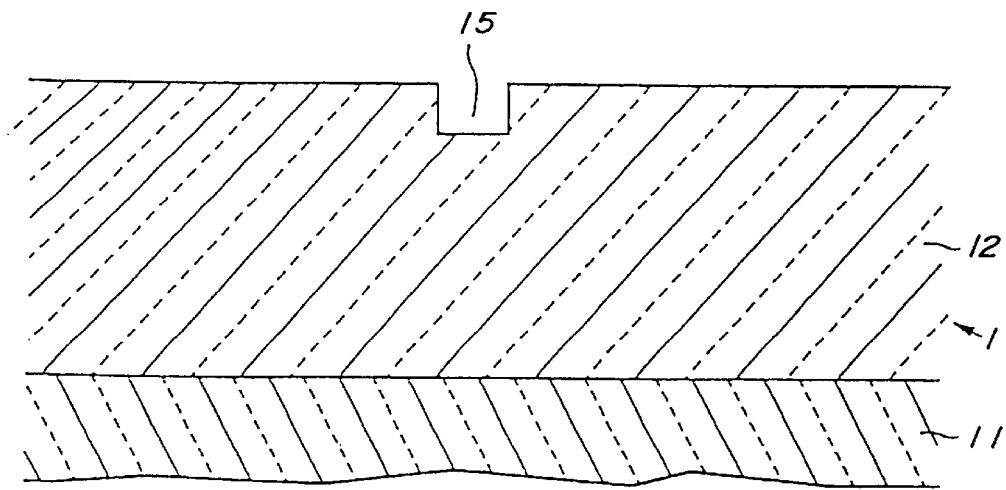
FIG_40

FIG_41
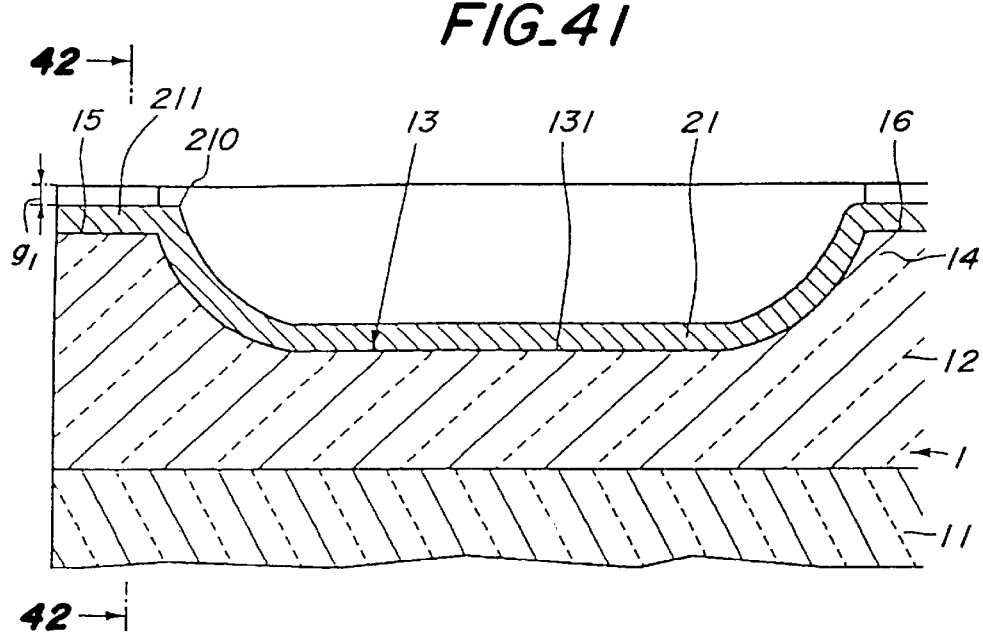
FIG_42
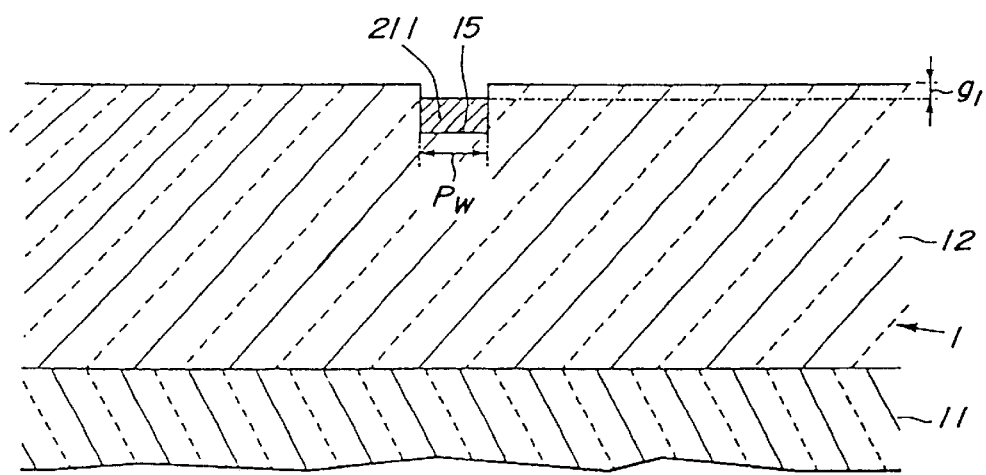

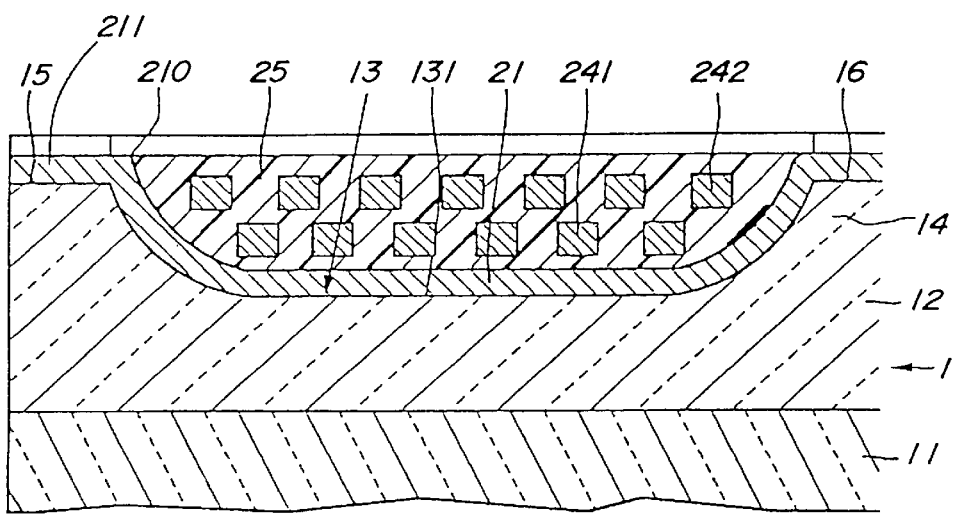
FIG_43

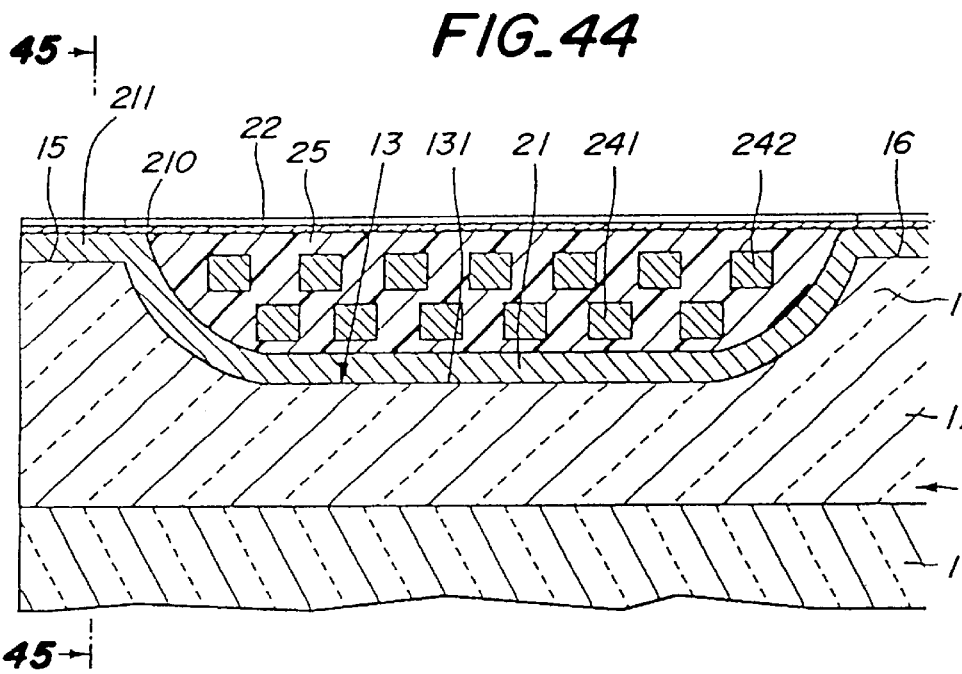
FIG_44
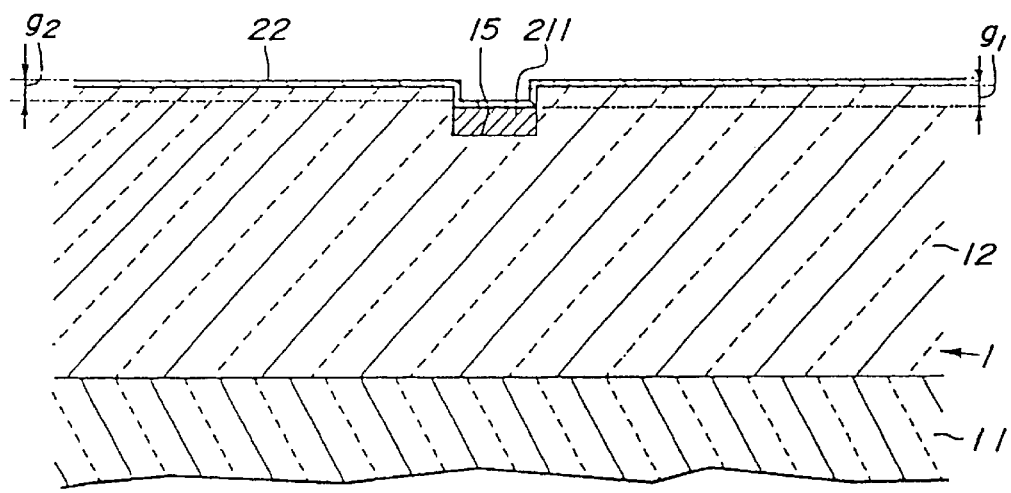
FIG_45

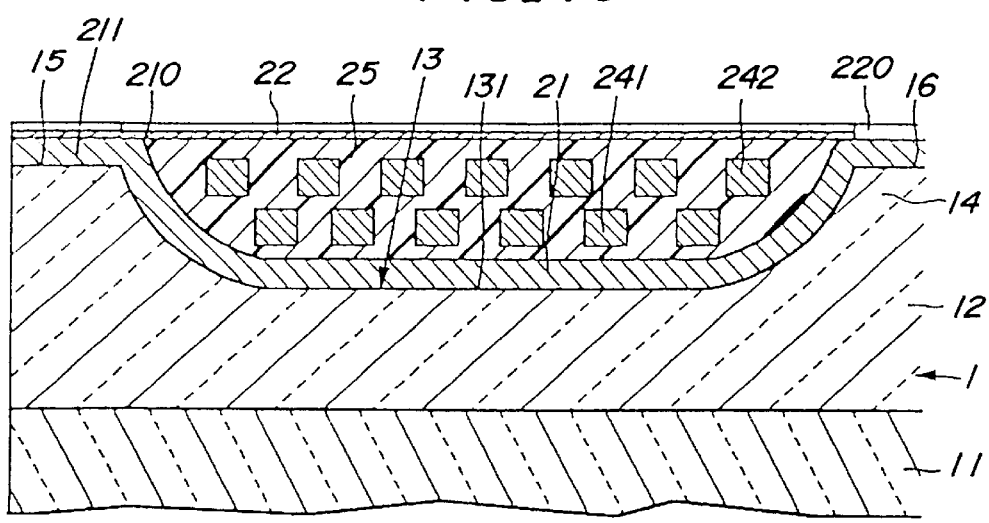
FIG_46

FIG_47
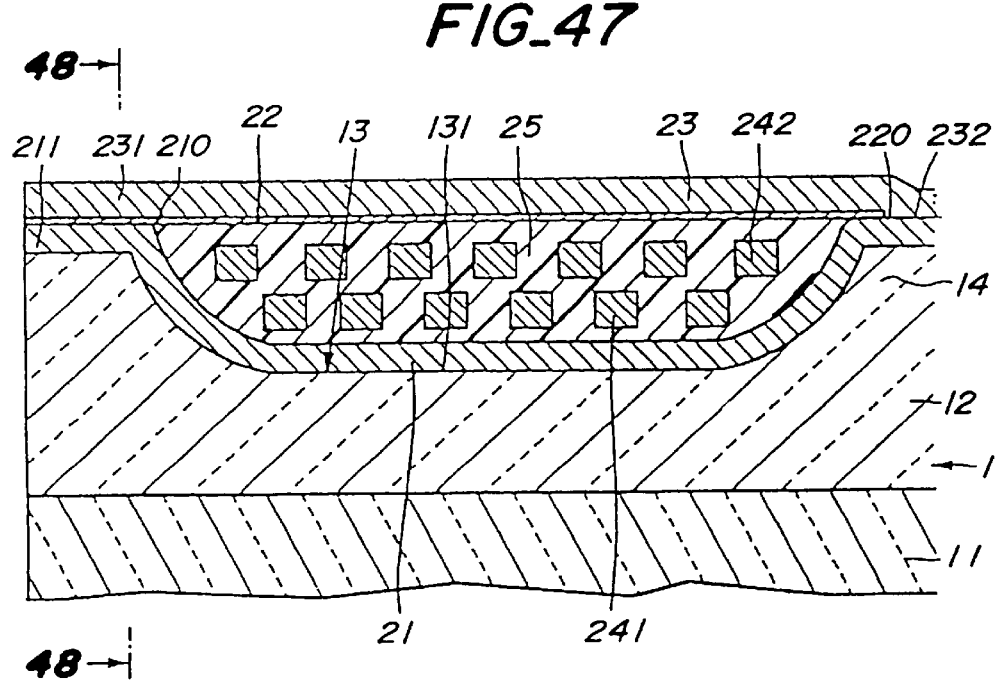
FIG_48
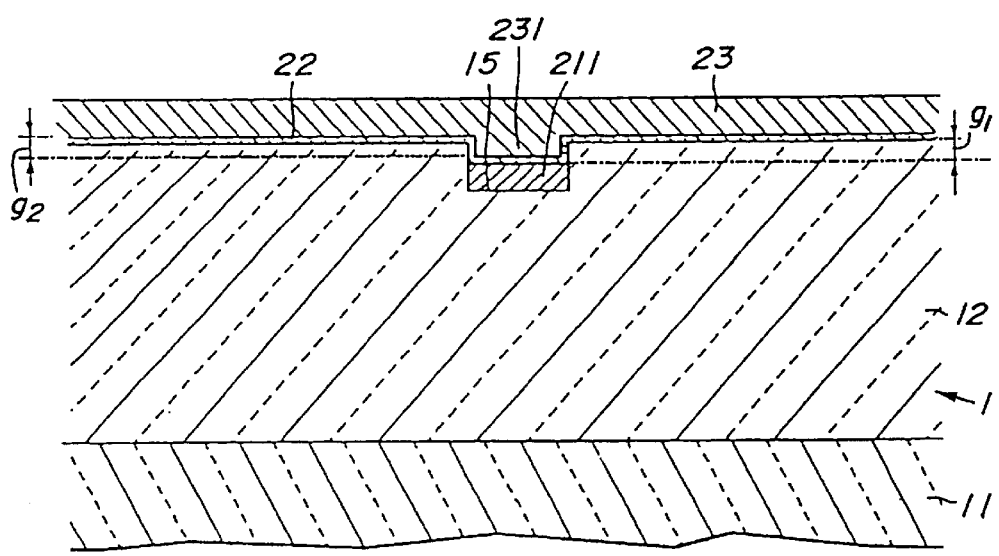

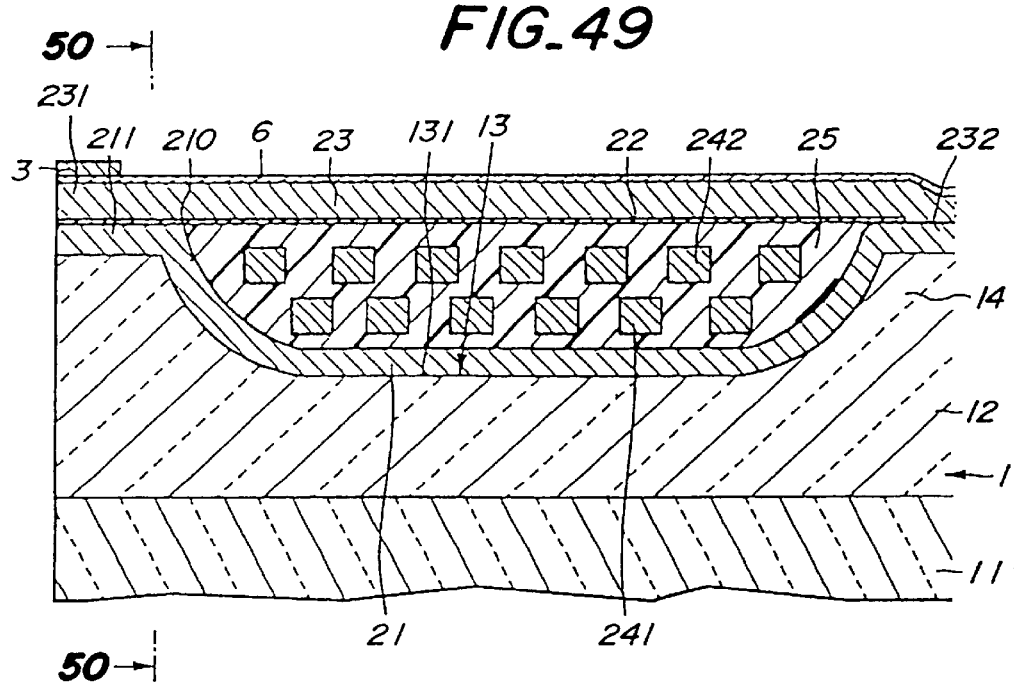
FIG_49
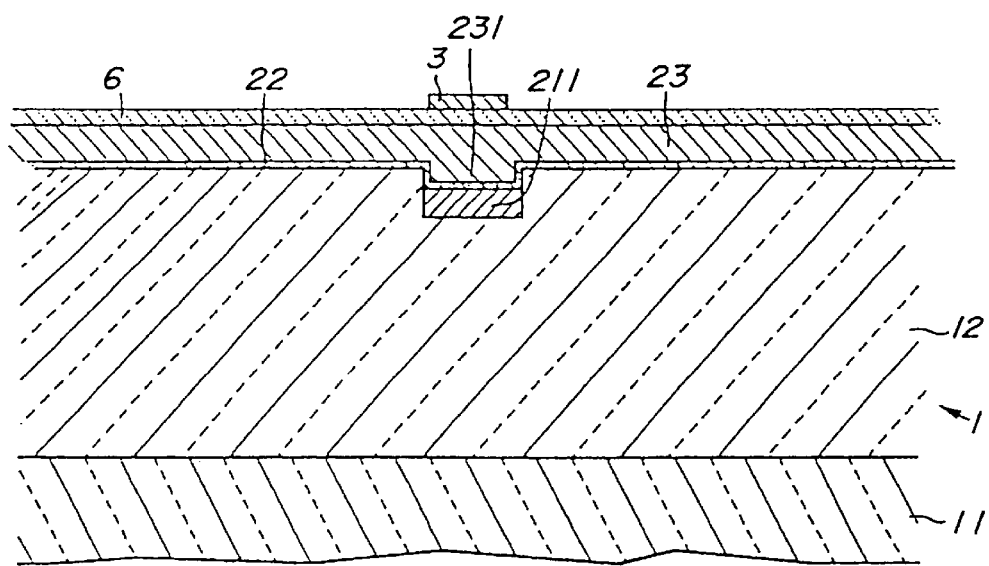
FIG_50

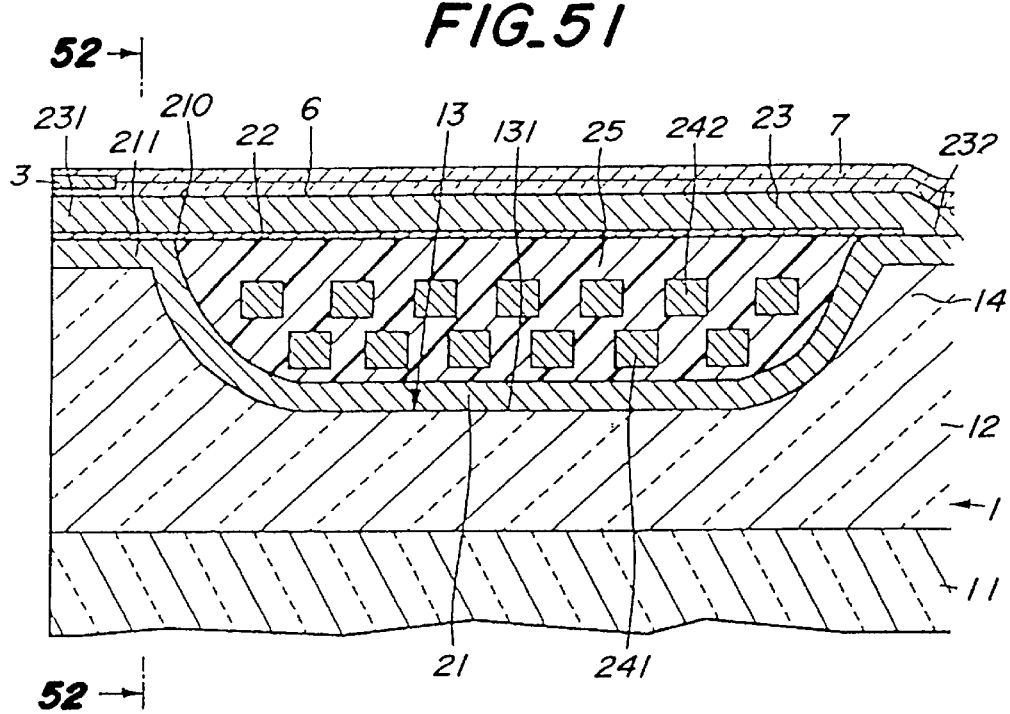
FIG_51
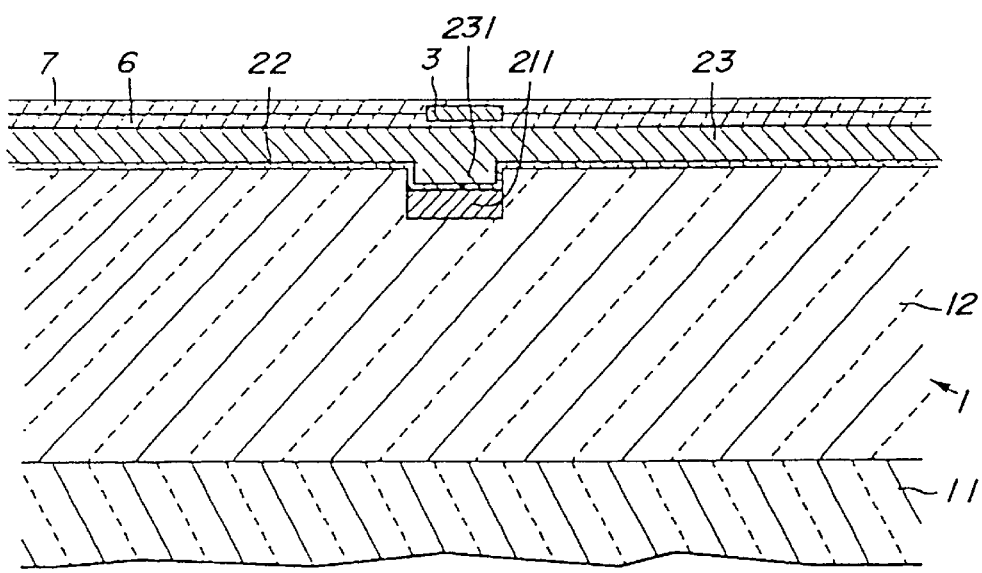
FIG_52

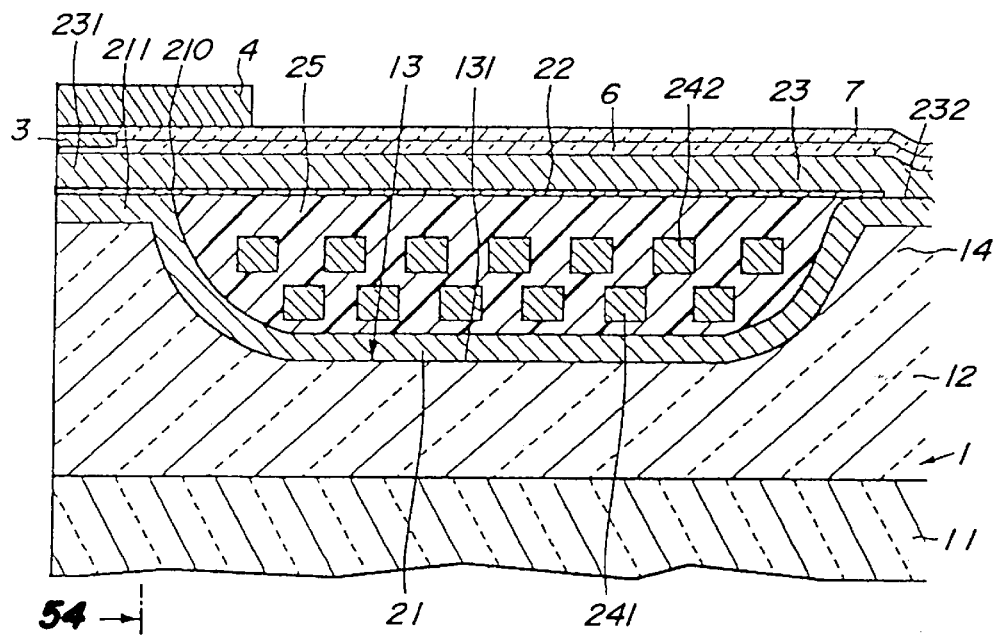
FIG_53
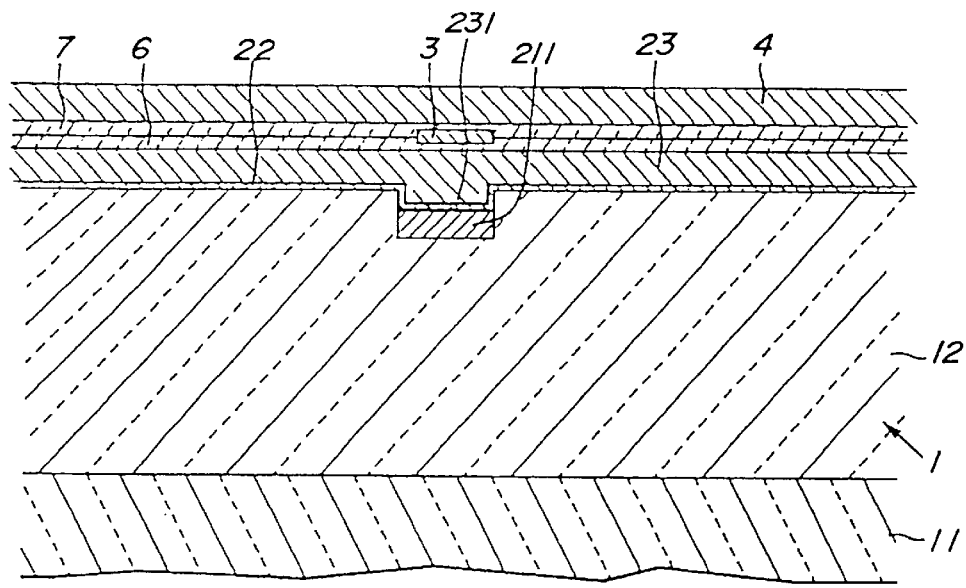
FIG_54

FIG_55
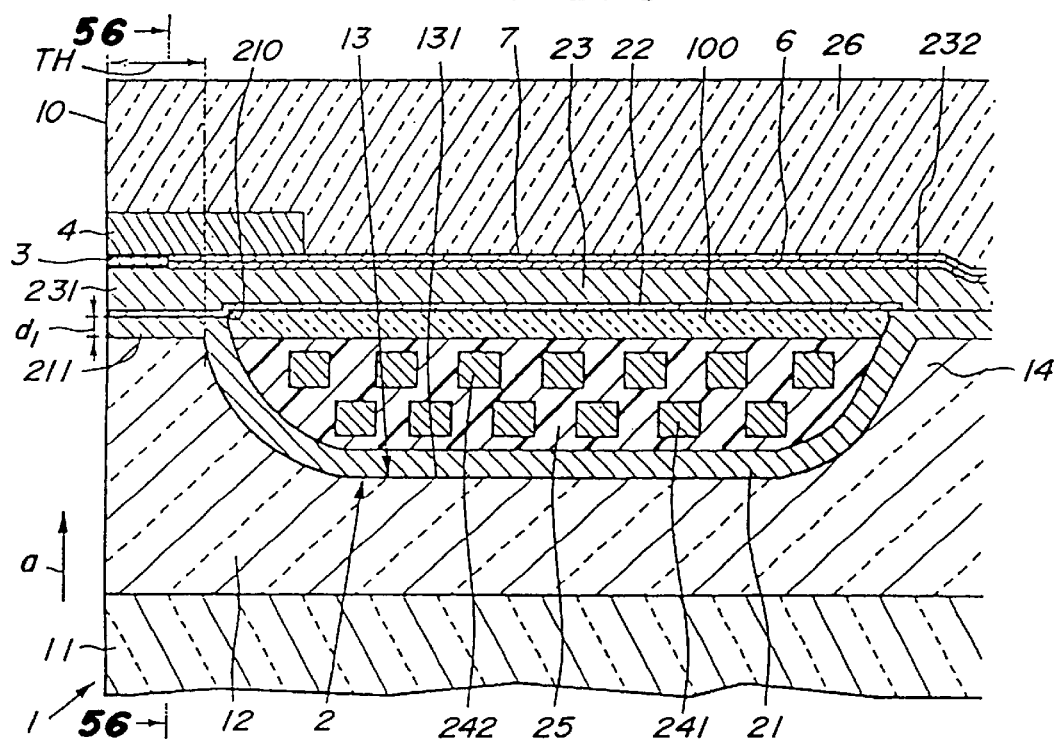
FIG_56
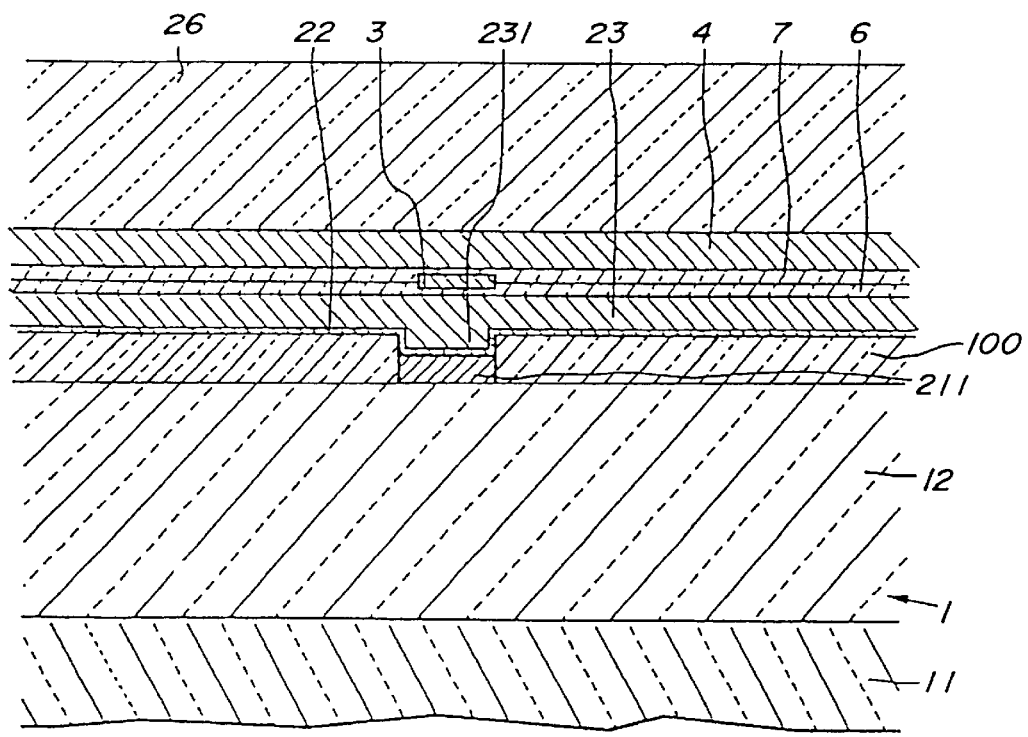

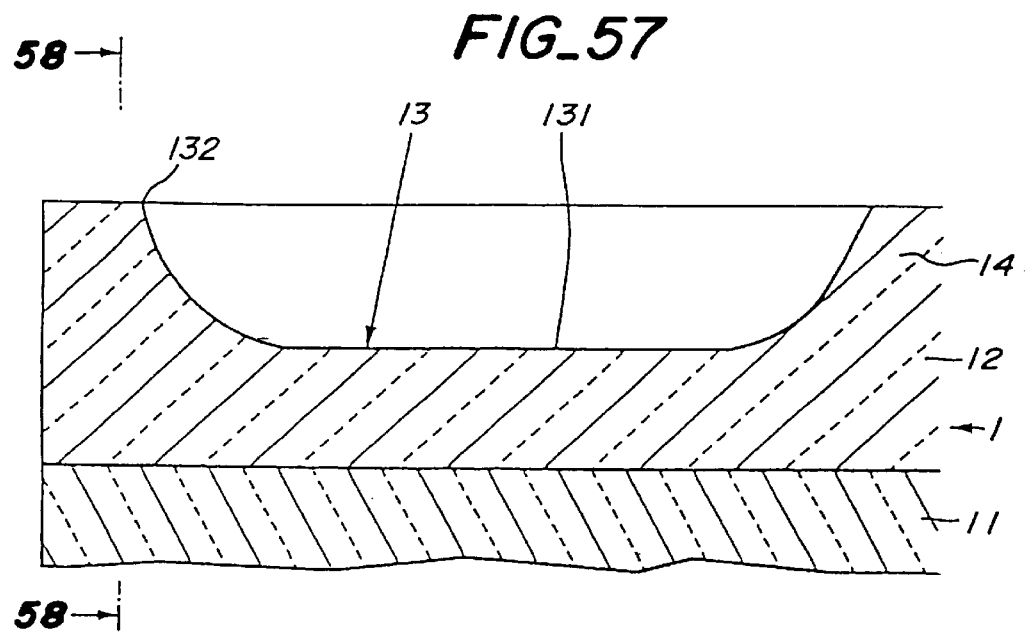
FIG_57
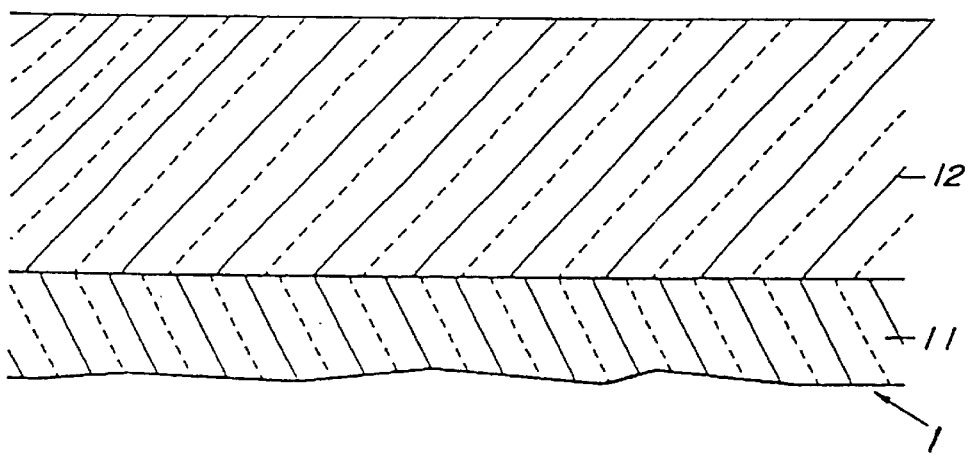
FIG_58

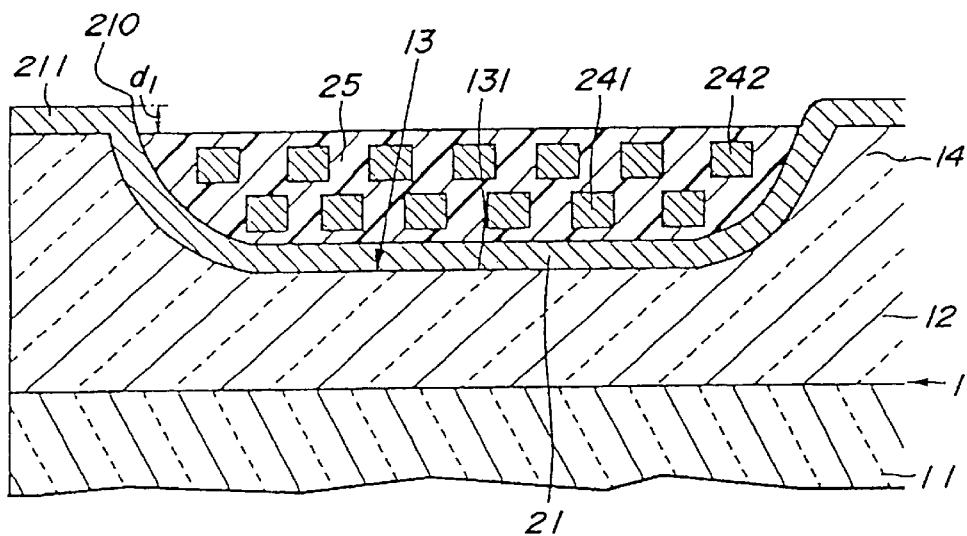
FIG_61

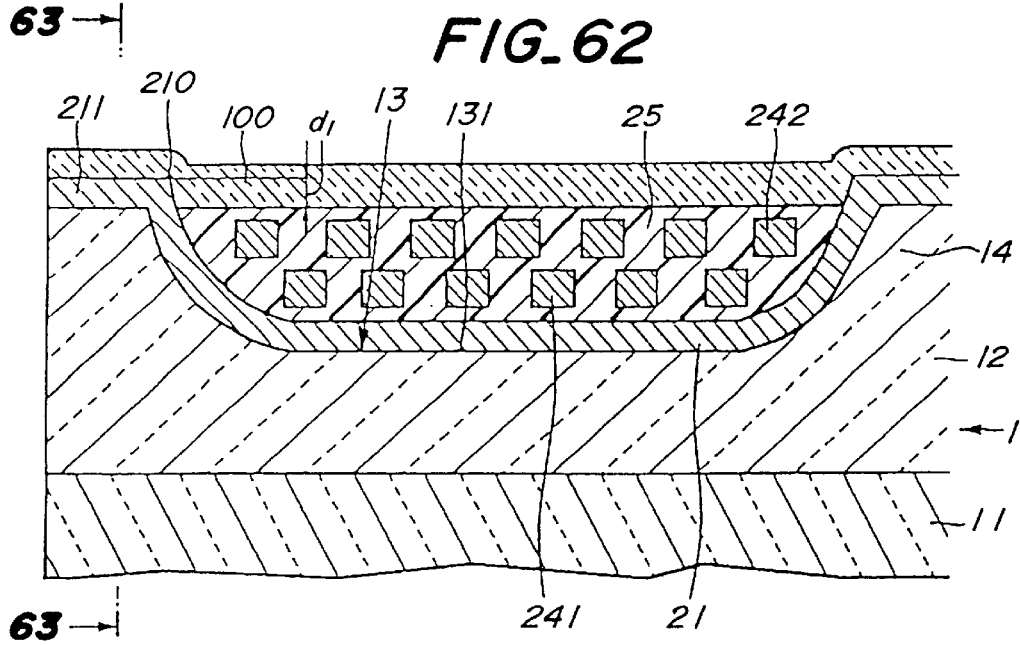
FIG_62
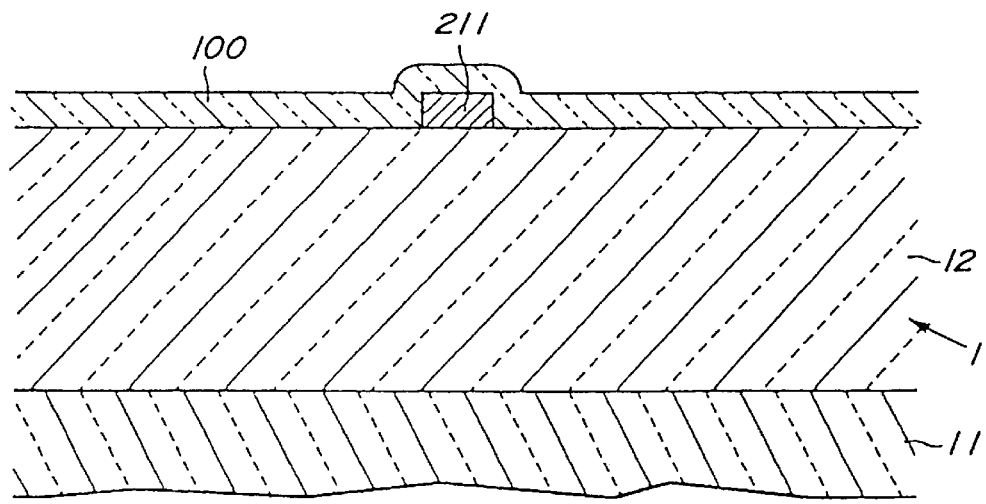
FIG_63

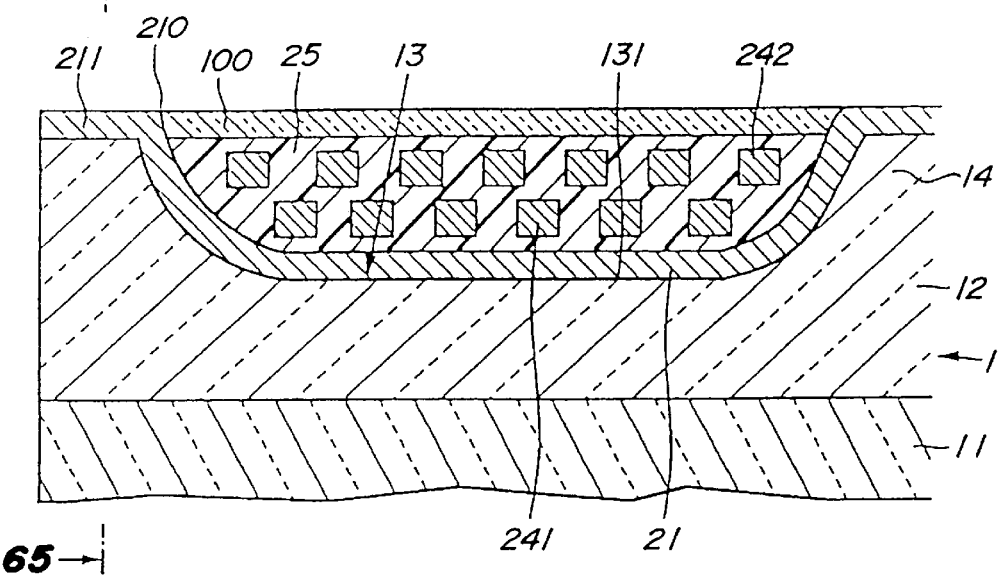
FIG_64
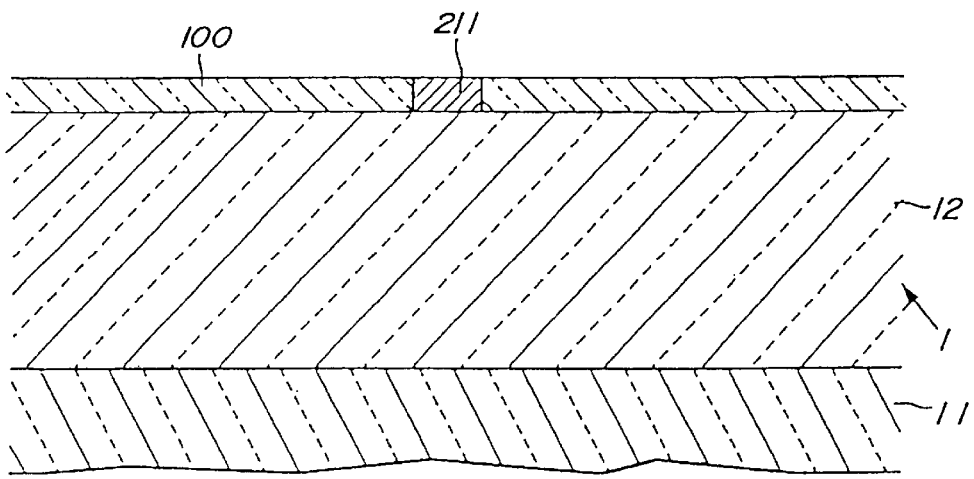
FIG_65

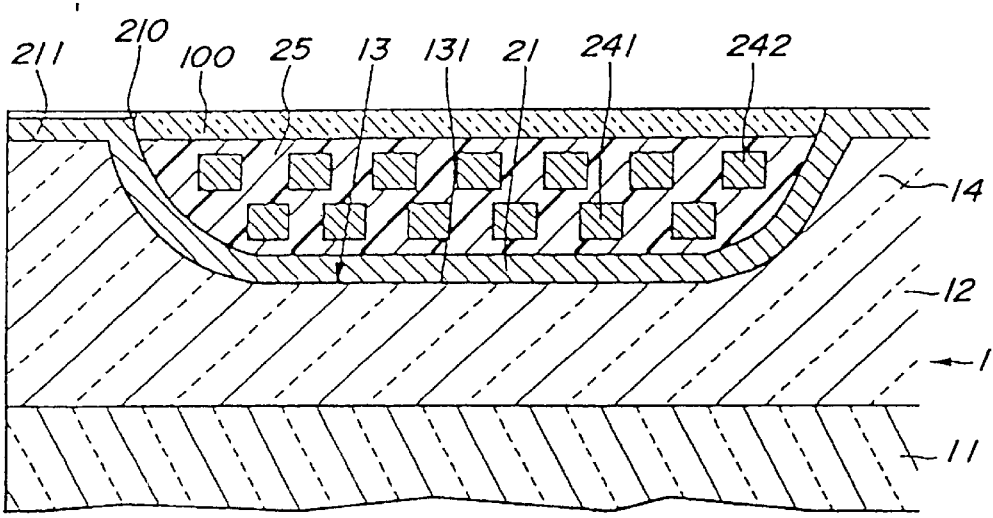
FIG_66
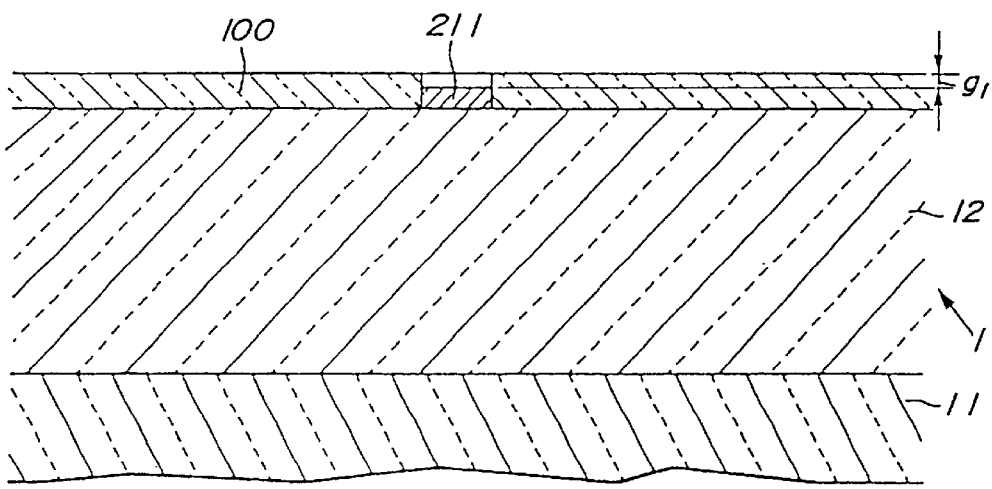
FIG_67

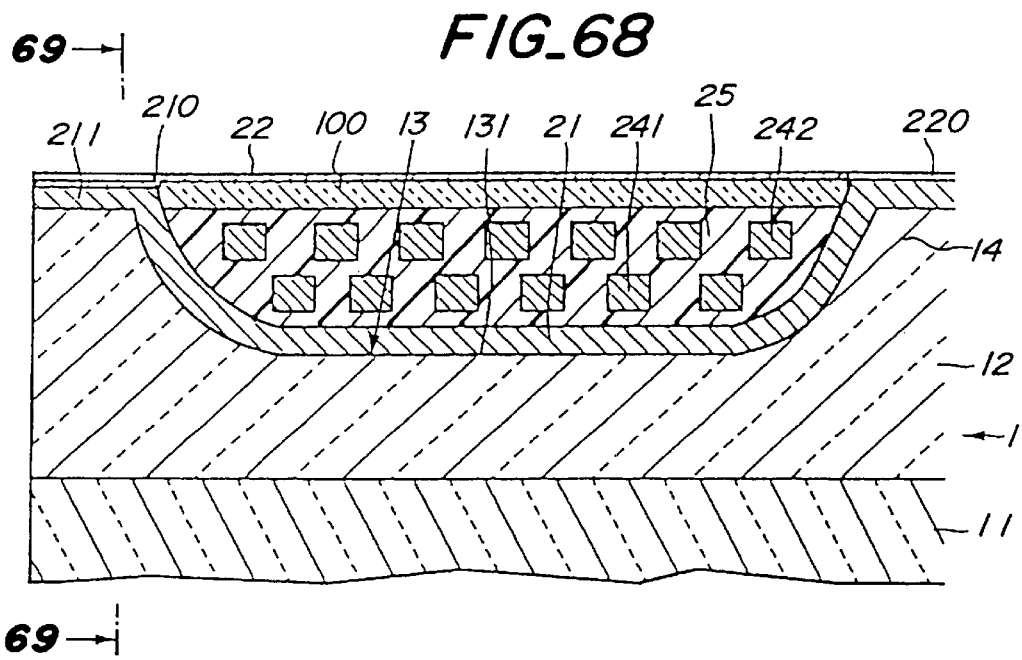
FIG_68
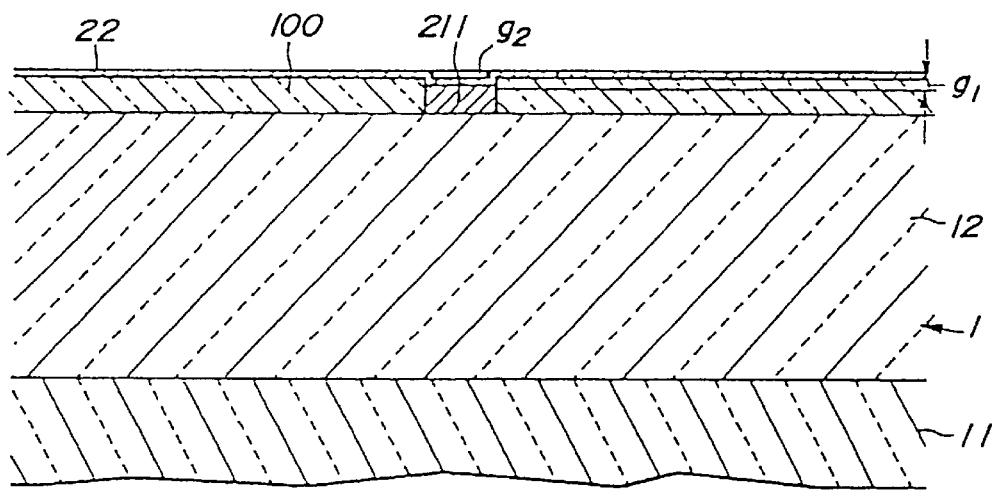
FIG_69

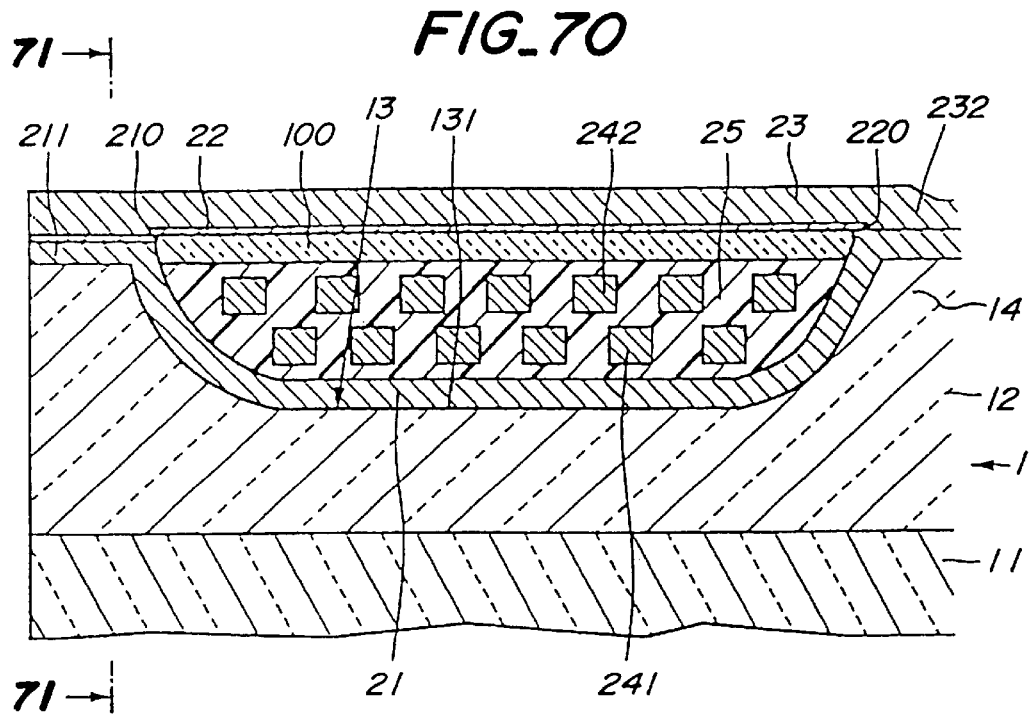
FIG_70
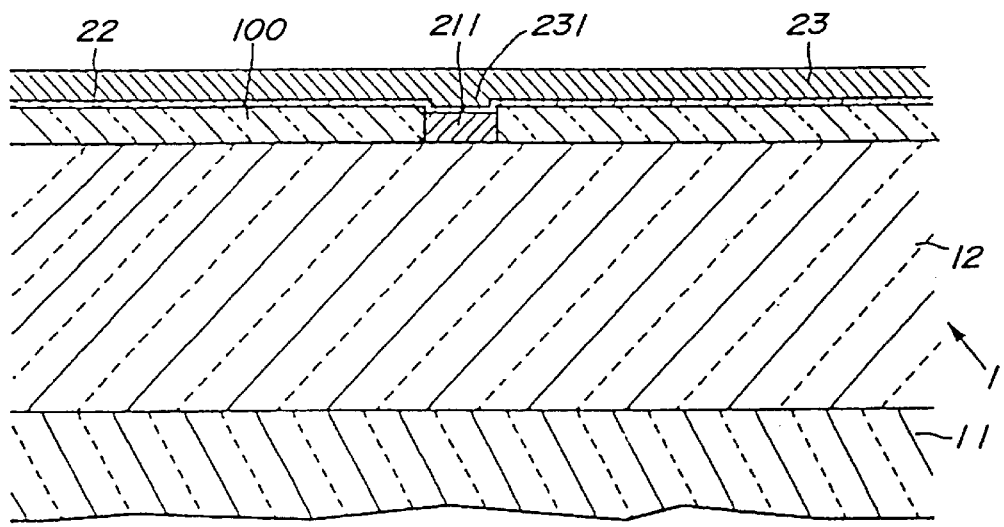
FIG_71

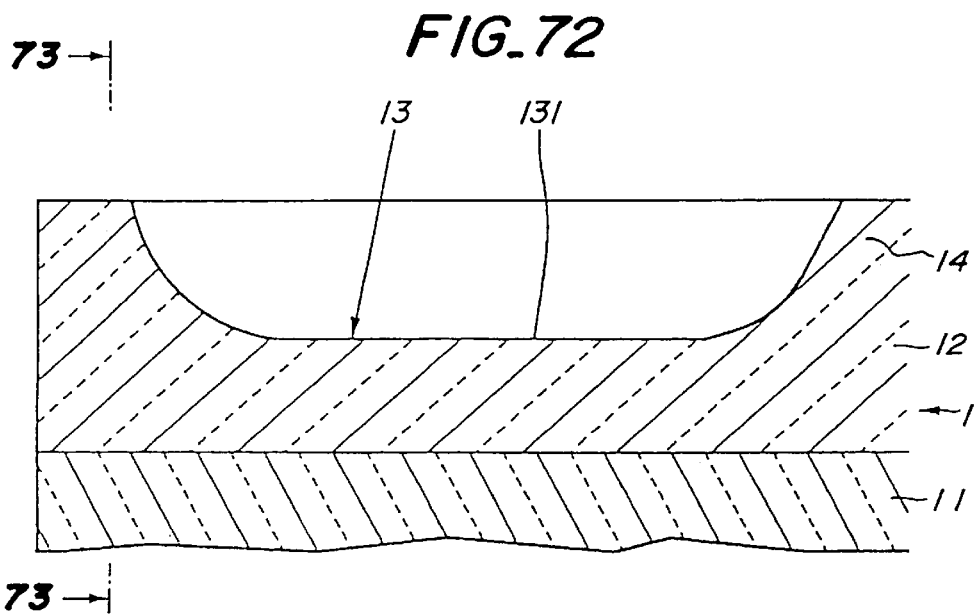
FIG_72
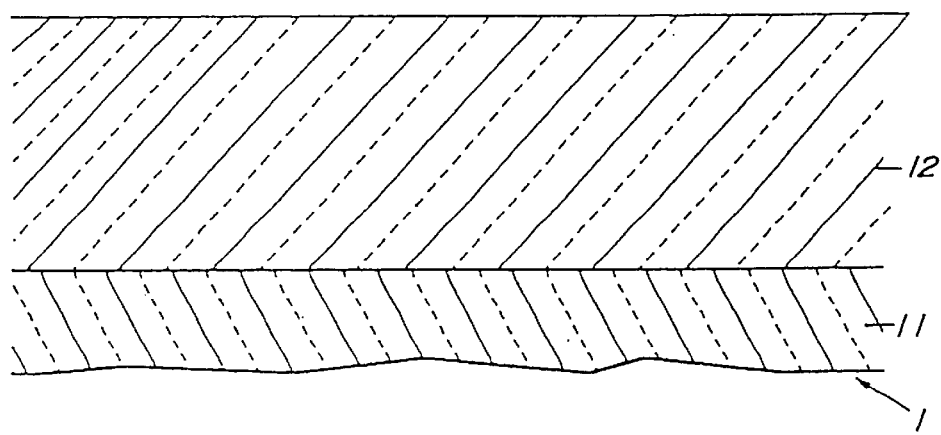
FIG_73

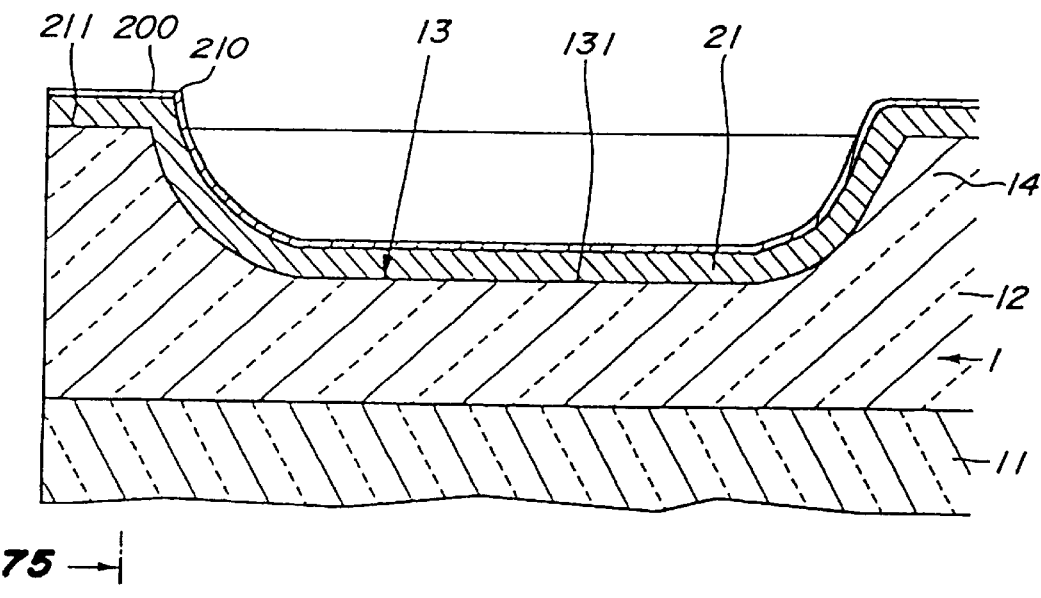
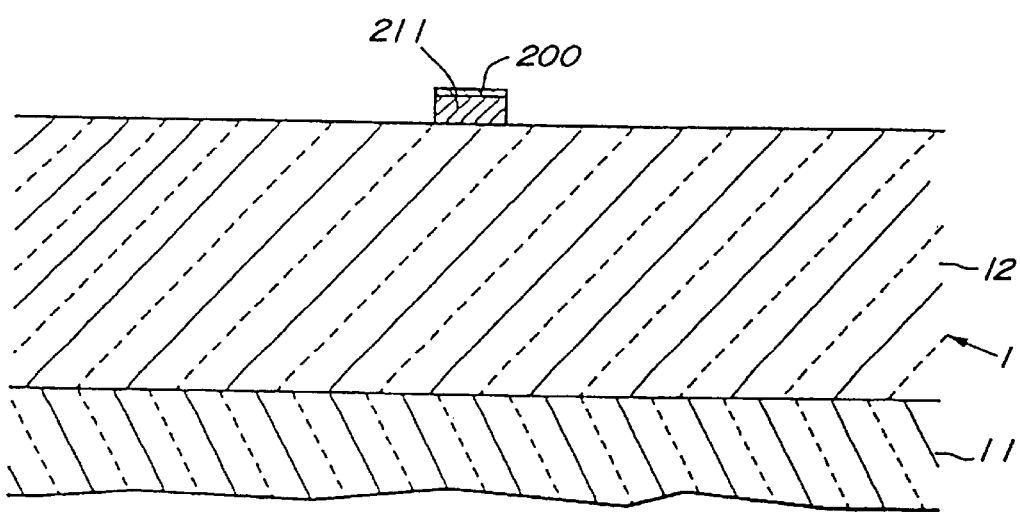

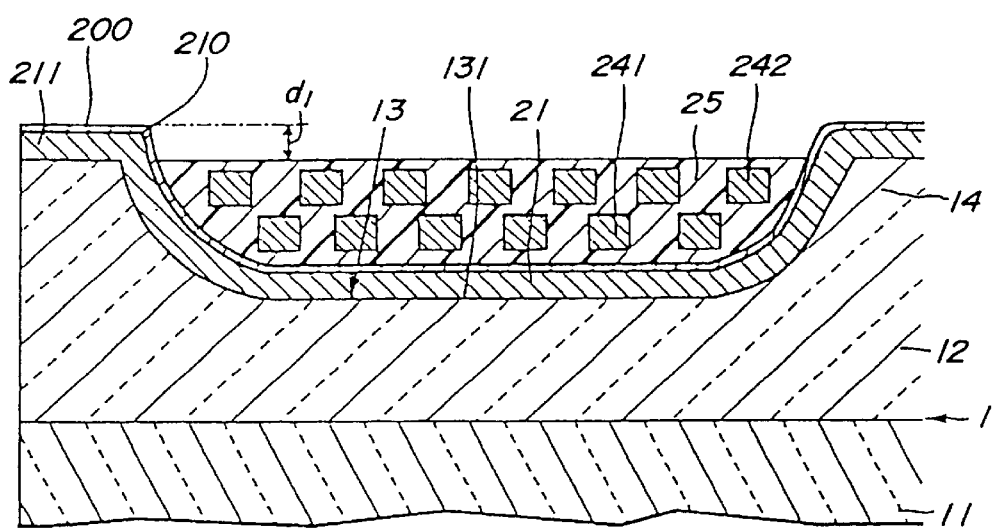
FIG_76

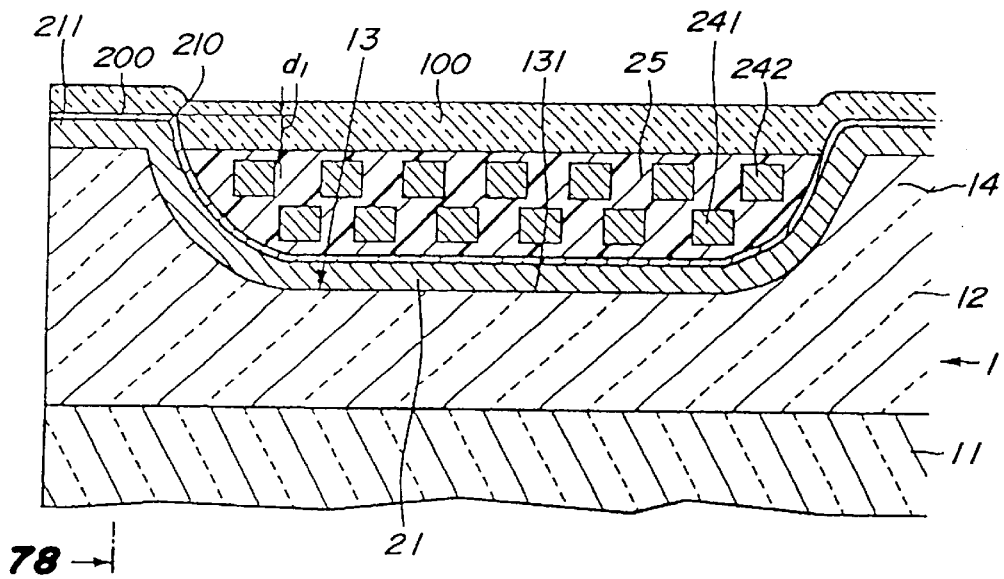
FIG_77
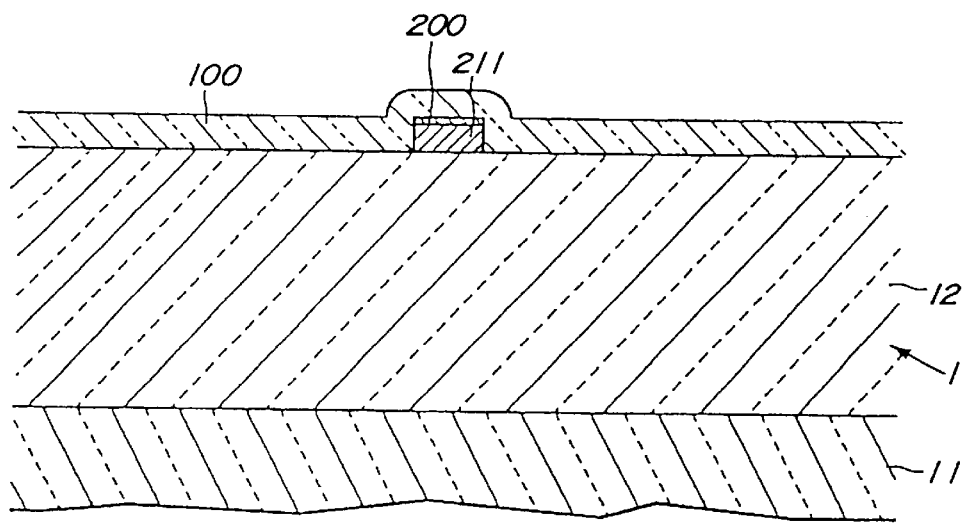
FIG_78

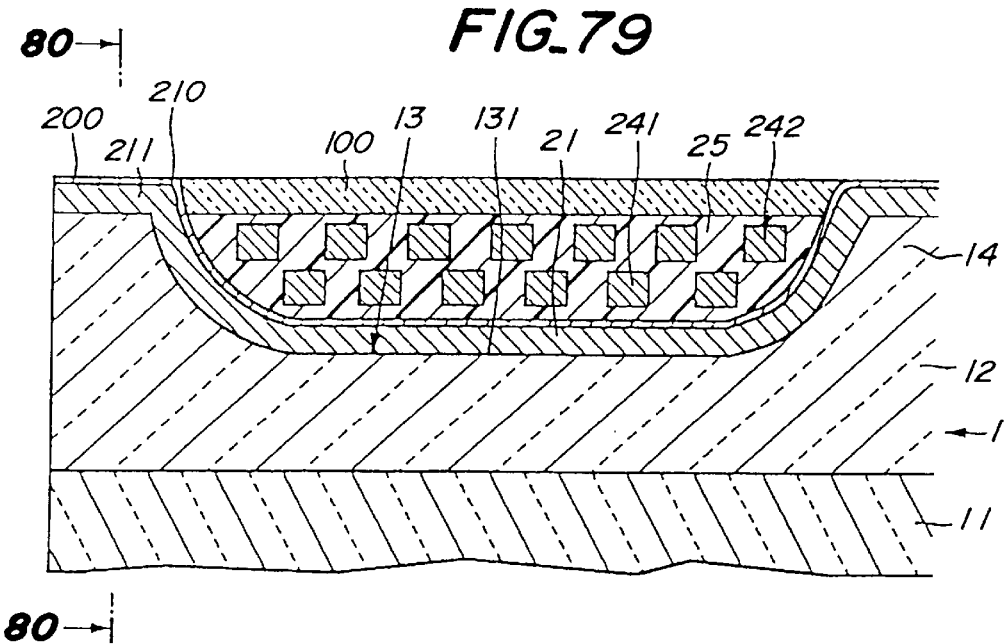
FIG_79
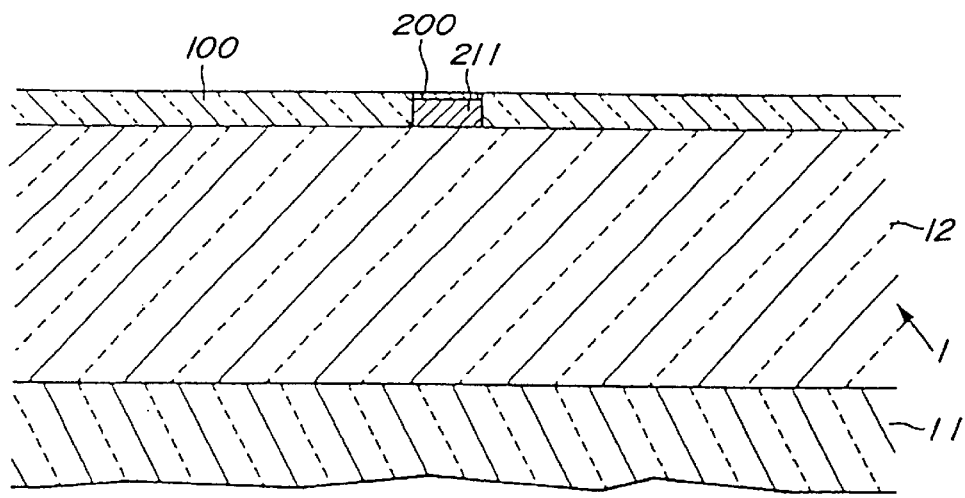
FIG_80

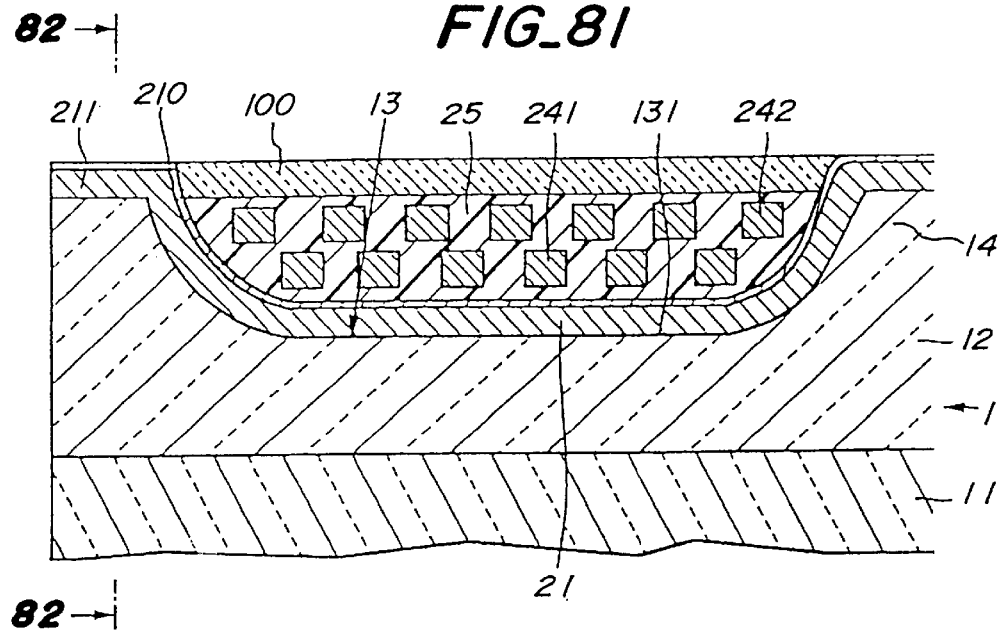
FIG_81
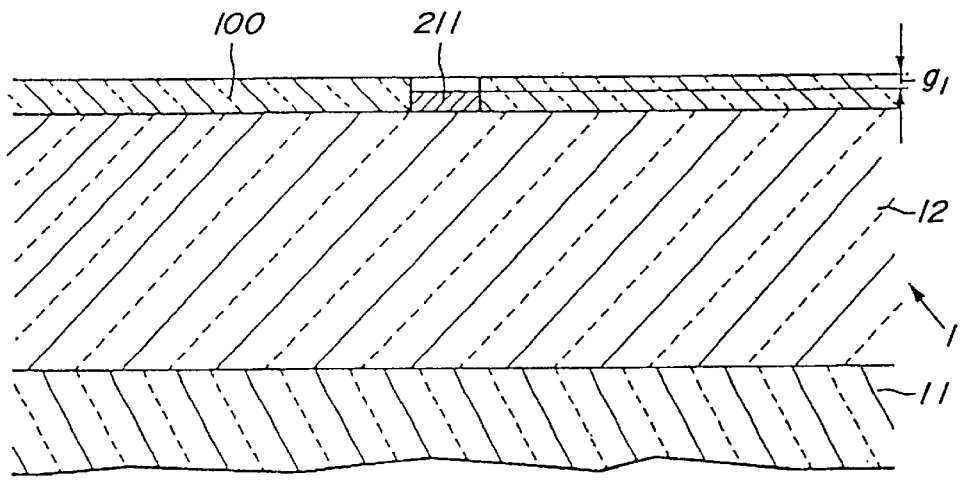
FIG_82

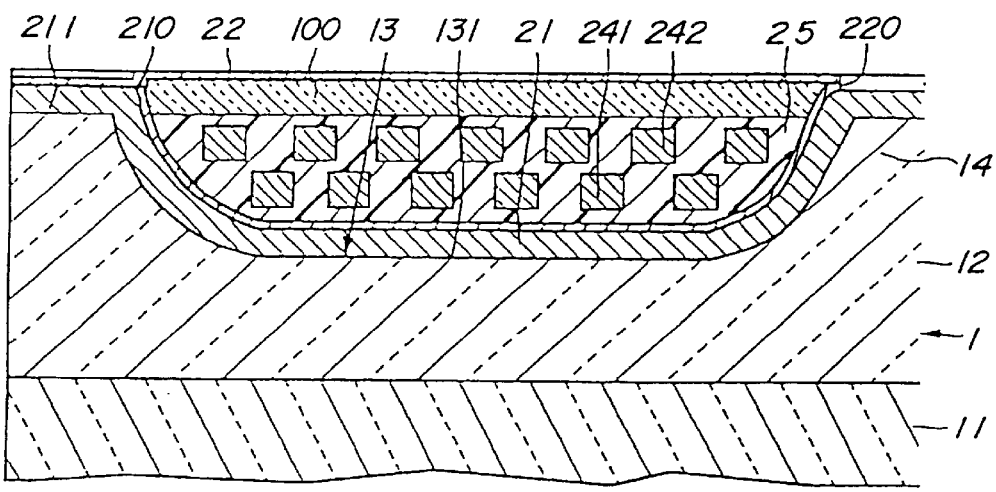
FIG_83
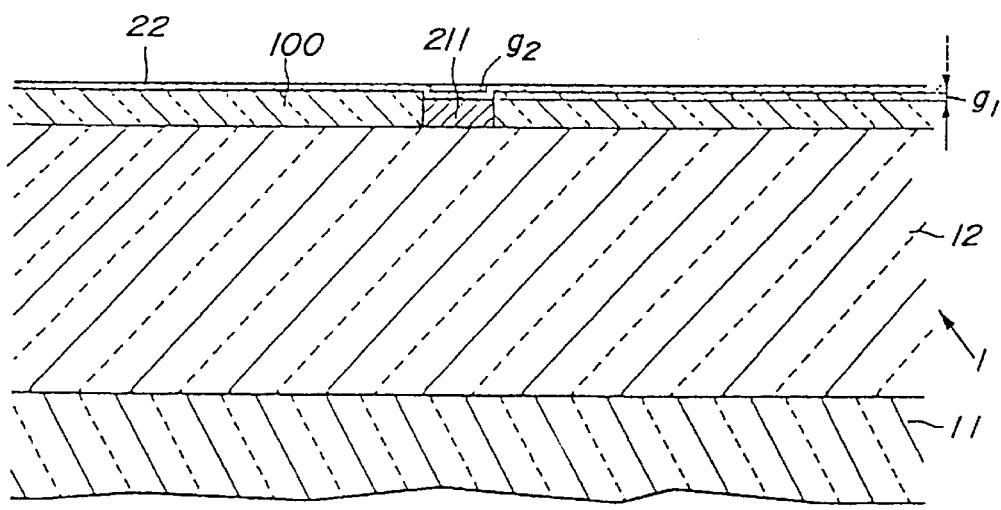
FIG_84

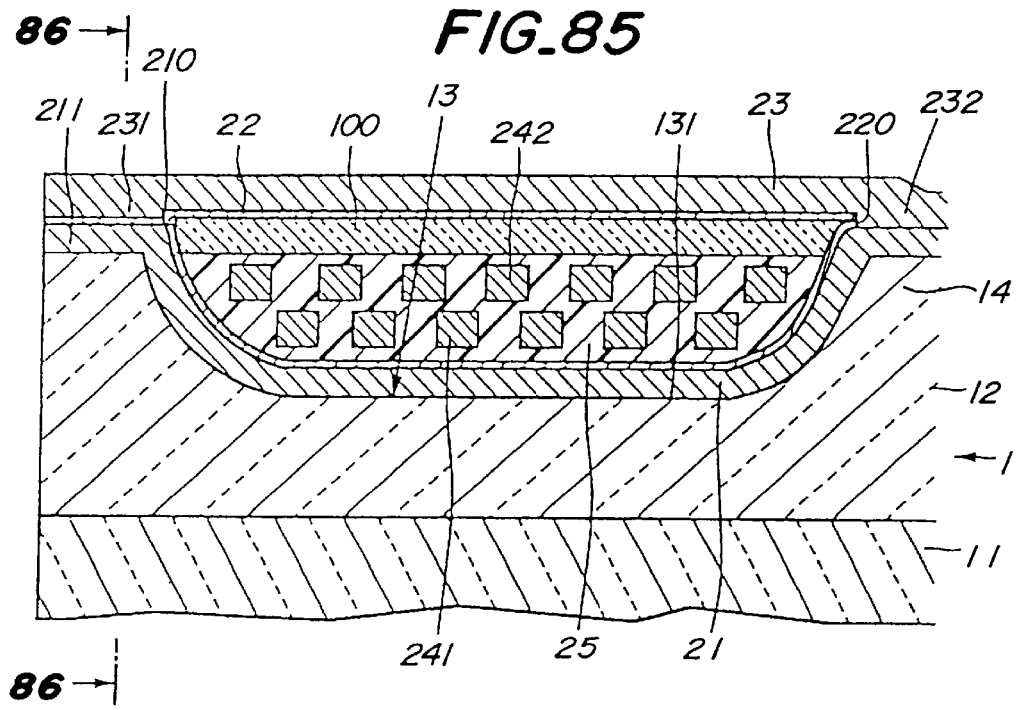
FIG_85
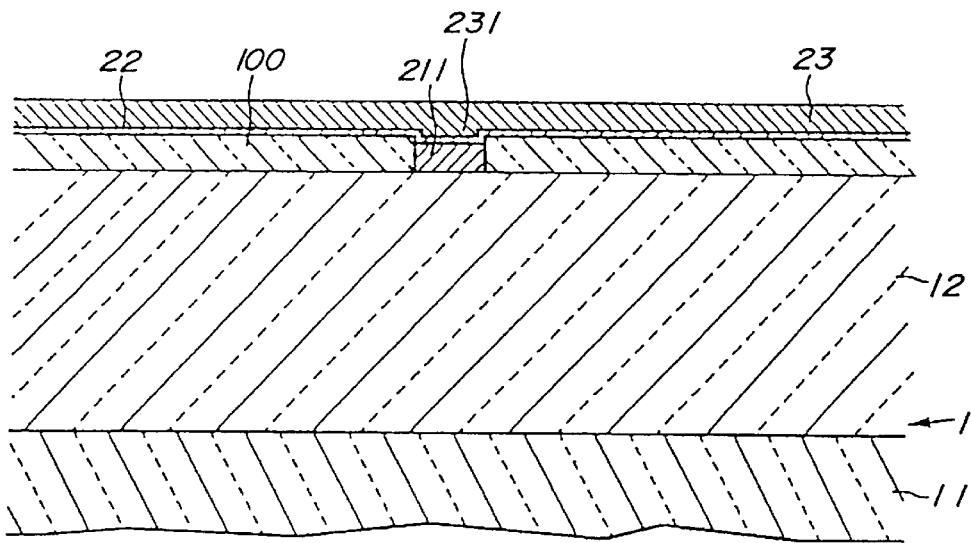
FIG_86

FIG_87
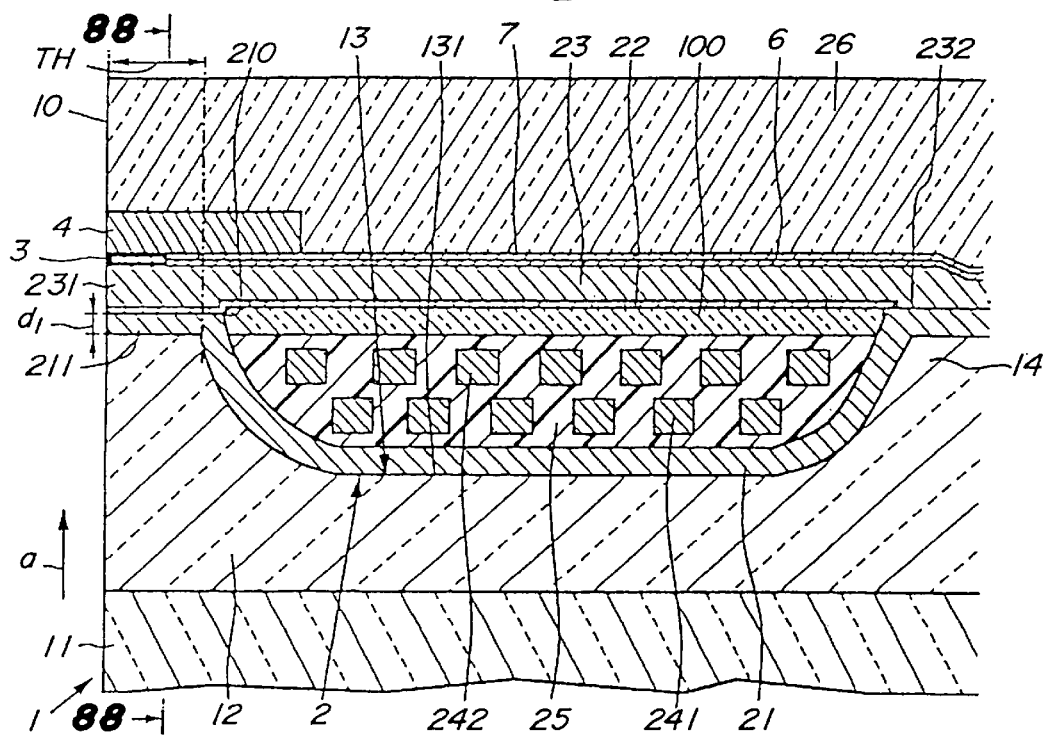
FIG_88
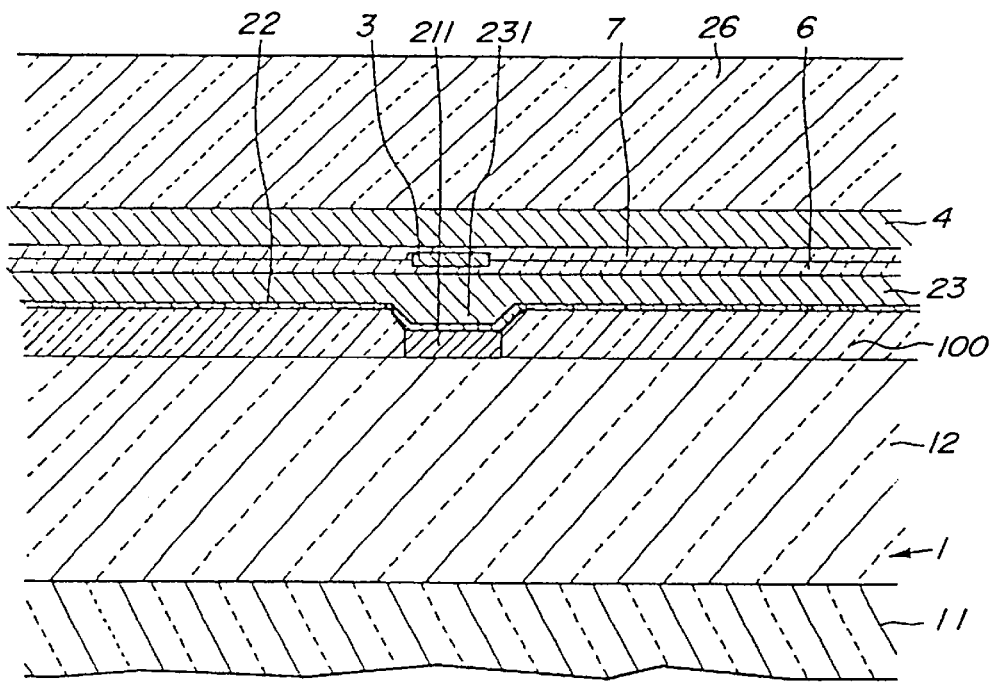

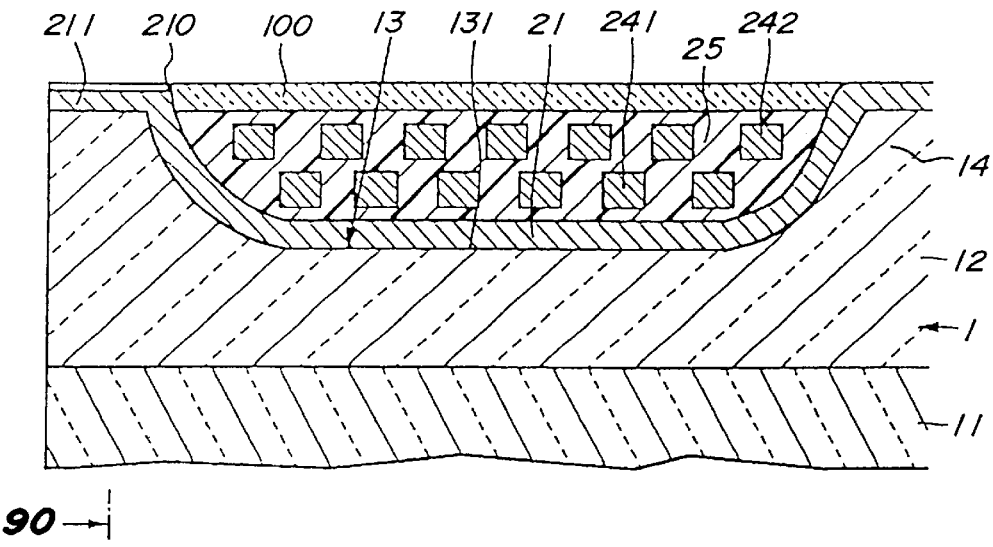
FIG_89
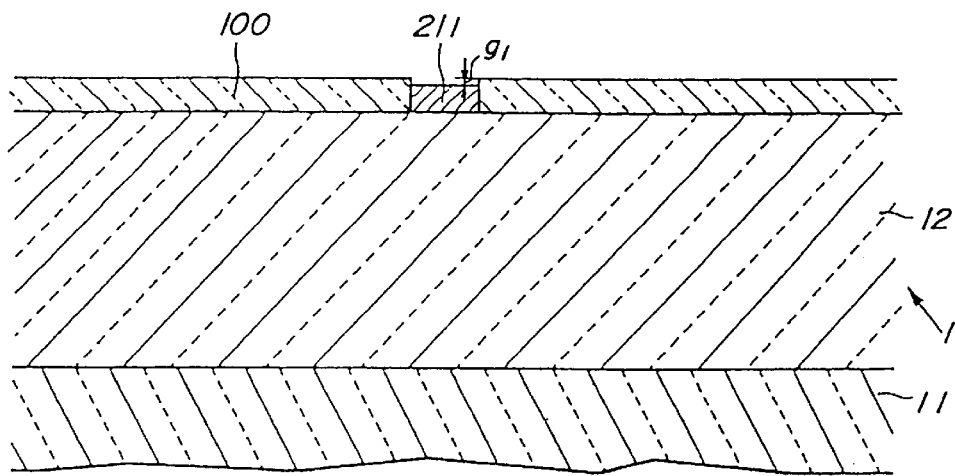
FIG_90

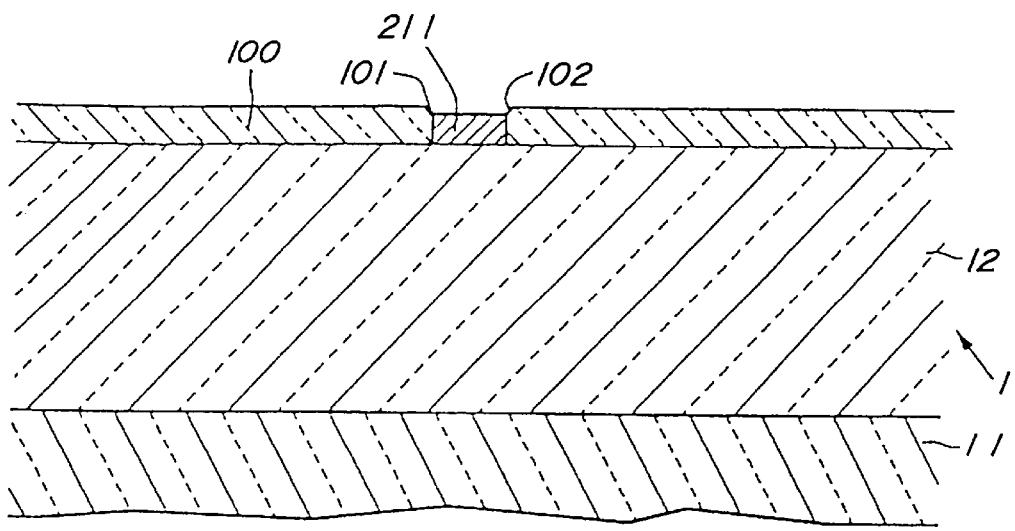
FIG_91

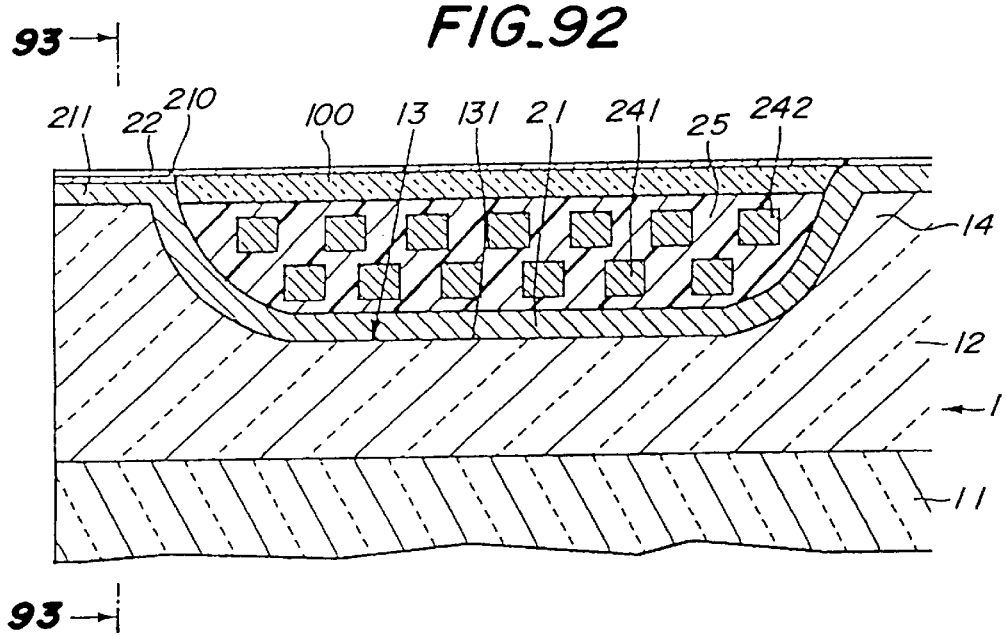
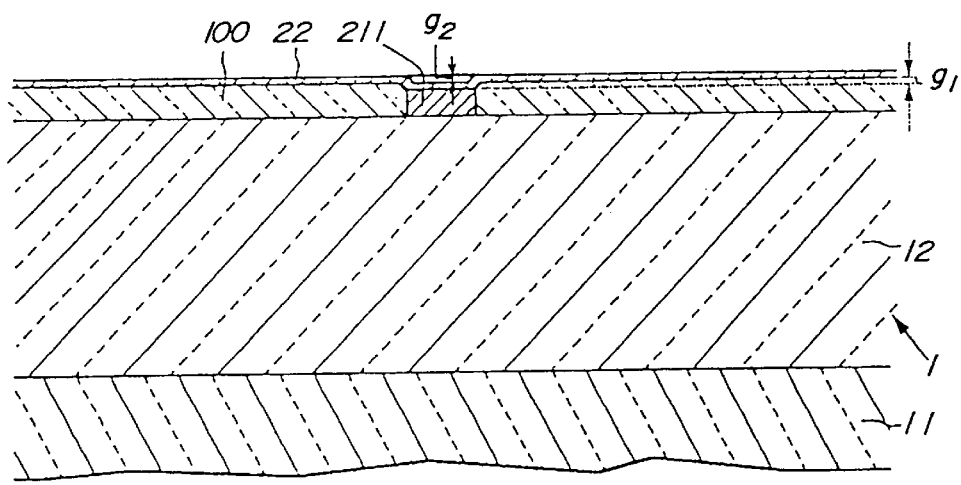

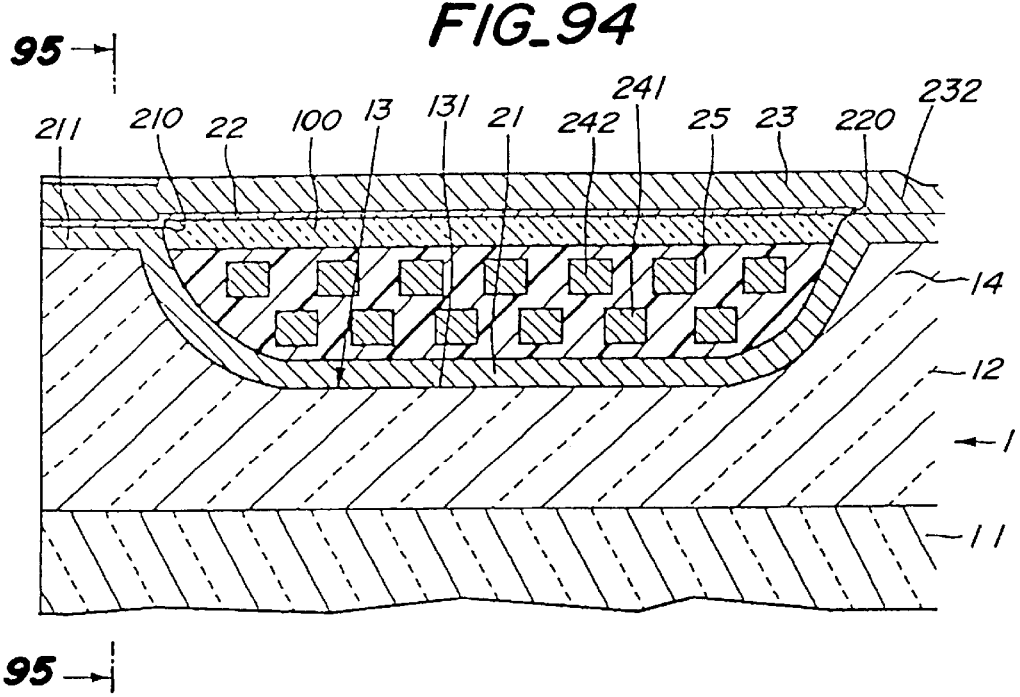
FIG_94
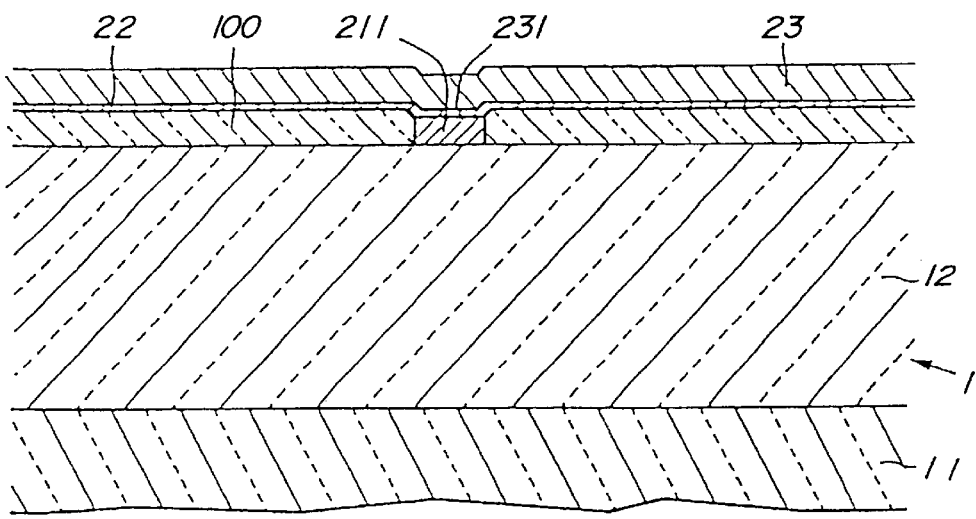
FIG_95

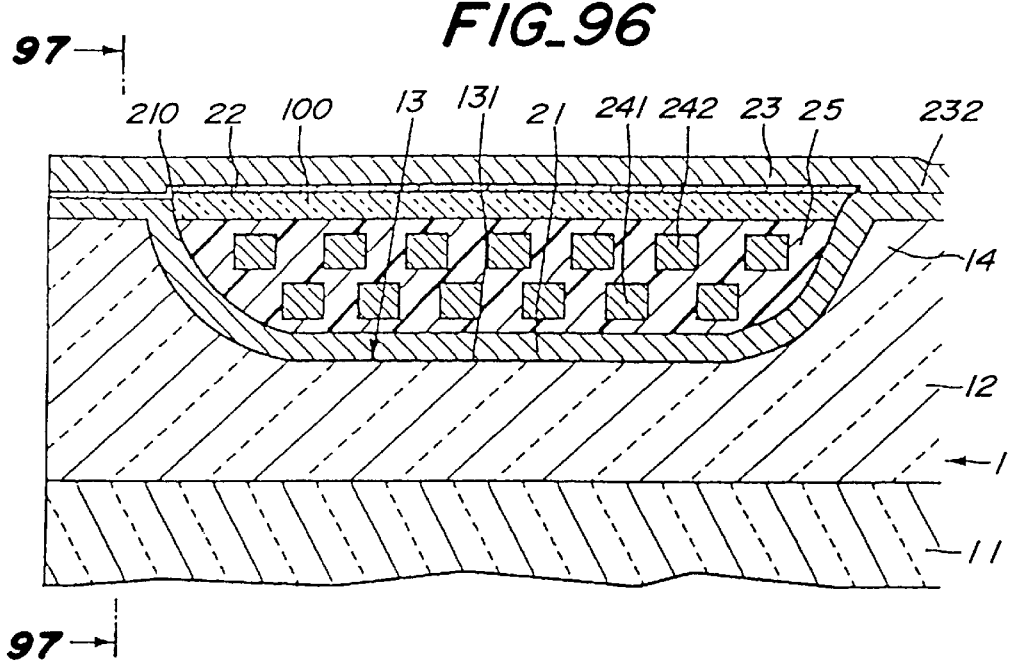
FIG_96
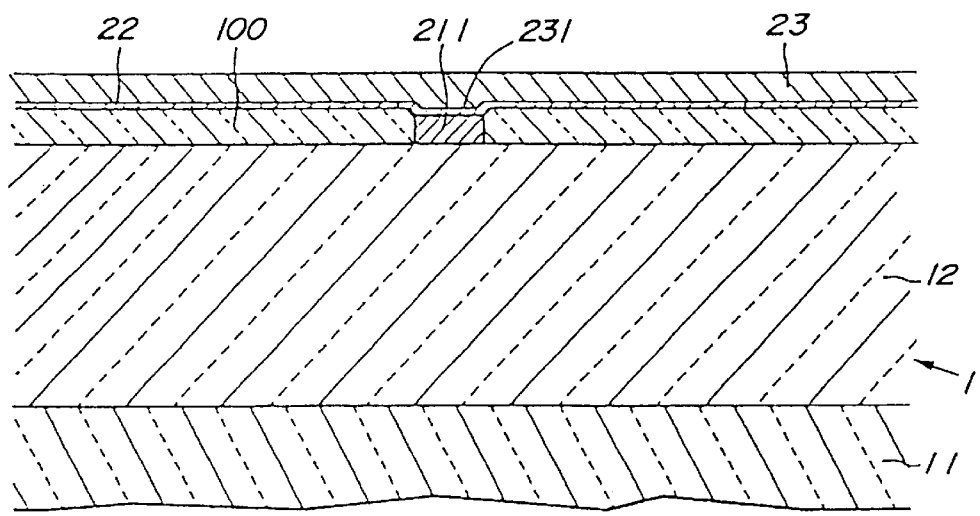
FIG_97

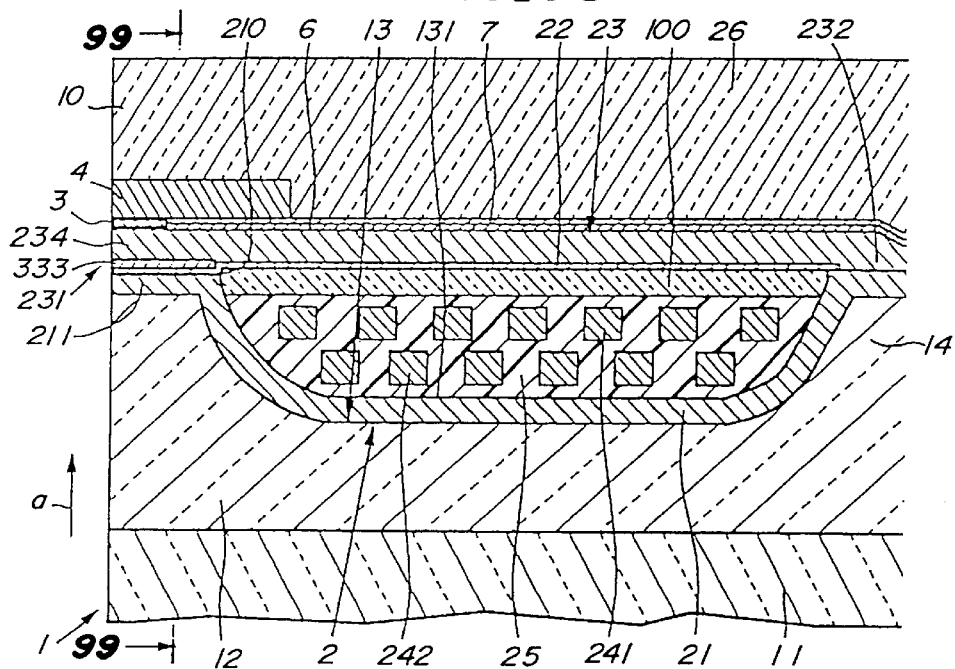
FIG_98
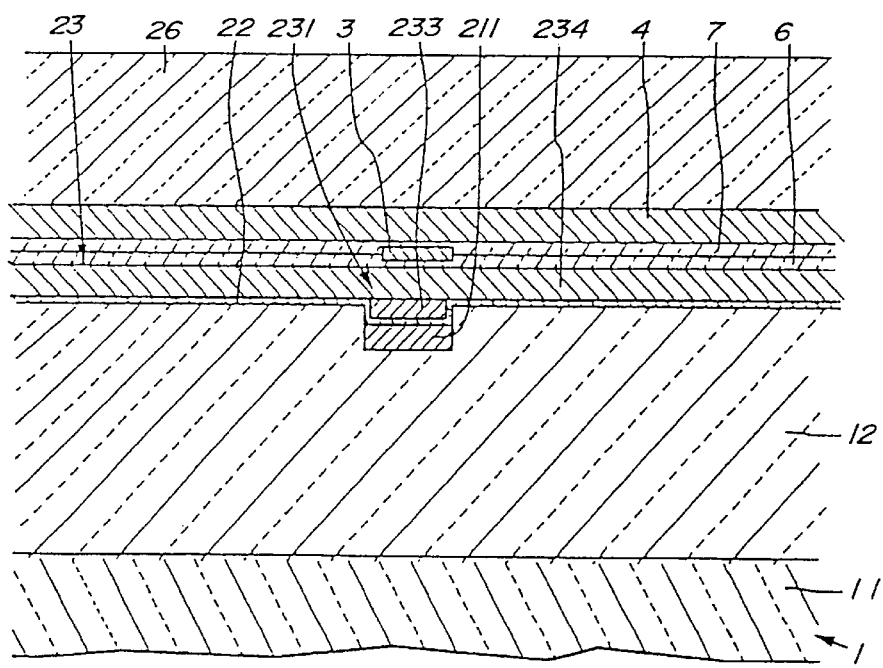
FIG_99

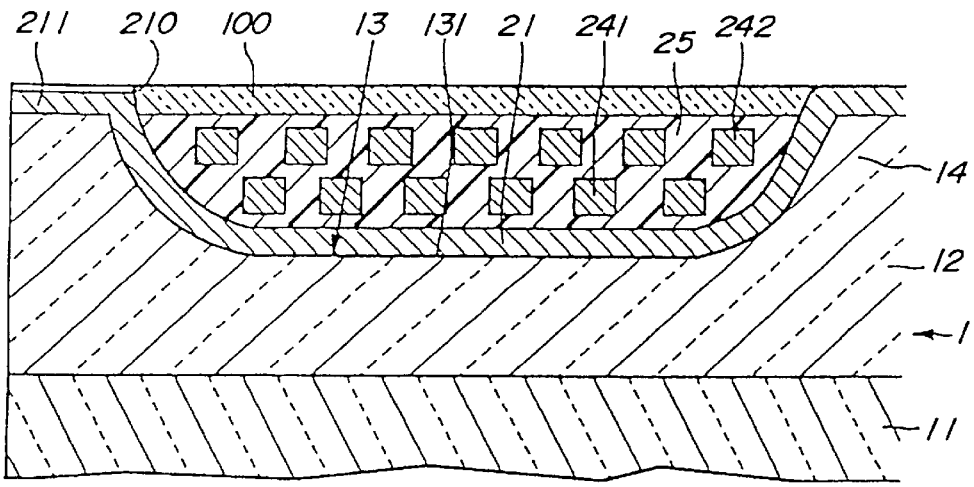
FIG_100
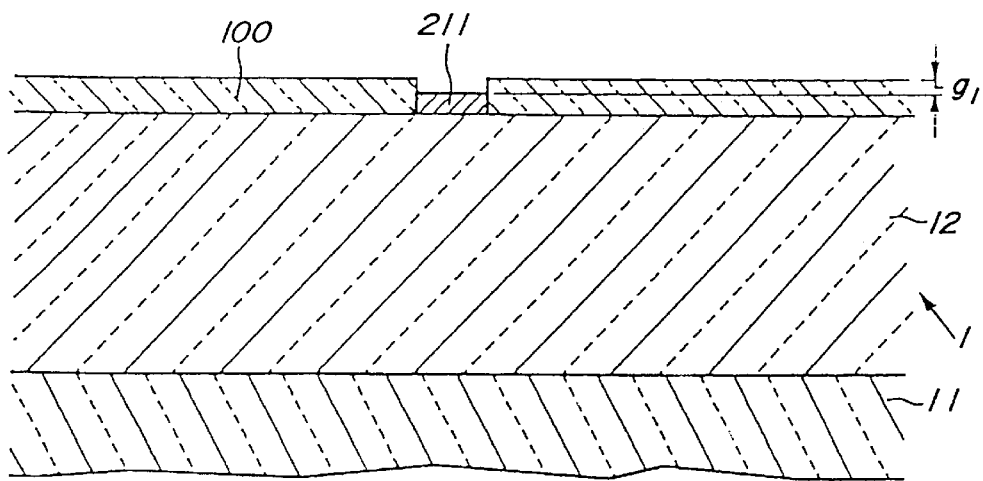
FIG_101

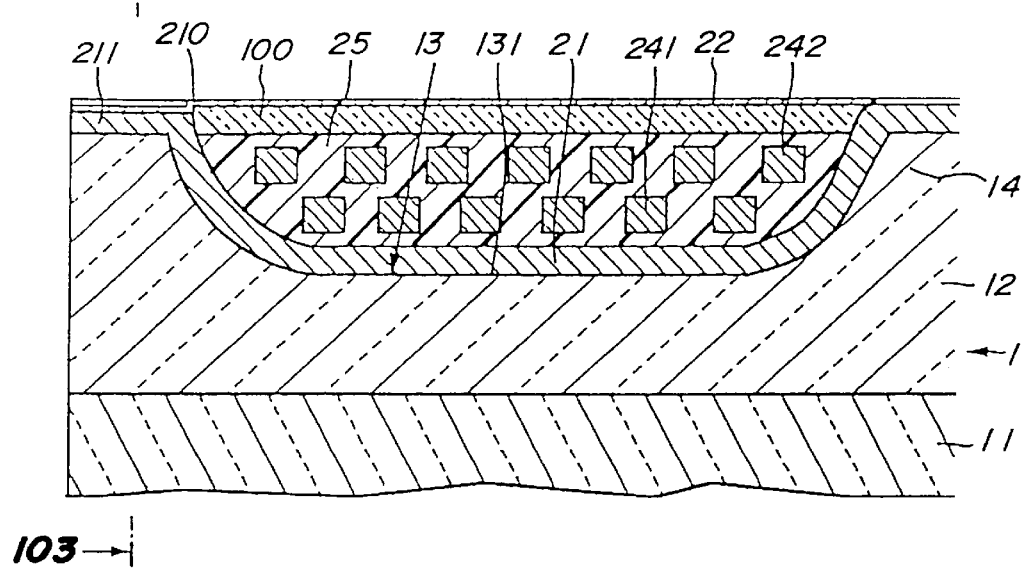
FIG_102
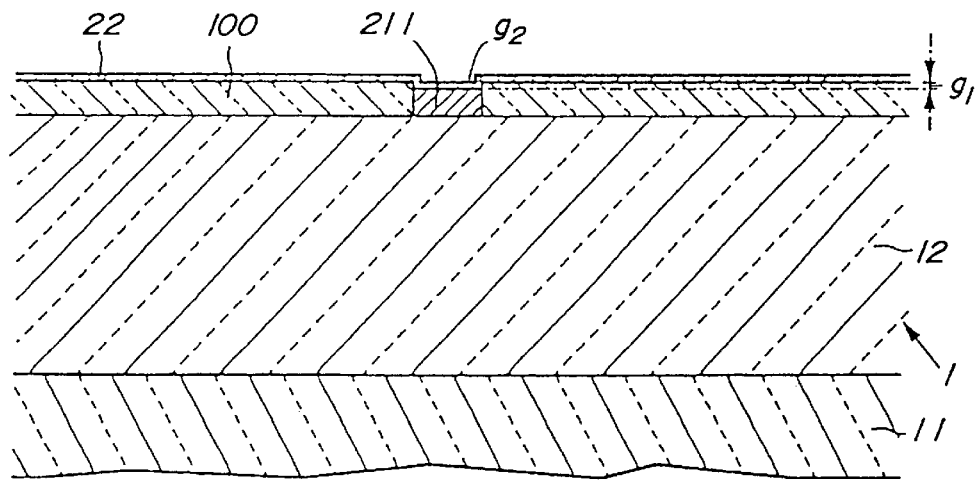
FIG_103

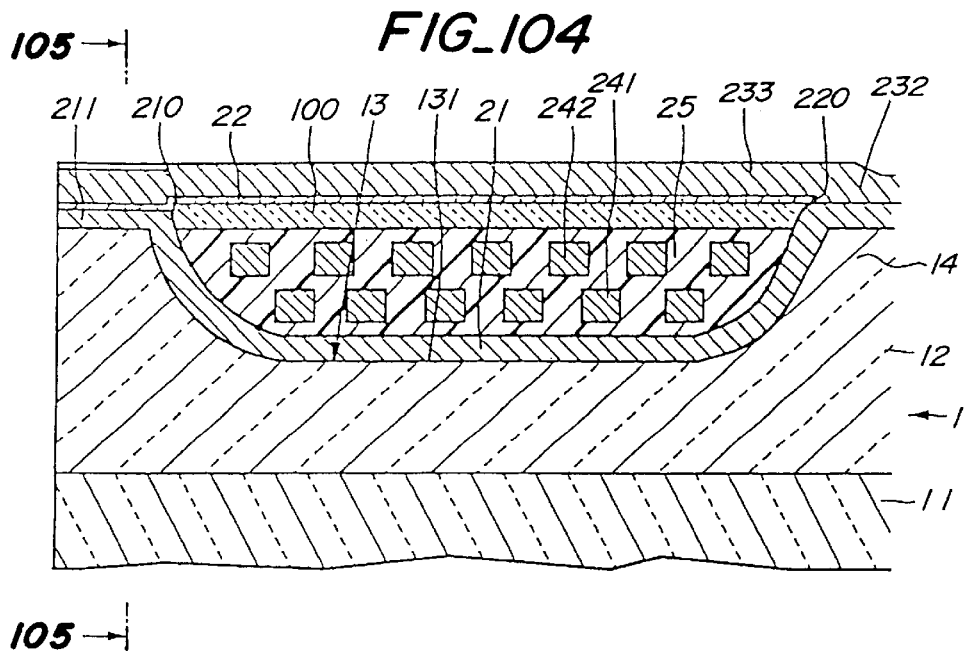
FIG_104
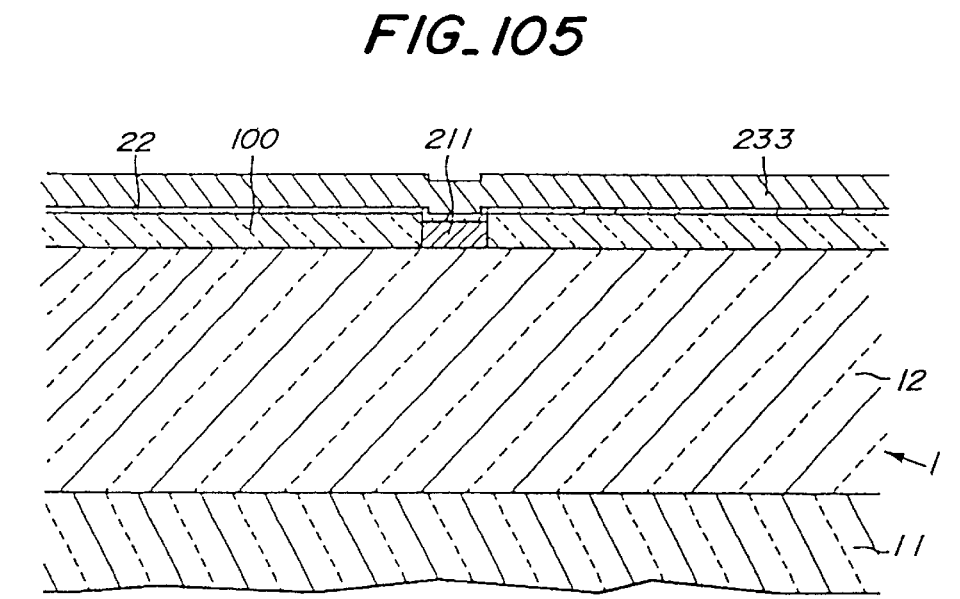
FIG_105

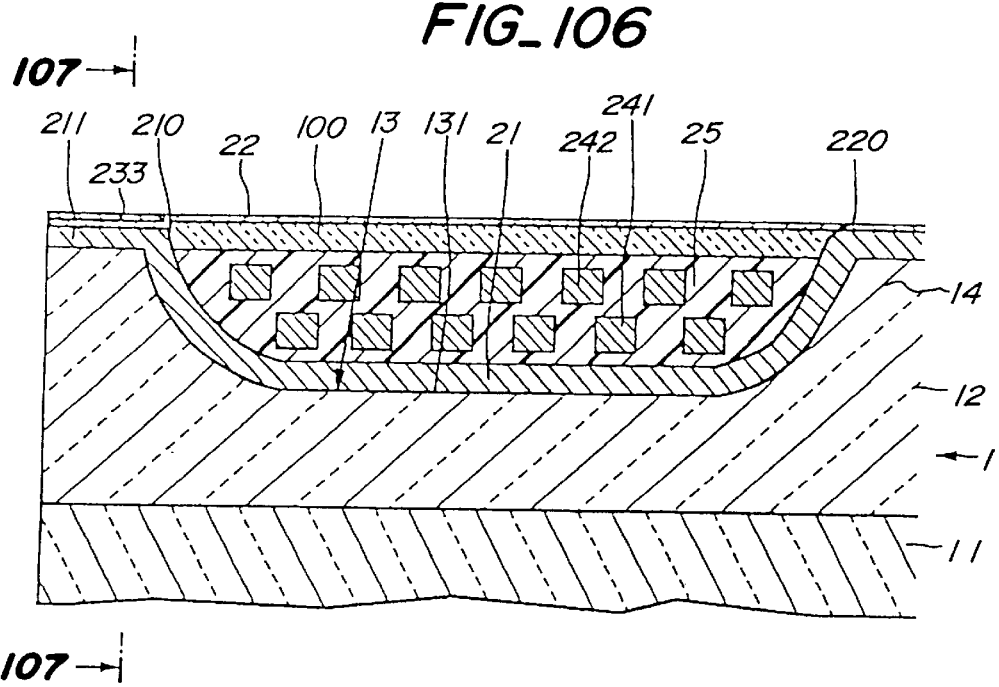
FIG_106
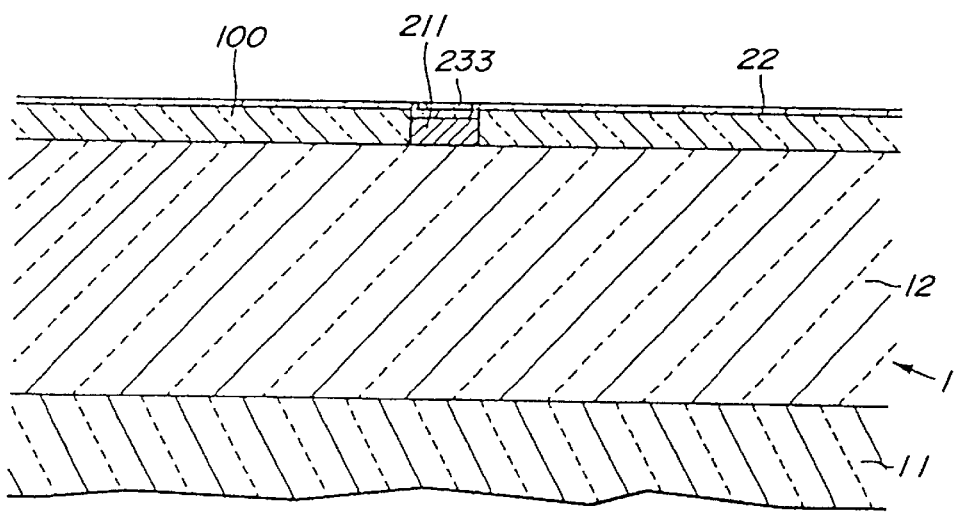
FIG_107

FIG_108
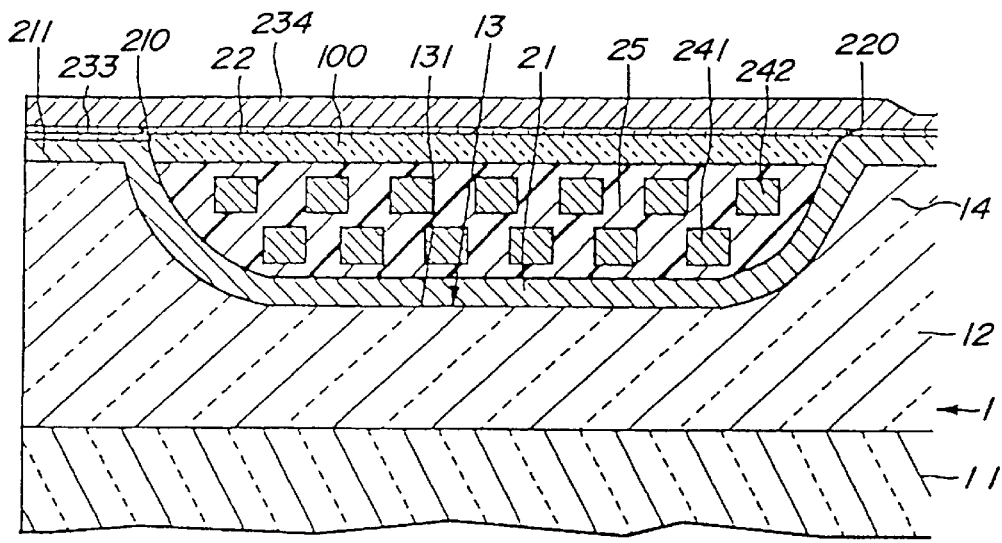
FIG_109
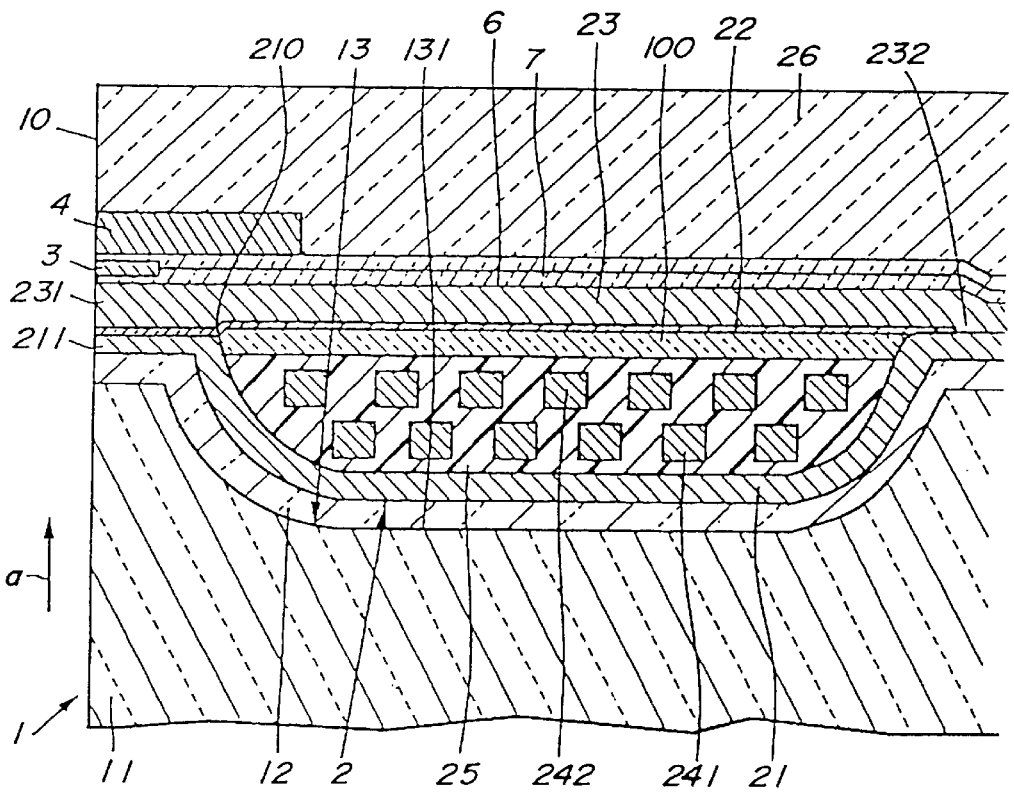

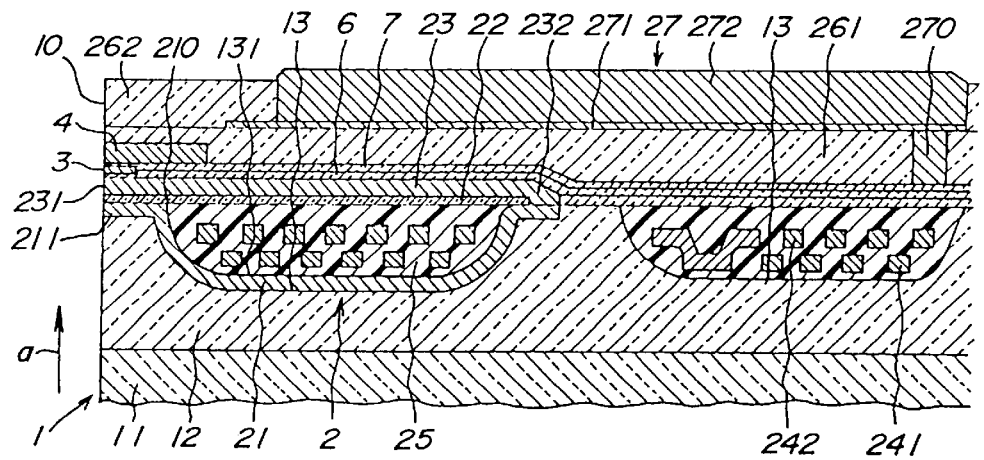
FIG_110
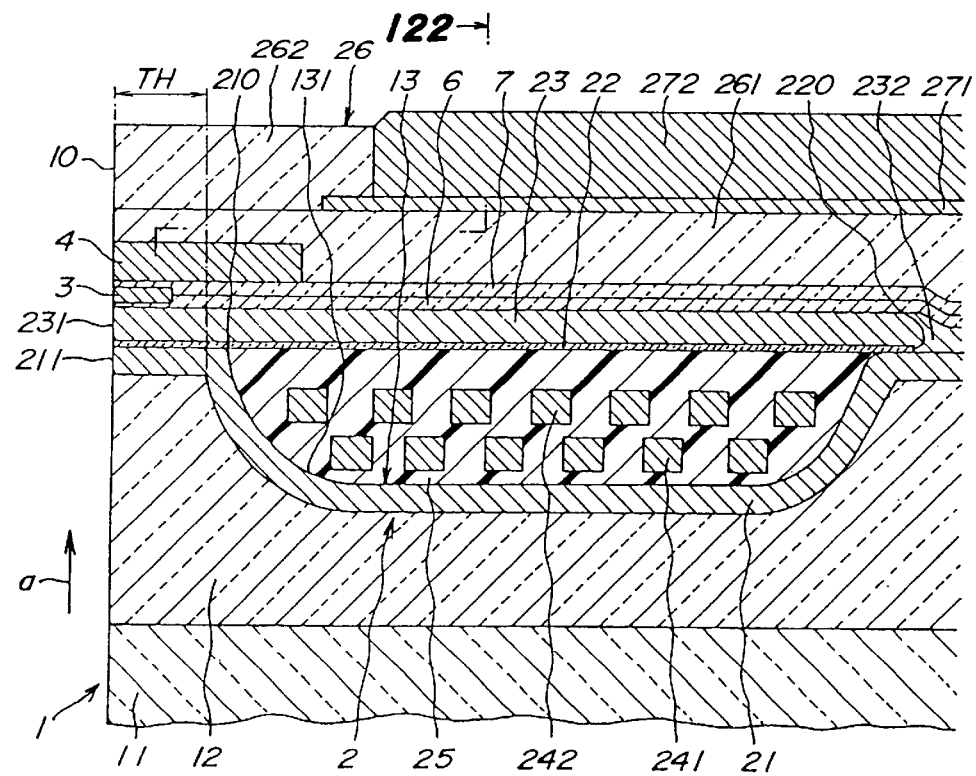
FIG_111

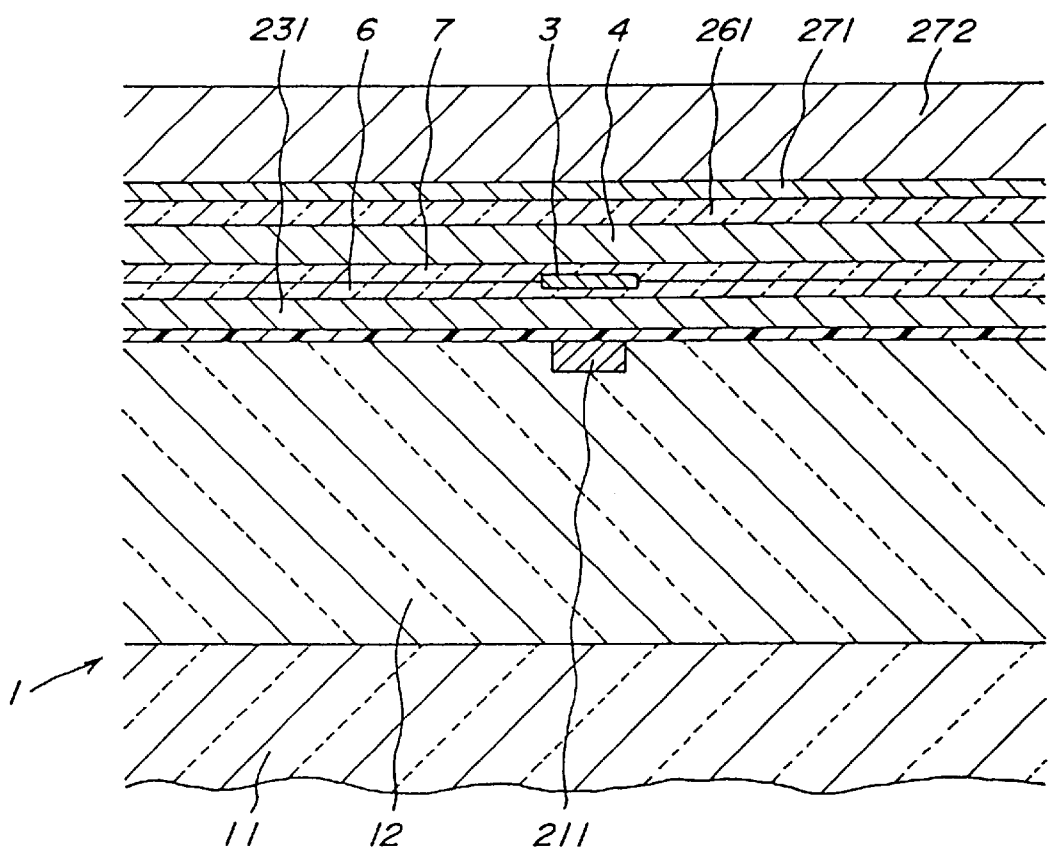
FIG_112

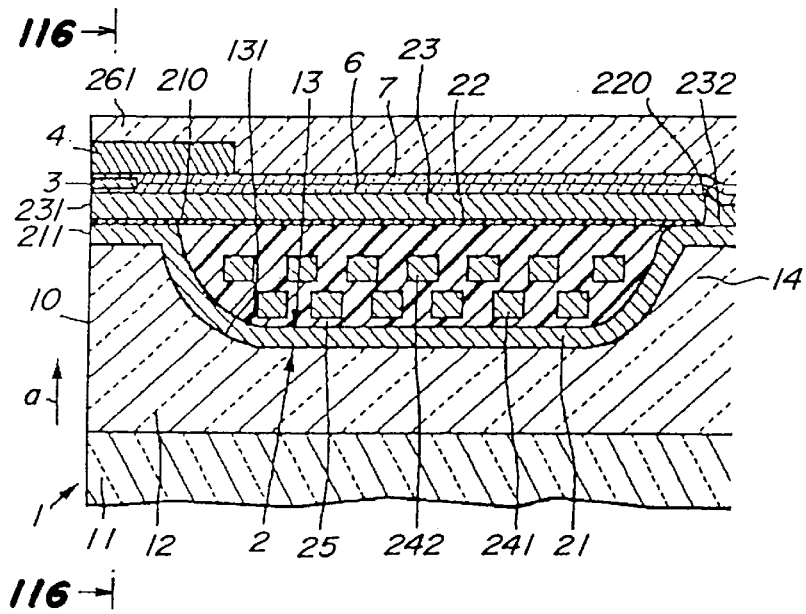
FIG_115
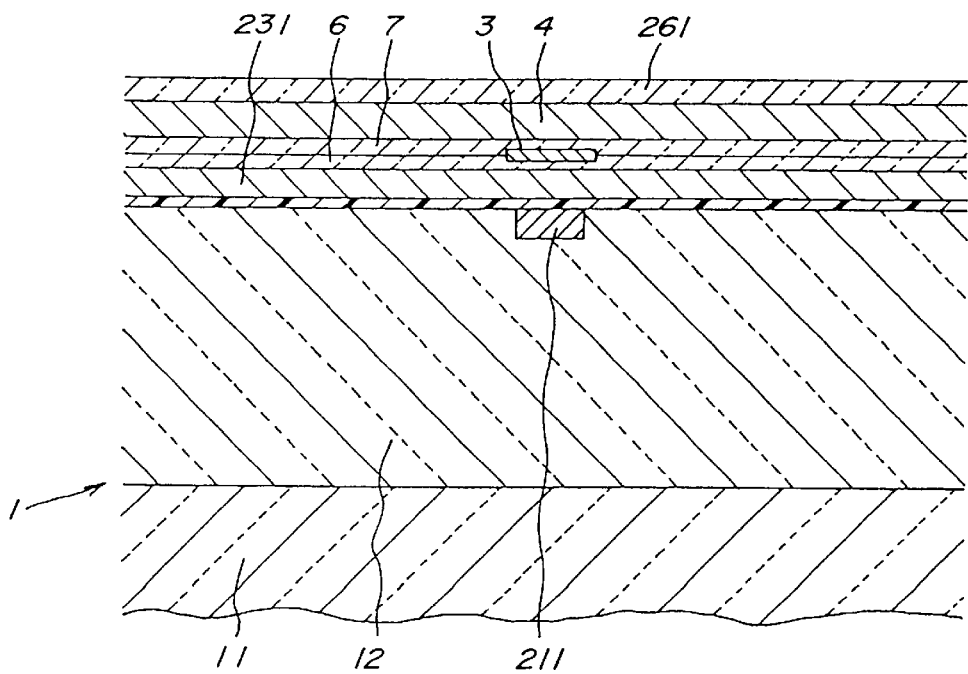
FIG_116

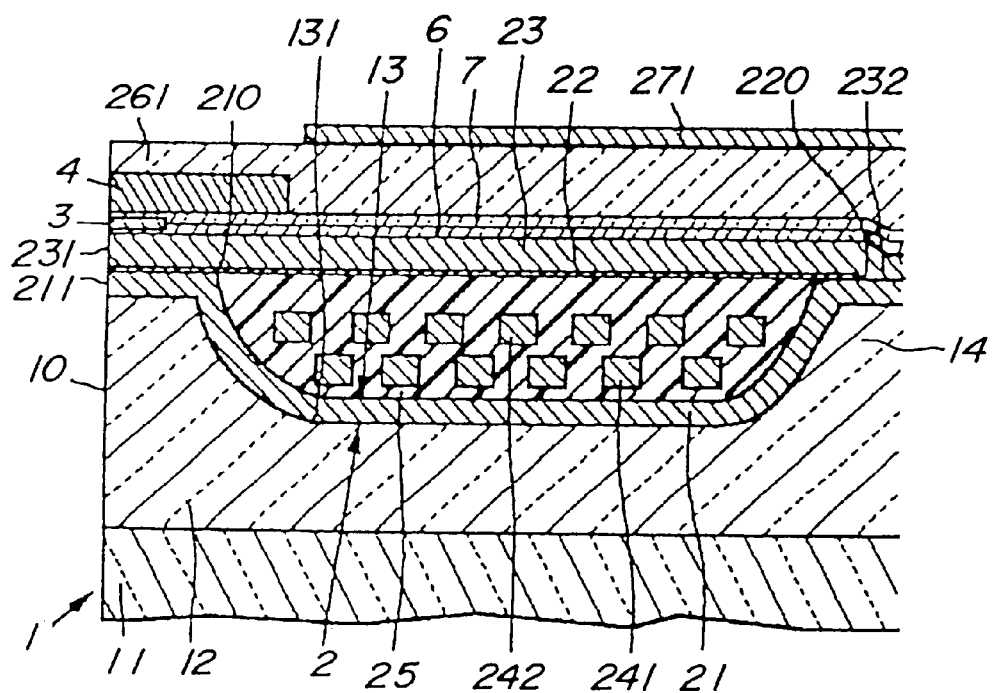
FIG_117

FIG_118
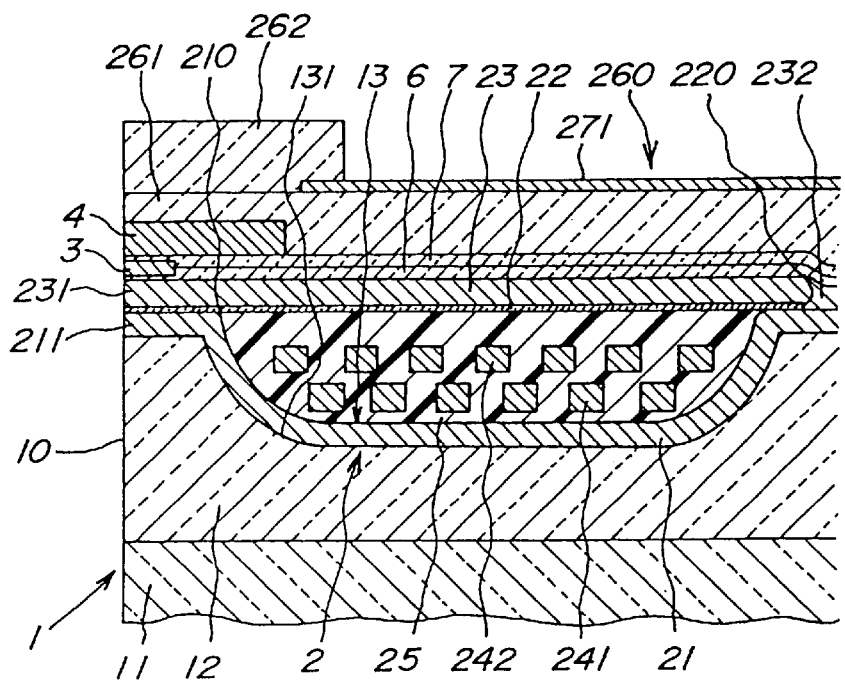
FIG_119
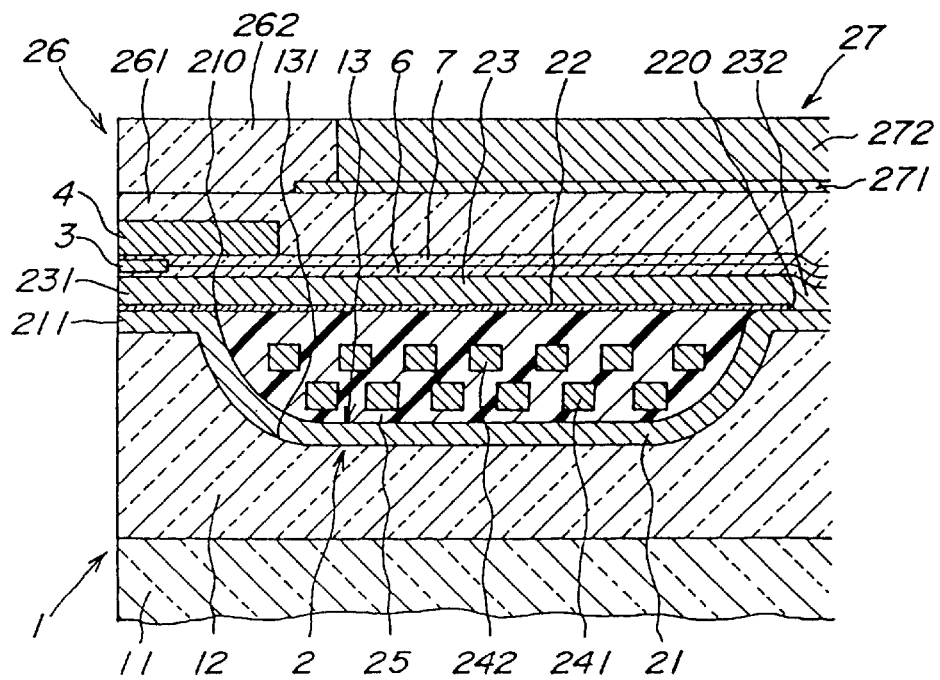

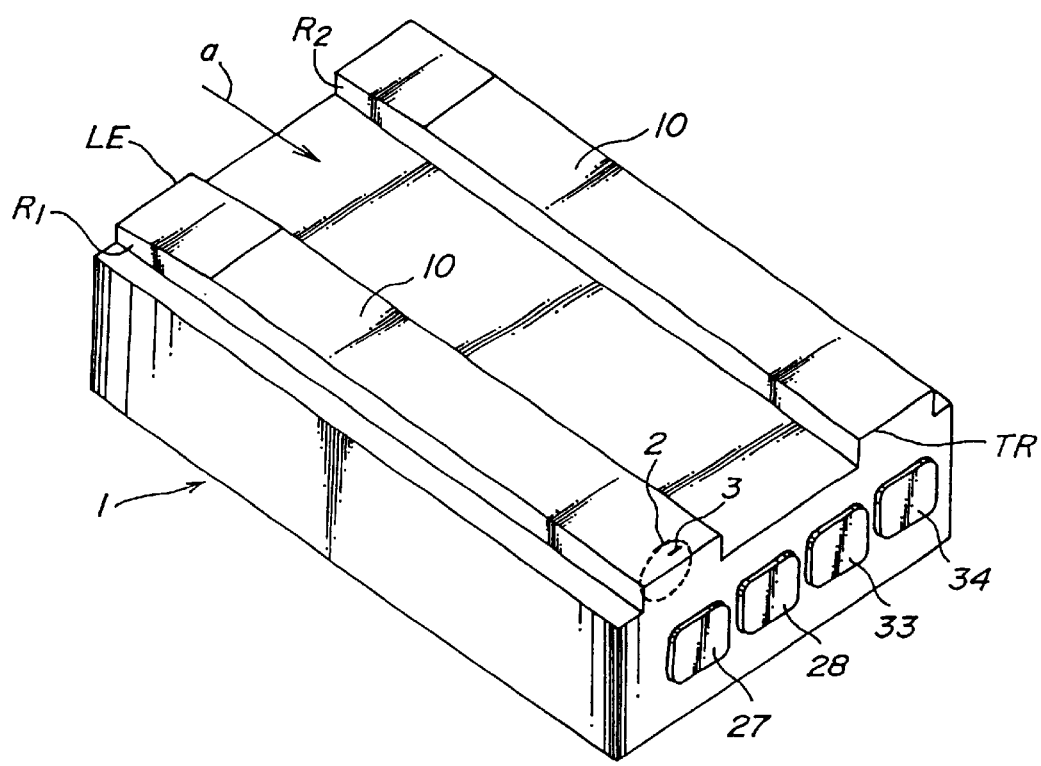
FIG_120

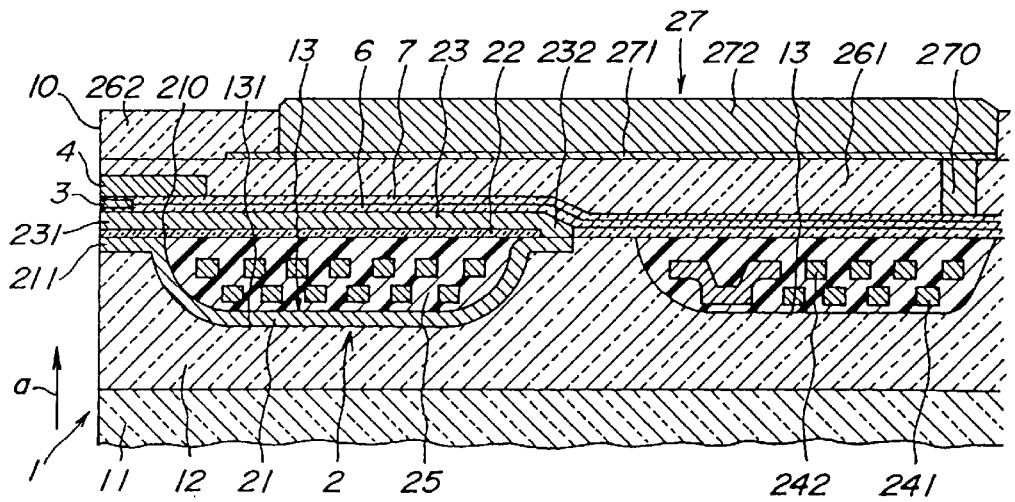
FIG_121
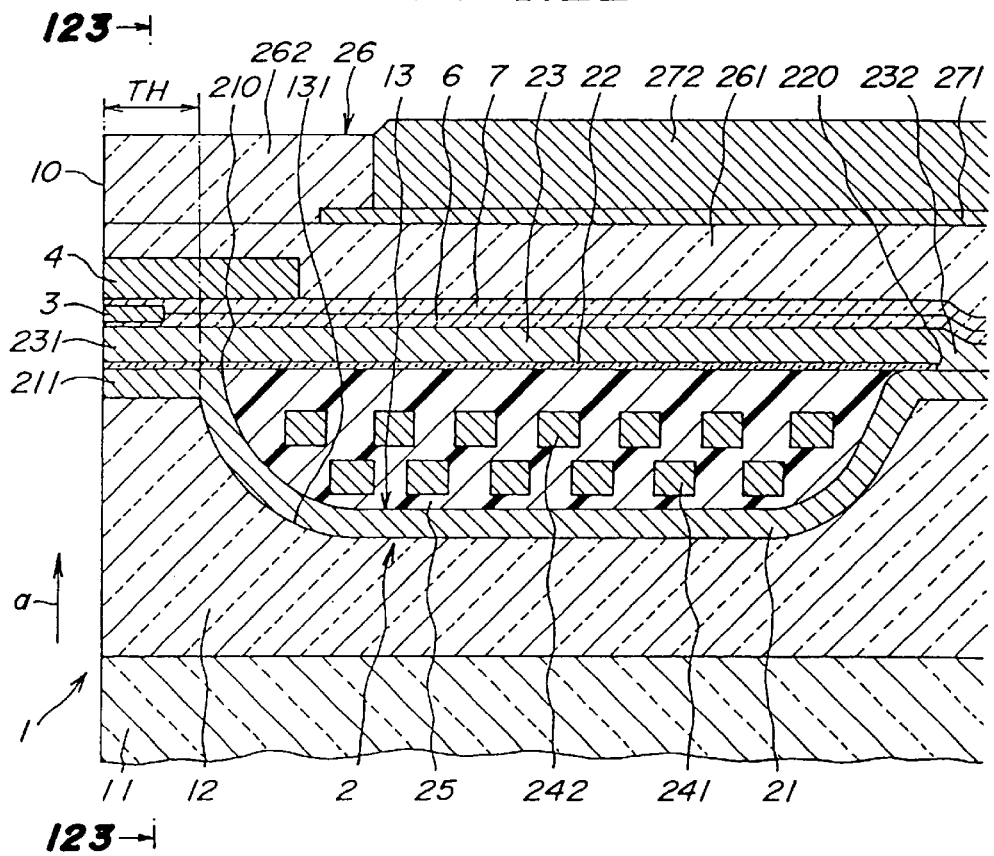
FIG_122

FIG_123
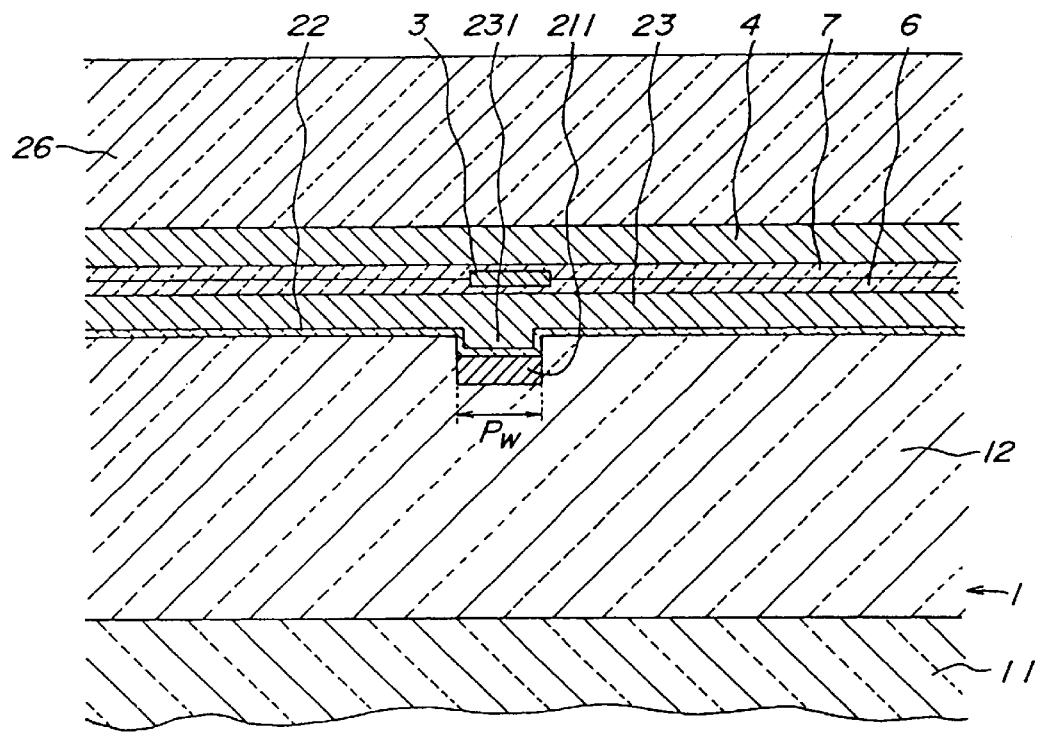
FIG_124
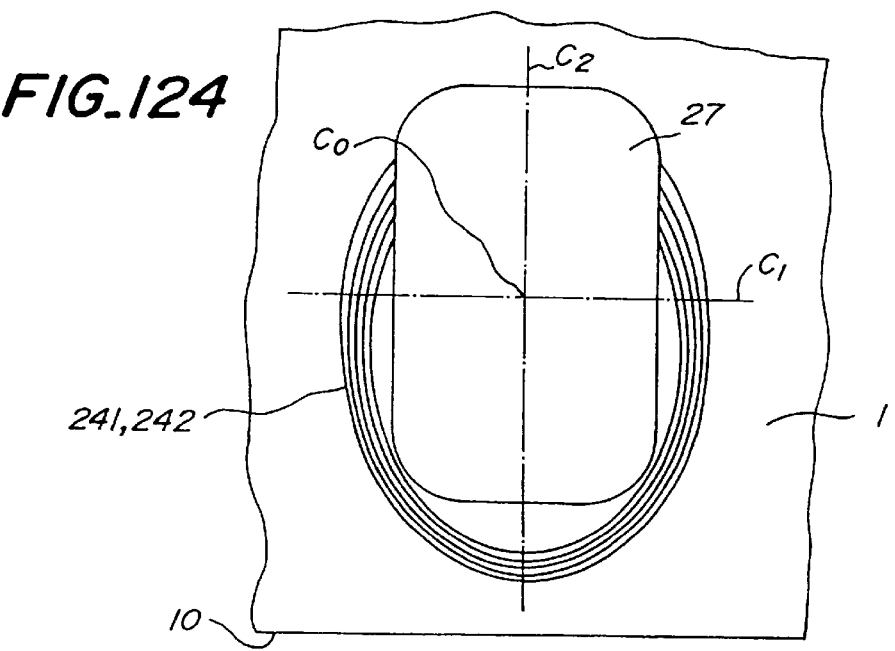

FIG_125
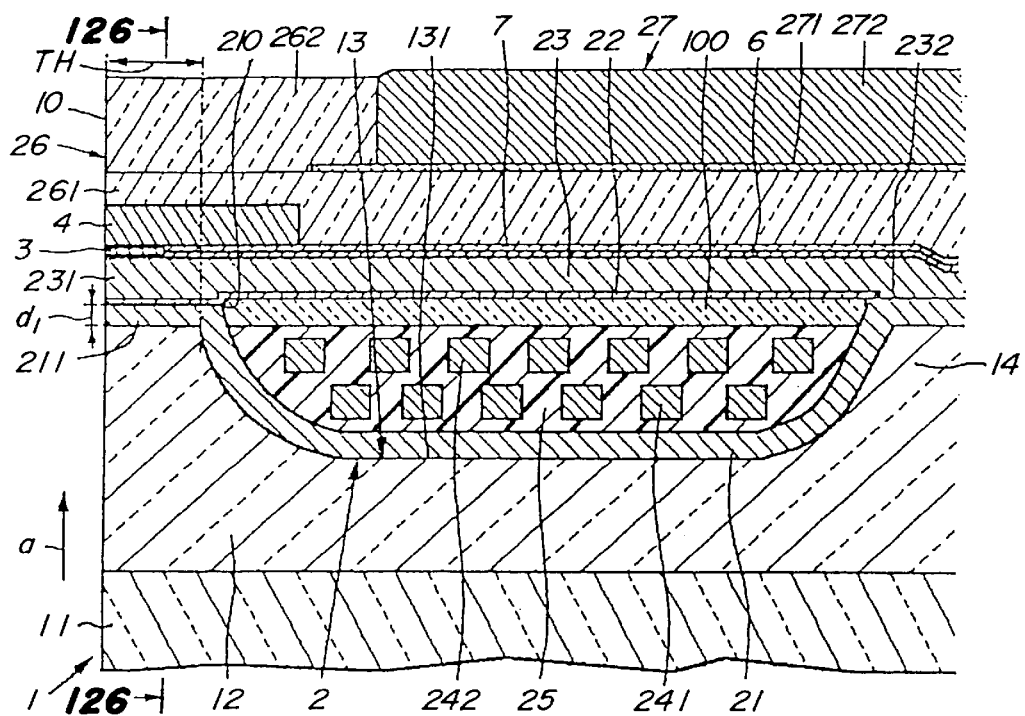
FIG_126
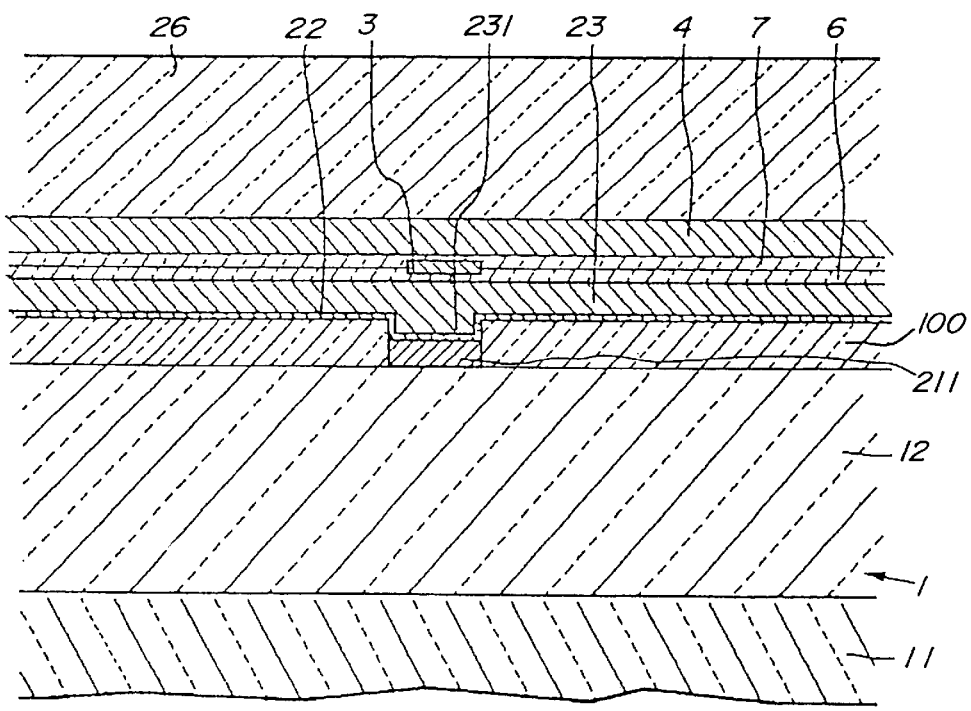

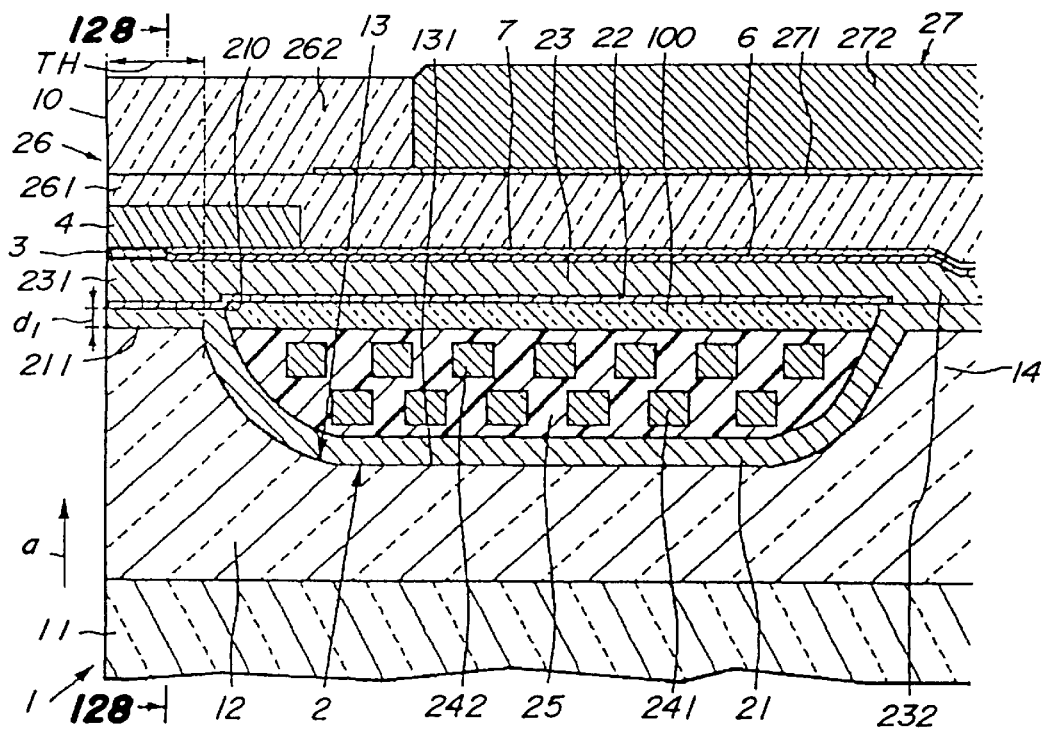
FIG_127
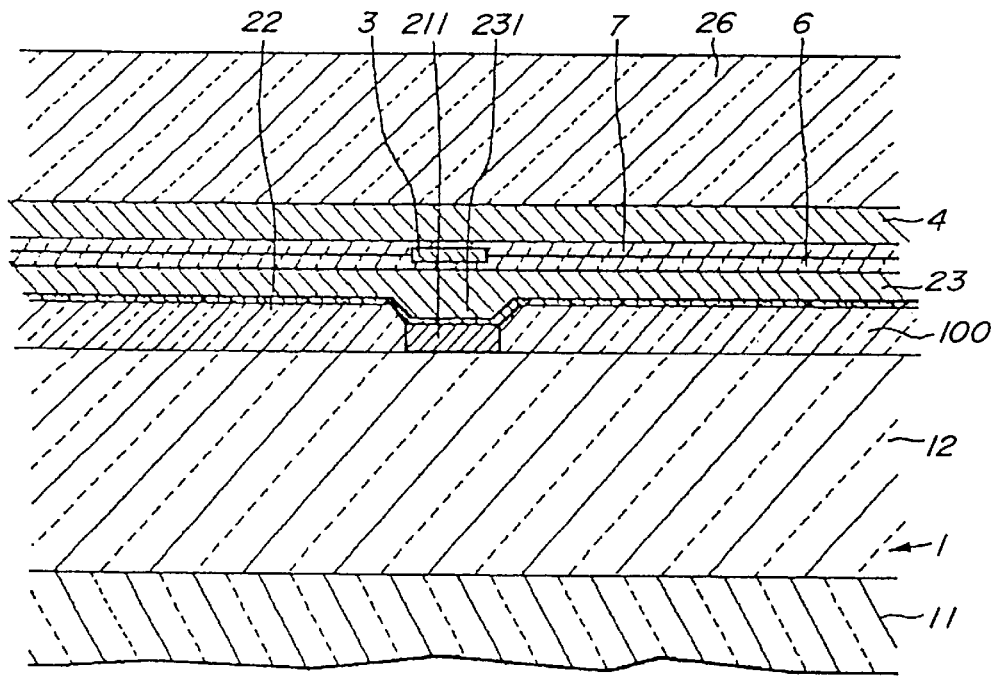
FIG_128

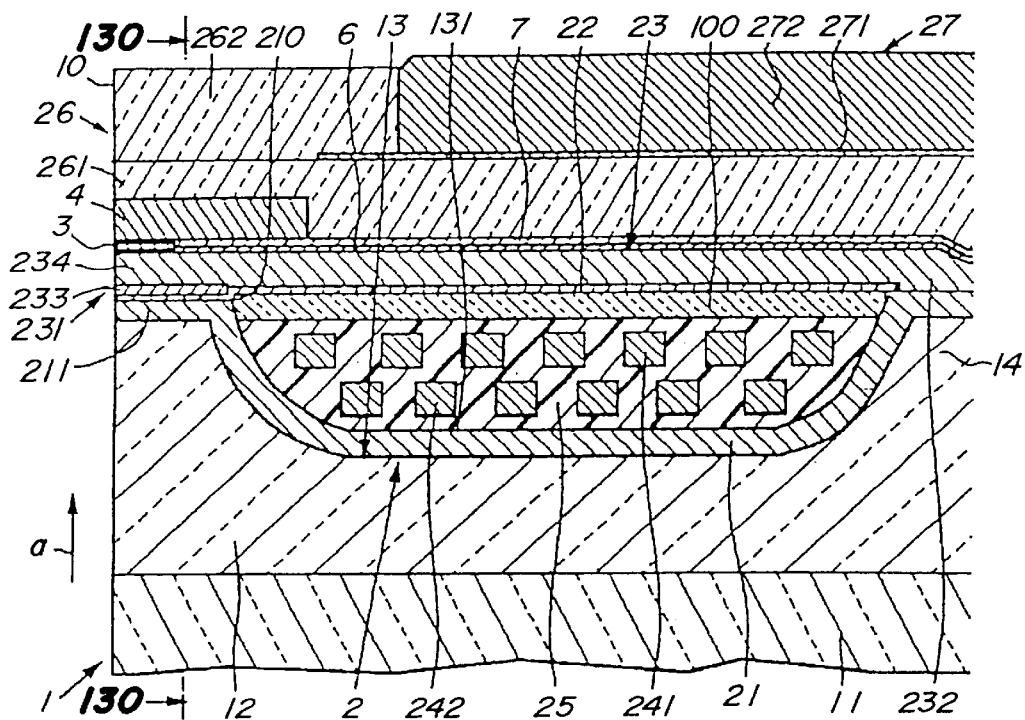
FIG_129
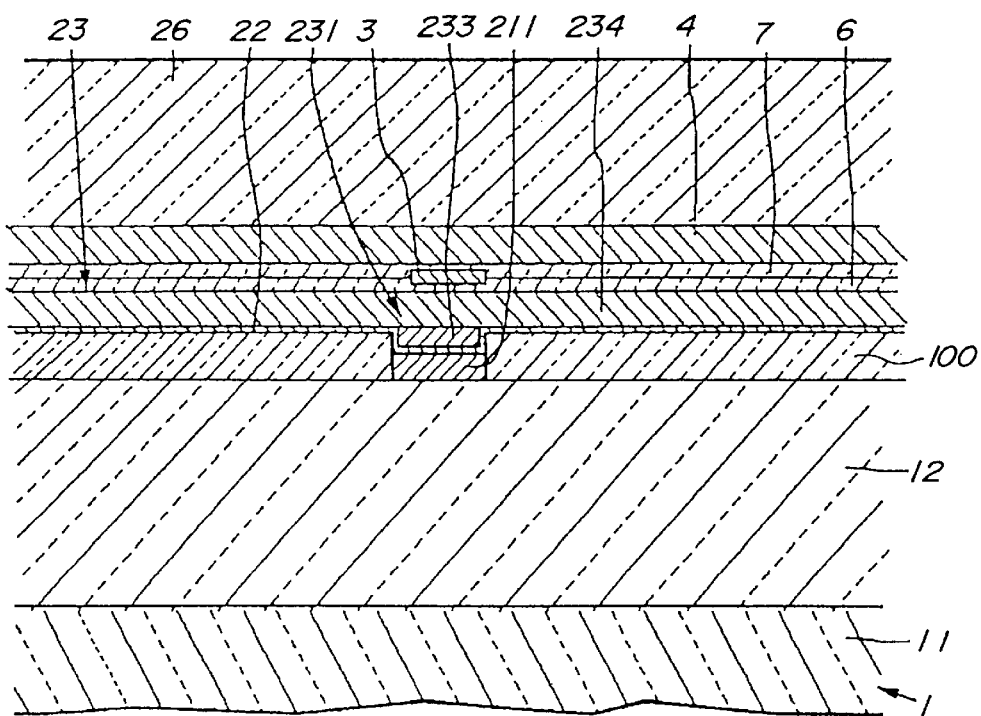
FIG_130

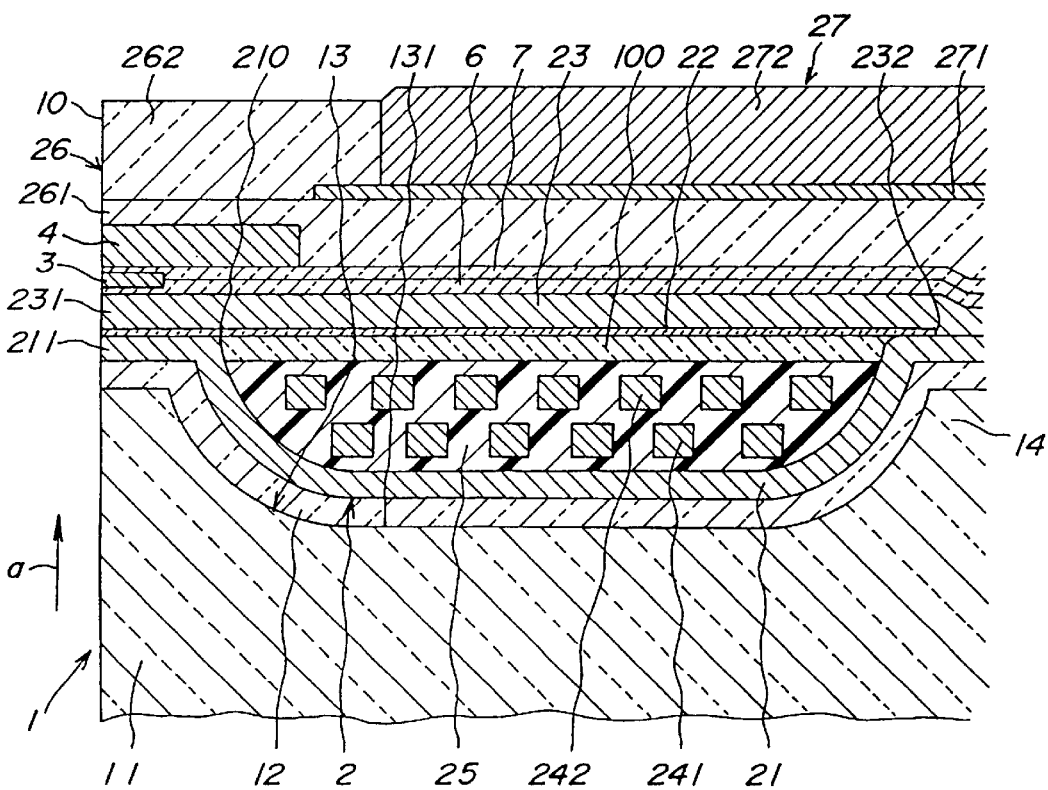
FIG_131

INVERTED HYBRID THIN FILM MAGNETIC HEAD AND METHOD OF MANUFACTURING THE SAME

BACKGROUND OF THE INVENTION

1. Field of the Invention

The present invention relates to a thin film magnetic head comprising a substrate made of an electrically insulating and non-magnetic material, and an inductive magnetic converting element including first and second magnetic films each having pole portions provided in the vicinity of an air bearing surface and being magnetically coupled at portions remote from the air bearing surface, a gap film arranged between the first and second magnetic films at least at the pole portions, and a thin film coil having a portion provided between said first and second magnetic films.

The present invention also relates to an inverted hybrid or composed type thin film magnetic head, in which an inductive magnetic recording element is provided on a substrate and a magnetoresistive reading element is arranged on the inductive recording element.

2. Related Art Statement

A hybrid type thin film magnetic head including a inductive recording element and a magnetoresistive reading element has been known from, for instance Japanese Patent Application Publication No. 59-35088 and U.S. Pat. No. 3,908,194. In this known thin film magnetic head, the magnetoresistive reading element is provided on a substrate and the inductive recording element is provided on the magnetoresistive reading element. However, this structure has various problems particularly in a view point of the mass production. Hereinafter, the inductive recording element is sometimes called the inductive element and the magnetoresistive reading element is often called the MR element for the sake of simplicity.

In the known structure in which the inductive element is provided on the MR element, the previously manufactured MR element is subjected to all process steps for manufacturing the inductive element. This causes a serious decrease in characteristics, reliability and manufacturing yield of the magnetic head.

In order to realize a hybrid type thin film magnetic head which can offer a high surface recording density, it is desirable to form the MR element by a giant magnetoresistive (GMR) film such as spin bulb film, super lattice film and granular film, instead of a normal anisotropic magnetoresistive film. Such a GMR film is liable to be damaged by a thermal treatment during the formation of the inductive element and an output of the MR element is reduced to a large extent. For instance, in a spin bulb film including an alternate stack of magnetic layers of Ni—Fe and non-magnetic layers of Cu, at a temperature of about 200–250° C. which is usually employed for manufacturing the inductive element, Ni and Cu atoms are mutually diffused and the stacking structure of the spin bulb film is destroyed.

An over-write property of the inductive element is largely dependent upon an apex angle of an coil supporting and isolating insulating film for supporting the thin film coil such that conductive turns thereof are isolated from each other, and upon a throat height of the pole portion. Therefore, in order to improve the stability, reliability and yield, it is very important to control precisely said apex angle and throat height.

Particularly, in order to improve the manufacturing yield of the thin film magnetic head, not only the above mentioned throat height of the inductive element, but also an MR height of the MR element have to be formed precisely. As is well known in the art, the throat height and MR height are determined by a position of the lowermost insulating layer of the coil supporting and isolating insulating film and a working precision of an air bearing surface which is opposed to a magnetic recording medium with a very small space during the recording and reading. For the sake of simplicity, hereinafter the air bearing surface is called ABS. In the known hybrid type thin film magnetic head having the inductive element formed on the MR element, in order to obtain desired throat height MR height precisely corresponding to designed values, it is necessary to perform a mask alignment for the formation of the lowermost insulating layer with a minimum alignment error with respect to the already formed MR film. However, the MR film has very small thickness such as several hundreds Å and a pole portion of a relatively thick first magnetic film of the inductive element is formed on the MR film, a contour of the MR film could not be seen clearly during the mask alignment. Therefore, the precise mask alignment for the lowermost insulating layer could be carried out only with difficulty. It should be noted that the mask alignment for the lowermost insulating layer is also important for obtaining a desired throat height.

In order to mitigate the above problem of the mask alignment, an alignment pattern may be formed and the mask alignment may be performed with respect to this pattern. However, in this case, an alignment error of the alignment pattern is introduced, and thus the mask alignment for the lowermost insulating layer could not be carried out precisely. Furthermore, the manufacturing process becomes complicated and cost is increased.

Usually the thin film coil has a plurality of coil layers, and after a coil layer is formed, its insulating layer, e.g. photoresist is subjected to a heat treatment at a temperature of about 250° C. for forming a flat surface. This flat surface of the insulating layer is required for forming a next coil layer. During this heating process, the photoresist is softened or melt and its pattern size is varied largely. Moreover, when a patterning for forming a coil layer is conducted by milling, a pattern of the coil supporting and isolating insulating film constituting a positional reference for the MR element is etched again, and the retardation of pattern occurs. When such a variation of the pattern in the insulating layer occurs, even if the photomask for the photoresist is aligned precisely, a positional relationship of the photoresist with respect to the MR element might be changed. The variation of the photoresist pattern might amount to 0.5–0.6 μm when a thickness of the photoresist is large. Particularly, a hybrid type thin film magnetic head for high frequency has been required to have the throat height not longer than 1.00 μm. Therefore, it is necessary to control precisely the variation of the photoresist pattern in the order to sub-microns.

The known technique including a large variation in the photoresist pattern could not meet such a requirement, and many thin film magnetic heads whose inductive and/or magnetoresistive element have not desired properties are wasted after a polishing process for forming the ABS.

The known hybrid type thin film magnetic head has encountered another problem. Since after the MR film has been formed, a shield gap film is formed and then a first magnetic film of the inductive element is formed on the shield gap film, a pole portion of the first magnetic film could not have a flat surface due to the MR film and shield gap film. When a second magnetic film is formed on the first magnetic film via the writing gap film, the pole portion of the second magnetic film also could not have a flat surface. Such non-flat pole portions results in a degradation in a high frequency property of the inductive recording element. In order to avoid such a degradation, in the known manufacturing method, after forming the first magnetic film, a planarizing process is performed by a chemical-mechanical polishing (CMP) which has been known in the semiconductor device manufacturing technique. This planarizing process apparently increases the manufacturing cost and time.

In Japanese Patent Laid-open Publication Kokai Hei 3-263603, there is proposed a inverted or reversed type thin film magnetic head, in which a magnetoresistive reading element is formed on an inductive recording element. However, this-prior art publication does not teach a structure suitable for alignment between the MR element and the photoresist supporting the thin film coil, and does not disclose a useful technique for suppressing the variation of the photoresist pattern.

Moreover, in the thin film magnetic head including the inductive recording element, in order to attain a high surface record density as well as an excellent high frequency property, it is necessary to minimize a width of the pole portions of first and second magnetic films. For instance, in Japanese Patent Application Laid-open Publication, Kokai Hei 3-263603, there is described a method of minimizing a width of the pole portions of the first and second magnetic films. In this known method, after the ABS has been obtained by polishing, tips of the pole portions of the first and second magnetic films exposing to the ABS are etched to reduce a width of the pole portions. However, such a known method could not be practically used. In order to manufacture thin film magnetic heads on a mass scale in an efficient manner, a width of the pole portions of first and second magnetic films has to be minimized during the manufacture of the inductive element.

In the thin film magnetic film of the type mentioned above, in order to attain a stability of floating posture, to increase the number of thin film magnetic heads which can be manufactured from a single wafer, and to minimize a size of the thin film magnetic head, it is advantageous to reduce a size of a slider as is taught in Japanese Patent Application Laid-open Publication Kokai-Sho 64-21713 and U.S. Pat. No. 4,928,195. However, even if a size of the slider is reduced, each of bonding pads provided on the slider for connecting the magnetic head to an external circuit must have a sufficient surface area for firmly connecting a lead wire thereto. In the hybrid type thin film magnetic head comprising a stack of the inductive recording element and magnetoresistive reading element, it is necessary to provide two bonding pads connected to both ends of a thin film coil and two bonding pads connected to both ends of the MR film. These bonding pads prevent the miniaturization of the slider.

In Japanese Utility Model Application Publication 7-31362, there is described an inductive type thin film magnetic head, in which lead conductors are extended up to a side wall of a slider and bonding pads are formed on the lead conductors. However, this structure is not suitable for the miniaturization of the slider, because the lead conductors require a relatively large surface area. In this publication, there is further disclosed that a part of a plurality of bonding pads are position above the magnetic converting element. However, the prior art publication does not teach anything about the hybrid type thin film magnetic head having a stack structure of the inductive recording element and magnetoresistive reading element.

SUMMARY OF THE INVENTION

The present invention has for its object to provide a novel and useful hybrid type thin film magnetic head, in which a magnetoresistive reading element is not affected by processes for manufacturing an inductive recording element.

It is another object of the invention to provide a hybrid type thin film magnetic head having a high surface record density, in which a magnetoresistive element is formed by a giant magnetoresistive film such as spin bulb film, super lattice film and granular film, said giant magnetoresistive film is not subjected to a thermal damage.

It is another object of the invention to provide a hybrid type thin film magnetic head, in which apex angle and throat height of a pole portion can be controlled precisely.

It is another object of the invention to provide a hybrid type thin film magnetic head, in which a throat height of an inductive recording element and an MR height of an MR element can be set to desired values.

It is another object to provide a hybrid type thin film magnetic head, in which undesired variation of a photoresist for insulating a thin film coil due to a heating treatment can be avoided, a throat height can be minimized and various dimensions can be precisely controlled to have an excellent high frequency property.

It is another object of the invention to provide a hybrid type thin film magnetic head, in which undesired variation of a photoresist pattern due to a milling process for forming a thin film coil can be avoided and a throat height can be minimized to obtain an excellent high frequency property.

It is another object of the invention to provide a hybrid type thin film magnetic head, in which a flat first magnetic film of an inductive recording element can be formed without using the chemical-mechanical polishing, and the deterioration of the high frequency property due to the non-flat first magnetic film can be avoided.

It is still another object of the invention to provide a thin film magnetic head including at least an inductive recording element, in which a width of a pole portion can be minimized to improve the surface recording density and high frequency property.

It is another object of the invention is to provide a thin film magnetic head including at least an inductive recording element, in which a width of a pole portion can be minimized without making a manufacturing process complex, cumbersome and expensive.

It is another object of the invention to provide a thin film magnetic head including at least an inductive recording element, in which a width of a pole portion of a minimized size can be formed uniformly.

It is another object of the invention to provide a thin film magnetic head including at least an inductive recording element, in which a magnetic field is confined in a pole portion to improve the high frequency property and surface recording density.

It is still another object of the invention to provide a hybrid type thin film magnetic head, which can be easily miniaturized so that the number of magnetic heads which can be formed from a single wafer can be increased and a magnetic disc device using the magnetic head can be also miniaturized, and the magnetic head can float above a magnetic disc in a stable manner.

The present invention also relates to a method of manufacturing a thin film magnetic head and has an object to provide a novel and useful method by means of which the above mentioned thin film magnetic head according to the invention can be manufactured in a precise, efficient and less expensive manner.

According to a first aspect of the invention, a hybrid type thin film magnetic head comprises:

a substrate made of a non-magnetic insulating material and having a surface in which a recessed portion is formed;

an inductive recording element formed to be supported by said substrate; and a magnetoresistive reading element formed to be supported by said inductive recording element;

wherein said inductive recording element includes:

a first magnetic film having a portion formed on an inner surface of said recessed portion and a pole portion formed on said surface of the substrate to extend from said portion formed on the inner surface of the recessed portion up to an air bearing surface;

a thin film coil formed within said recessed portion and having a plurality of conductive coil turns;

a coil supporting and isolating insulating film formed within said recessed portion such that said conductive turns of the thin film coil are supported and isolated by said insulating film;

a gap film made of a non-magnetic material and formed at least on said pole portion of the first magnetic film;

a second magnetic film formed on said gap film and having a pole portion which is opposed to said pole portion of the first magnetic film via said gap film and a portion which is magnetically coupled with said first magnetic film at a position remote from said pole portion; and said magnetoresistive reading element includes:

a first shield gap film made of a non-magnetic insulating material and formed on said second magnetic film;

a magnetoresistive film formed on said first shield gap film such that a side edge of the magnetoresistive film is exposed on said air bearing surface;

a second shield gap film made of a non-magnetic insulating material and formed on the magnetoresistive film and first shield gap film; and a third magnetic film formed on said second shield gap film.

According to the first aspect of the invention, a method of manufacturing an inverted hybrid type thin film magnetic head including an inductive recording element, a magnetoresistive reading element, and a substrate supporting said inductive recording element and magnetoresistive reading element, comprises the steps of:

forming a recessed portion in a surface of a substrate;

forming a first magnetic film on an inner surface of said recessed portion and on a portion of said surface of the substrate such that said first magnetic film includes a pole portion extending from the recessed portion up to an air bearing surface;

forming a thin film coil having a plurality of conductive coil turns within said recessed portion such that said conductive coil turns are supported and isolated from each other by means of a coil supporting and isolating insulating film formed within said recessed portion;

forming a gap film made of a non-magnetic material at least on said pole portion of the first magnetic film;

forming a second magnetic film on said gap film such that the second magnetic film includes a pole portion which is opposed to said pole portion of the first magnetic film via said gap film and a portion which is magnetically coupled with said first magnetic film at position remote from said pole portion;

forming a first shield gap film on said second magnetic film;

forming a magnetoresistive film on said first shield gap film;

forming a second shield gap film on the magnetoresistive film and first shield gap film; and forming a third magnetic film on said second shield gap film.

According to the first aspect of the invention, since the magnetoresistive reading element is formed on the inductive recording element, it is possible to manufacture the magnetoresistive reading element after the inductive recording element has been formed. Therefore, the magnetoresistive reading element can be effectively prevented from being affected by a process for manufacturing the inductive recording element.

As stated above, according to the first aspect of the invention, the magnetoresistive reading element is not affected by a heating treatment for forming the thin film coil isolated by the coil supporting and isolating insulating film. Therefore, the magnetoresistive film may be advantageously formed by a GMR film such as spin bulb film, super lattice film and granular film which is liable to be damaged by a high temperature annealing process during the formation of the inductive recording element. In this manner, it is possible to obtain the magnetoresistive reading element having a very high sensitivity.

According to the first aspect of the invention, the thin film coil and coil supporting and isolating insulating film are formed within the recessed portion formed in the surface of the substrate, and thus the apex angle and throat height can be precisely controlled by adjusting an angle and a configuration of a side wall of the recessed portion and a depth of the recessed portion.

The first magnetic film has the pole portion which extends from a portion of the first magnetic film formed on the surface of the recessed portion, and thus there is formed a corner between the pole portion and the portion formed on the recessed portion. The throat height is determined with reference to said corner whose position is not changed during the formation of the magnetic head. Therefore, the throat height can be precisely set to a desired value.

The thin film coil is usually formed by a stack of a plurality of coil turn layers which are isolated by a plurality of insulating layers of the coil supporting and isolating insulating film, and the insulating layers are usually made of a photoresist. In order to form successive coil-turn layers precisely, an insulating layer is subjected to a heating treatment at a temperature of about 250° C. at which the photoresist of the insulating layer is softened or melt. However, according to the invention, the thin film coil and coil supporting and isolating insulating film are formed within the recessed portion, even if the photoresist is softened or melt, the configuration of the thin film coil and coil supporting and isolating insulating film is not changed, but is fixed in accordance with a configuration of the recessed portion. Therefore, the photoresist pattern is not changed under the heating treatment. Moreover, the coil supporting and isolating insulating film pattern is not changed even by a process for milling the coil supporting and isolating insulating film during the formation of the coil turns of the thin film coil. Therefore, according to the invention, the apex angle can be precisely determined by the inclination angle and configuration of the side wall of the recessed portion and the throat height can be also precisely determined with reference to the corner of the first magnetic head.

According to a second aspect of the invention, a thin film magnetic head comprises:

a substrate having a surface; and an inductive recording element formed on said surface of the substrate;

wherein said inductive recording element includes:

a first magnetic film formed on said substrate and having a pole portion extending from an air bearing surface;

a thin film coil having a plurality of conductive coil turns each of which includes a portion formed on said first magnetic film;

a coil supporting and isolating insulating film formed to isolate said conductive coil turns of the thin film coil are isolated from each other;

a gap film made of a non-magnetic material and having a pole portion which is opposed to said pole portion of the first magnetic film; and a second magnetic film having a pole portion which is opposed to said pole portion of the first magnetic film via said gap film and a portion which is magnetically coupled with said first magnetic film at position remote from said pole portion, said pole portion of the second magnetic film being constituted by a protrusion which is formed in a surface of the second magnetic film contacted with said gap film and protrudes toward said pole portion of the first magnetic film.

According to the second aspect of the invention, a method of manufacturing a thin film magnetic head including a substrate having and an inductive recording element formed on said substrate, comprises the steps of:

forming a recessed portion and a groove in a surface of the substrate such that said groove extends from said recessed portion up to an air bearing surface;

forming a first magnetic film on an inner surface of said recessed portion and within said groove of the substrate;

etching a part of said first magnetic film formed within said groove to form a pole portion within the groove such that a surface level of the pole portion of the first magnetic film within the groove is lower than a surface level of the substrate in which said groove is formed such that said groove has a space therein;

forming a thin film coil having a plurality of conductive coil turns within said recessed portion such that said conductive coil turns are isolated from each other by means of a coil supporting and isolating insulating film formed within said recessed portion;

forming a gap film made of a non-magnetic material on said coil supporting and isolating insulating film formed in said recessed portion and on said pole portion of the first magnetic film within said groove, said gap film having a thickness which is smaller than a depth of said space within the groove such that the groove still has a space;

forming a second magnetic film on said gap film such that said second magnetic film includes a pole portion constituted by a protrusion which projects into said space of the groove and is opposed to said pole portion of the first magnetic film via said gap film, and a portion which is magnetically coupled with said first magnetic film at a position remote from said pole portion.

According to the second aspect of the invention, a method of manufacturing a thin film magnetic head including a substrate having and an inductive recording element formed on said substrate, comprises the steps of:

forming a recessed portion in a surface of the substrate;

forming a first magnetic film on an inner surface of said recessed portion and on said surface of the substrate such that the first magnetic film has a pole portion which extends from said recessed portion up to an air bearing surface;

forming a thin film coil having a plurality of conductive coil turns within said recessed portion such that said conductive coil turns are supported and isolated by a coil supporting and isolating insulating film formed within said recessed portion, a surface level of said coil supporting and isolating insulating film being not higher than a surface level of the pole portion of the first magnetic film;

forming an inorganic insulating film on said substrate, said pole portion of the first magnetic film and said coil supporting and isolating insulating film;

etching said inorganic insulating film such that a surface of said pole portion of the first magnetic film is exposed;

etching said exposed surface of the pole portion of the first magnetic film such that a surface level of the pole portion of the first magnetic film is lower than a surface level of the inorganic film so as to form a groove;

forming a gap film made of a non-magnetic material on said inorganic insulating film and on said pole portion of the first magnetic film within said groove;

forming a second magnetic film on said gap film such that said second magnetic film includes a pole portion constituted by a protrusion which projects into said groove and is opposed to said pole portion of the first magnetic film via said gap film, and a portion which is magnetically coupled with said first magnetic film at a position remote from said pole portion.

According to the second aspect of the invention, a method of manufacturing a thin film magnetic head including a substrate having and an inductive recording element formed on said substrate, comprises the steps of:

forming a recessed portion in a surface of the substrate;

forming a first magnetic film on an inner surface of said recessed portion and on said surface of the substrate such that the first magnetic film has a pole portion which extends from said recessed portion up to an air bearing surface;

forming a metal film at least on said pole portion of the first magnetic film, said metal film being made of a metal which has an etching property different from that of the first magnetic film;

forming a thin film coil having a plurality of conductive coil turns within said recessed portion such that said conductive coil turns are supported and isolated by a coil supporting and insulating film formed within said recessed portion, a surface level of said coil supporting and isolating insulating film being lower than a surface level of the metal film;

forming an inorganic insulating film on said substrate, said metal film on the pole portion of the first magnetic film and said coil supporting and isolating insulating film;

etching said inorganic insulating film such that a surface of said metal film is exposed;

selectively etching said metal film to expose the surface of the pole portion of the first magnetic film such that a surface level of the pole portion of the first magnetic film is lower than a surface level of the inorganic insulating film so as to form a groove;

forming a gap film made of a non-magnetic material on said inorganic insulating film and on said pole portion of the first magnetic film within said groove;

forming a second magnetic film on said gap film such that said second magnetic film includes a pole portion constituted by a protrusion which projects into said groove and is opposed to said pole portion of the first magnetic film via said gap film, and a portion which is magnetically coupled with said first magnetic film at a position remote from said pole portion.

According to the above mentioned second aspect of the invention, a width of a writing pole can be minimized to a width of said protrusion of the second magnetic film, and thus a high surface recording density can be attained and a high frequency property can be improved.

Moreover, said protrusion is formed by a part of a whole thickness of the second magnetic film, a magnetic flux is effectively confined at the writing pole, which can improve the surface recording density and high frequency property.

Furthermore, a width of said protrusion can be formed precisely and finely by using a high precision patterning technique mainly a photolithography during the manufacturing process of the second magnetic film.

It should be noted that although it is not necessary to constitute the thin film magnetic head according to the second aspect of the invention as the hybrid type thin film magnetic head, it is advantageous to constitute the thin film magnetic head according to the second aspect of the invention as the hybrid type one including a magnetoresistive reading element in addition to the inductive recording element. In such a case, it is particularly advantageous to construct the hybrid type thin film magnetic head as the inverted structure like as the first aspect of the invention. In this case, since the second magnetic film can be formed on a planar surface of the gap film, said protrusion constituting the writing pole can be also formed precisely.

According to a third aspect of the invention, an inverted hybrid type thin film magnetic head comprises:

a substrate having a surface in which a recessed portion is formed;

an inductive recording element formed to be opposed to said surface of the substrate in which said recessed portion is formed; and a magnetoresistive reading element formed on a side of said inductive recording element which is opposite to said substrate;

wherein said inductive recording element includes:

a first magnetic film formed on said recessed portion of the substrate and having a pole portion which is formed on the substrate and extends from the recessed portion up to an air bearing surface;

a thin film coil formed within said recessed portion and having a plurality of conductive turns;

a coil supporting and isolating insulating film formed within said recessed portion such that said conductive turns of the thin film coil are supported and isolated by said coil supporting and isolating insulating film;

a gap film made of a non-magnetic material formed at least on said pole portion of the first magnetic film;

a second magnetic film formed on said gap film and having a pole portion which is opposed to said pole portion of the first magnetic film via said gap film and a portion which is magnetically coupled with said first magnetic film at position remote from said pole portion; and two conductors each having one ends connected to respective ends of said thin film coil;

said magnetoresistive reading element includes:

a first shield gap film formed on said second magnetic film;

a magnetoresistive film formed on said first shield gap film such that a side edge of the magnetoresistive film is exposed on said air bearing surface;

a second shield gap film formed on the magnetoresistive film and first shield gap film; and a third magnetic film formed on said second shield gap film and having a portion which is opposed to said magnetoresistive film via said second shield gap film; and at least two bonding pads formed on a side wall of said substrate on a side from which a bearing air flow exits, one of said bonding pads being connected to one of said two conductors which is connected to one end of the thin film coil and being provided above the thin film coil such that a center of the relevant bonding pad situates within a pattern of the thin film coil.

According to the third aspect of the invention, a method of manufacturing a hybrid type thin film magnetic head including an inductive recording element, a magnetoresistive reading element, and a substrate supporting said inductive recording element and magnetoresistive reading element, comprising the steps of:

forming a depressed portion in a surface of a substrate;

forming a first magnetic film on an inner surface of said recessed portion of the substrate and on a portion of said surface of the substrate such that said first magnetic film includes a pole portion extending from the recessed portion up to an air bearing surface;

forming a thin film coil having a plurality of conductive turns within said recessed portion such that said conductive coil turns are isolated from each other by means of a first insulating film formed within said recessed portion;

forming a gap film made of a non-magnetic material at least on said pole portion of the first magnetic film and said second insulating film;

forming a second magnetic film on said gap film such that the second magnetic film includes a pole portion which is opposed to said pole portion of the first magnetic film via said gap film and a portion which is magnetically coupled with said first magnetic film at position remote from said pole portion;

forming a first shield gap film on said second magnetic film at least at a portion near the air bearing surface;

forming a magnetoresistive film on said first shield gap film;

forming a second shield gap film on the magnetoresistive film and first shield gap film;

forming a third magnetic film on said second shield gap film at least at a portion which is opposed to said magnetoresistive film via said second shield gap film;

forming a second insulating film on said third magnetic film and second shield gap film;

forming first and second pairs of conductors, said first pair of conductors being connected to respective ends of said thin film coil through via holes formed in said second insulating film and said second pair of conductors being connected to respective ends of said magnetoresistive film by means of via holes formed in said second insulating film; and forming first and second pairs of bonding pads on said second insulating film, said first pair of bonding pads being connected to said first pair of conductors, said second pair of bonding pads being connected to said second pair of conductors, and one of said first pair of bonding pads being formed such that a center of the relevant bonding pad situates within a plane of a pattern defined by said thin film coil.

In the thin film magnetic head according to the third aspect of the invention, in addition to all the above mentioned merits of the thin film magnetic head according to the first aspect of the invention, the following merits can be obtained.

Since one of the bonding pads connected to the one end of the thin film coil is provided on the side wall of the substrate at such a position that its center situates within the pattern defined by the thin film coil, a surface area of the side wall of the substrate can be utilized efficiently. Therefore, a surface area of the substrate can be reduced, and thus the thin film magnetic head can be minimized. This results in that a floating posture of the magnetic head above a magnetic record medium can be stabilized, a magnetic disc device using the thin film magnetic head can be also minimized, and a larger number of magnetic heads can be manufactured from a single wafer.

In a preferable embodiment of the thin film magnetic head according to the third aspect of the invention, two further bonding pads each connected to respective ends of the magnetoresistive film are also provided on the side wall of the substrate such that all four bonding pads are aligned in a direction which is perpendicular to a direction of the bearing air flow.

According to a fourth aspect of the invention, a hybrid type thin film magnetic head comprises:
a substrate having a surface in which a recessed portion is formed;
an inductive recording element formed to be opposed to said surface of the substrate in which said recessed portion is formed; and
a magnetoresistive reading element formed on a side of said inductive recording element which is opposite to said substrate;
wherein said inductive recording element includes:
a first magnetic film formed on said recessed portion of the substrate and having a pole portion extending from the recessed portion up to an air bearing surface;
a thin film coil formed within said recessed portion and having a plurality of conductive turns;
an insulating film formed within said recessed portion such that said conductive turns of the thin film coil are isolated by said insulating film;
a gap film made of a non-magnetic material formed at least on said pole portion of the first magnetic film and said insulating film;
a second magnetic film having a pole portion which is opposed to said pole portion of the first magnetic film via said gap film and a portion which is magnetically coupled with said first magnetic film at position remote from said pole portion, said pole portion of the second magnetic film being constituted by a protrusion which is formed in a surface of the second magnetic film contacted with said gap film and protrudes toward said pole portion of the first magnetic film; and
two conductors each having one ends connected to respective ends of said thin film coil; said magnetoresistive reading element includes:
a first shield gap film formed on said second magnetic film;
a magnetoresistive film formed on said first shield gap film such that a side edge of the magnetoresistive film is exposed on said air bearing surface;
a second shield gap film formed on the magnetoresistive film and first shield gap film; and
a third magnetic film formed on said second shield gap film and having a portion which is opposed to said magnetoresistive film via said second shield gap film; and
at least two bonding pads formed on a side wall of said substrate on a side from which a bearing air flow exits, one of said bonding pads being connected to one of said two conductors which is connected to one end of the thin film coil and being provided above the thin film coil such that a center of the relevant bonding pad situates within a plane of a pattern defined by the thin film coil.

According to the fourth aspect of the invention, a method of manufacturing a hybrid type thin film magnetic head including a substrate having, an inductive recording element formed on said substrate and a magnetoresistive reading element formed on the inductive recording element, comprises the steps of:
forming a recessed portion and a groove in a surface of the substrate such that said groove extends from said recessed portion up to an air bearing surface;
forming a first magnetic film on an inner surface of said recessed portion and on an inner surface of said groove of the substrate;
etching a part of said first magnetic film formed on the inner surface of said groove to form a pole portion within the groove such that a surface level of the pole portion of the first magnetic film within the groove is lower than a surface level of the substrate in which said groove is formed so that a step is formed between these surfaces;
forming a thin film coil having a plurality of conductive coil turns within said recessed portion such that said conductive coil turns are isolated from each other by means of a first insulating film formed within said recessed portion;
forming a gap film made of a non-magnetic material on said insulating film formed in said recessed portion and said pole portion of the first magnetic film such that the gap film includes a step corresponding to said step of the first magnetic film;
forming a second magnetic film on said gap film such that said second magnetic film includes a pole portion constituted by a protrusion which is formed within said groove and is opposed to said pole portion of the first magnetic film via said gap film and a portion which is magnetically coupled with said first magnetic film at position remote from said pole portion;
forming a first shield gap film on said second magnetic film at least at a portion near the air bearing surface;
forming a magnetoresistive film on said first shield gap film;
forming a second shield gap film on the magnetoresistive film and first shield gap film;
forming a third magnetic film on said second shield gap film at least at a portion which is opposed to said magnetoresistive film via said second shield gap film;
forming a second insulating film on said third magnetic film and second shield gap film;
forming first and second pairs of conductors, said first pair of conductors being connected to respective ends of said thin film coil through via holes formed in said second insulating film and said second pair of conductors being connected to respective ends of said magnetoresistive film by means of via holes formed in said second insulating film; and forming first and second pairs of bonding pads on said second insulating film, said first pair of bonding pads being connected to said first pair of conductors, said second pair of bonding pads being connected to said second pair of conductors, and one of said first pair of bonding pads being formed such that a center of the relevant bonding pad situates within a plane of a pattern defined by said thin film coil.

According to the fourth aspect of the invention, a method of manufacturing a hybrid type thin film magnetic head including a substrate having, an inductive recording element formed on said substrate, and a magnetoresistive reading element formed on the inductive recording element comprises the steps of:

forming a recessed portion in a surface of the substrate;

forming a first magnetic film on an inner surface of said recessed portion and on said surface of the substrate such that the first magnetic film has a pole portion which extends from said recessed portion up to an air bearing surface;

forming a thin film coil having a plurality of conductive coil turns within said recessed portion such that said conductive coil turns are supported and isolated by a coil supporting and isolating insulating film formed within said recessed portion, a surface level of said coil supporting and isolating insulating film being not higher than a surface level of the pole portion of the first magnetic film;

forming an inorganic insulating film on said substrate, said pole portion of the first magnetic film and said coil supporting and isolating insulating film;

etching said inorganic insulating film such that a surface of said pole portion of the first magnetic film is exposed;

etching said exposed surface of the pole portion of the first magnetic film such that a surface level of the pole portion of the first magnetic film is lower than a surface level of the inorganic film so as to form a groove;

forming a gap film made of a non-magnetic material on said inorganic insulating film and on said pole portion of the first magnetic film within said groove;

forming a second magnetic film on said gap film such that said second magnetic film includes a pole portion constituted by a protrusion which projects into said groove and is opposed to said pole portion of the first magnetic film via said gap film, and a portion which is magnetically coupled with said first magnetic film at a position remote from said pole portion;

forming a first shield gap film on said second magnetic film at least at a portion near the air bearing surface;

forming a magnetoresistive film on said first shield gap film;

forming a second shield gap film on the magnetoresistive film and first shield gap film;

forming a third magnetic film on said second shield gap film at least at a portion which is opposed to said magnetoresistive film via said second shield gap film;

forming a second insulating film on said third magnetic film and second shield gap film;

forming first and second pairs of conductors, said first pair of conductors being connected to respective ends of said thin film coil through via holes formed in said second insulating film and said second pair of conductors being connected to respective ends of said magnetoresistive film by means of via holes formed in said second insulating film; and forming first and second pairs of bonding pads on said second insulating film, said first pair of bonding pads being connected to said first pair of conductors, said second pair of bonding pads being connected to said second pair of conductors, and one of said first pair of bonding pads being formed such that a center of the relevant bonding pad situates within a plane of a pattern defined by said thin film coil.

According to the fourth aspect of the invention, a method of manufacturing a hybrid type thin film magnetic head including a substrate having, an inductive recording element formed on said substrate, and a magnetoresistive reading element formed on the inductive recording element comprises the steps of:

forming a recessed portion in a surface of the substrate;

forming a first magnetic film on an inner surface of said recessed portion and on said surface of the substrate such that the first magnetic film has a pole portion which extends from said recessed portion up to an air bearing surface;

forming a metal film at least on said pole portion of the first magnetic film, said metal film being made of a metal which has an etching property different from that of the first magnetic film;

forming a thin film coil having a plurality of conductive coil turns within said recessed portion such that said conductive coil turns are supported and isolated by a coil supporting and insulating film formed within said recessed portion, a surface level of said coil supporting and isolating insulating film being lower than a surface level of the metal film;

forming an inorganic insulating film on said substrate, said metal film on the pole portion of the first magnetic film and said coil supporting and isolating insulating film;

etching said inorganic insulating film such that a surface of said metal film is exposed;

selectively etching said metal film to expose the surface of the pole portion of the first magnetic film such that a surface level of the pole portion of the first magnetic film is lower than a surface level of the inorganic insulating film so as to form a groove;

forming a gap film made of a non-magnetic material on said inorganic insulating film and on said pole portion of the first magnetic film within said groove;

forming a second magnetic film on said gap film such that said second magnetic film includes a pole portion constituted by a protrusion which projects into said groove and is opposed to said pole portion of the first magnetic film via said gap film, and a portion which is magnetically coupled with said first magnetic film at a position remote from said pole portion.

forming a first shield gap film on said second magnetic film at least at a portion near the air bearing surface;

forming a magnetoresistive film on said first shield gap film;

forming a second shield gap film on the magnetoresistive film and first shield gap film;

forming a third magnetic film on said second shield gap film at least at a portion which is opposed to said magnetoresistive film via said second shield gap film;

forming a second insulating film on said third magnetic film and second shield gap film;

forming first and second pairs of conductors, said first pair of conductors being connected to respective ends of said thin film coil through via holes formed in said second insulating film and said second pair of conductors being connected to respective ends of said magnetoresistive film by means of via holes-formed in said second insulating film; and forming first and second pairs of bonding pads on said second insulating film, said first pair of bonding pads being connected to said first pair of conductors, said second pair of bonding pads being connected to said second pair of conductors, and one of said first pair of bonding pads being formed such that a center of the relevant bonding pad situates within a plane of a pattern defined by said thin film coil.

In the thin film magnetic head according to the fourth aspect of the invention, all the above mentioned merits of the thin film magnetic heads according to the above mentioned first, second and third aspects of the invention can be attained.

BRIEF DESCRIPTION OF THE DRAWINGS

FIG. 3 is a cross sectional view cut along a line 3—3 in FIG. 2;

FIGS. 4A and 4B are cross sectional view and plan view, respectively showing a first step of the method of manufacturing the thin film magnetic head shown in FIGS. 1–3;

FIGS. 5–19 are cross sectional views illustrating successive steps of the method;

FIG. 20 is a cross sectional view depicting a second embodiment of the hybrid type thin film magnetic head according to the second aspect of the invention;

FIGS. 21–35 are cross sectional views illustrating successive steps for manufacturing the hybrid type thin film magnetic head shown in FIG. 20;

FIG. 36 is a cross sectional view showing a first embodiment of the thin film magnetic head according to the second aspect of the invention;

FIG. 37 is a cross sectional view depicting a part of the magnetic head on an enlarged scale;

FIG. 38 is a cross sectional view cut along a line 38—38 in FIG. 37;

FIGS. 39–54 are cross sectionals views showing successive steps for manufacturing the thin film magnetic head shown in FIGS. 36–38;

FIG. 55 is a cross sectional view illustrating a second embodiment of the magnetic head according to the second aspect of the invention;

FIG. 56 is a cross sectional view cut along a line 56—56 in FIG. 55;

FIGS. 57–71 are cross sectional views showing successive steps of an embodiment of the method of manufacturing the magnetic head illustrated in FIGS. 55 and 56;

FIGS. 72–86 are cross sectional views illustrating successive steps of another embodiment of the method of manufacturing the magnetic head of FIGS. 55 and 56;

FIG. 87 is a cross sectional view depicting a third embodiment of the magnetic head according to the second aspect of the invention;

FIG. 88 is a cross sectional view cut along a line 88—88 in FIG. 87;

FIGS. 89–97 are cross sectional views showing successive steps of an embodiment of the method of manufacturing the magnetic head shown in FIGS. 87 and 88;

FIG. 98 is a cross sectional view illustrating a fourth embodiment of the magnetic head according to the second aspect of the invention;

FIG. 99 is a cross sectional view cut along a line 99—99 in FIG. 98;

FIGS. 100–108 are cross sectional views depicting successive steps of the method of manufacturing the magnetic head shown in FIGS. 98 and 99;

FIG. 109 is a cross sectional view illustrating a fifth embodiment of the magnetic head according to the second aspect of the present invention;

FIG. 110 is a cross sectional view showing an embodiment of the magnetic head according to the third aspect of the invention;

FIG. 111 is a cross sectional view illustrating a part of the magnetic head shown in FIG. 110 on an enlarged scale;

FIG. 112 is a cross sectional view cut along a line 112—112 in FIG. 111;

FIGS. 115–119 are cross sectional views showing successive steps of an embodiment of the method of manufacturing the magnetic head illustrated in FIGS. 110–114 according to the third aspect of the invention;

FIG. 120 is a perspective view showing a first embodiment of the magnetic head according to the fourth aspect of the present invention;

FIG. 121 is a cross sectional view showing the magnetic head of the present embodiment; FIG. 120 on an enlarged scale;

FIG. 122 is a cross sectional view showing a part of the magnetic head of FIG. 121 on an enlarged scale;

FIG. 123 is a cross sectional view cut along a line 123—123 in FIG. 122;

FIG. 124 is a plan view illustrating a positional relationship between the bonding pad and the thin film coil;

FIGS. 125 and 126 are cross sectional views depicting a second embodiment of the magnetic head according to the fourth aspect of the invention;

FIGS. 127 and 128 are cross sectional views showing a third embodiment of the magnetic head according to the fourth aspect of the invention;

FIGS. 129 and 130 are cross sectional views illustrating a second embodiment of the magnetic head according to the fourth aspect of the invention; and FIG. 131 is a cross sectional view showing a fifth embodiment of the magnetic head according to the fourth aspect of the invention.

DESCRIPTION OF THE PREFERRED EMBODIMENTS

Figure 1:
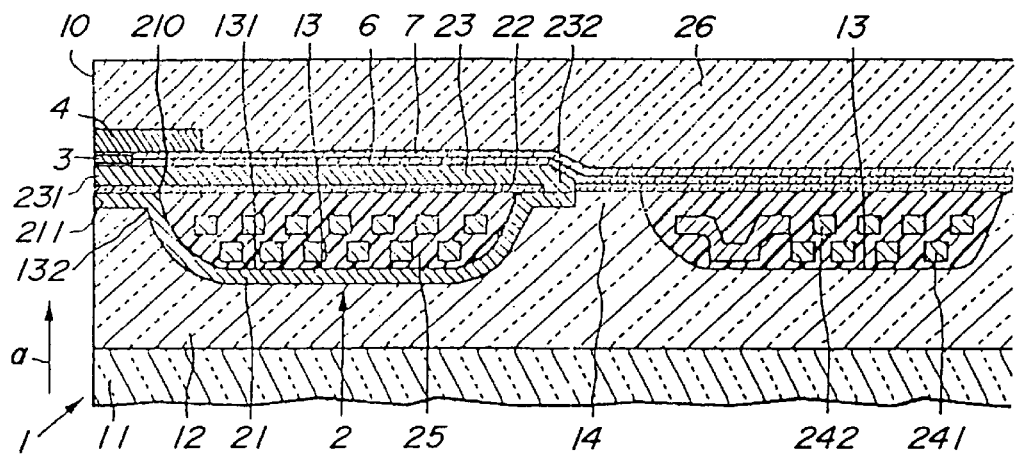
FIG. 1 is a cross sectional view showing a first embodiment of the thin film magnetic head according to the first aspect of the invention.

Now the present invention will be explained in detail with reference to the accompanying drawings. It should be noted that in these drawings, dimensions of various portions do not correspond to actual dimension for the sake of clarity. Furthermore, in all embodiments, similar portions are denoted by the same reference numerals as far as possible.

Figure 2:
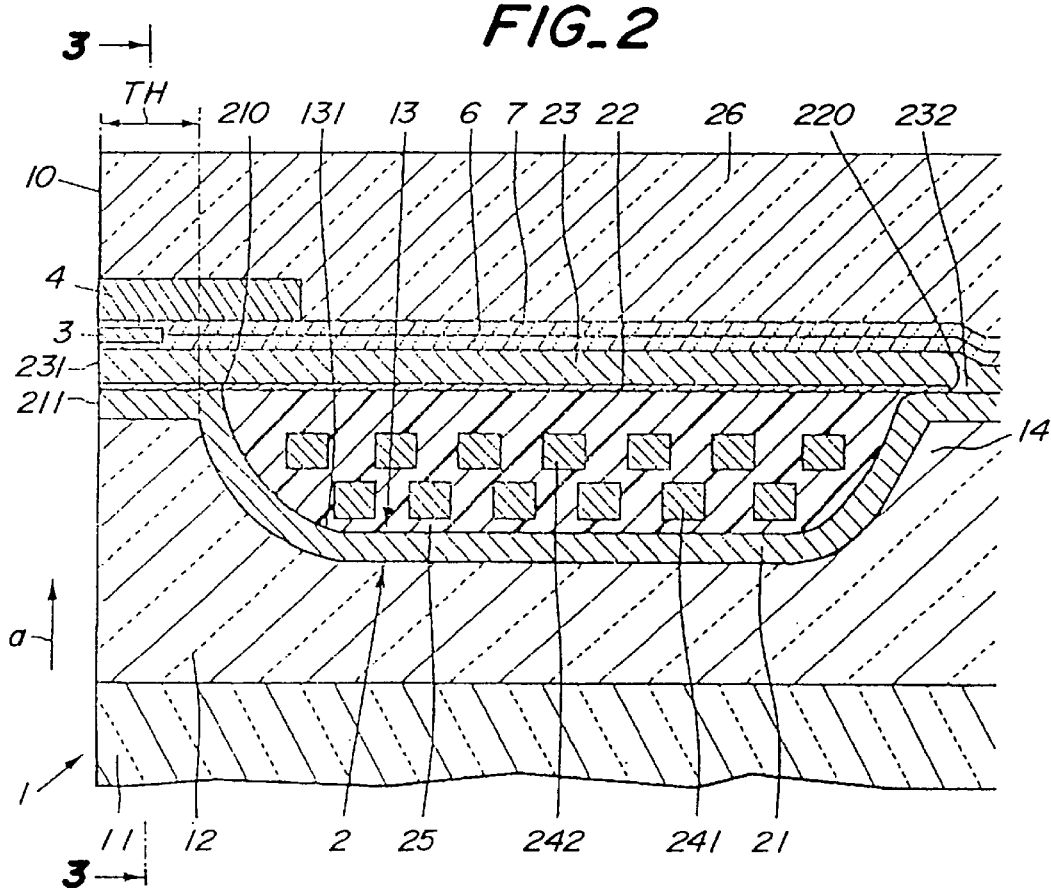
FIG. 2 is a cross sectional view illustrating a part of the thin film magnetic head shown in FIG. 1 on an enlarged scale.

FIGS. 1–3 are cross sectional views showing a first embodiment of the thin film magnetic head according to the first aspect of the invention. This magnetic head is constructed as the inverted hybrid type thin film magnetic head comprising a substrate 1, an inductive recording element 2 formed on the substrate, and a magnetoresistive reading element 3 formed on the inductive recording element 2. A reference numeral 4 denotes a third magnetic film serving as a top shield for the MR element 3, and a reference numeral 10 represents an air bearing surface which is to be opposed to a magnetic record medium with an extremely thin bearing air layer.

The substrate 1 constitutes a slider and includes a main body 11 made of, for instance $Al_2O_3TiC$ (AlTiC) and an insulating film 12 applied on the main body and made of, for instance alumina ($Al_2O_3$) or $SiO_2$. In a surface of the insulating film 12, there is formed a recessed or depressed portion 13. The insulating film 12 has a thickness within a range of, for instance 5–10 $\mu$m and the recessed portion 13 has a depth of within a range of, for instance 3–5 $\mu$m. The recessed portion 13 may be formed by, for instance an ion beam etching such as an ion milling. According to the first aspect of the invention, an apex angle of the inductive recording element 2 is substantially determined by an inclination angle of a side wall of the recessed portion 13, and thus the recessed portion is formed such that its side wall has an inclination angle corresponding to a desired apex angle. Further, as will be explained later, an edge 132 of the recessed portion 13 near the air bearing surface 10 serves to constitute a positional reference for defining a throat height TH of the inductive recording element.

The inductive recording element 2 comprises a first magnetic film 21 serving as a bottom pole, a thin film coil formed by two coil turn layers 241 and 242, an coil supporting and isolating insulating film 25 which supports and isolates conductive coil turns from each other, a gap film 22 and a second magnetic film 23 serving as a top pole. The first and second magnetic films 21 and 23 may be made of, for instance permalloy or ferrite having a high saturation magnetic flux density. The first magnetic film 21 has a portion applied on an inner surface 131 of the recessed portion 13 and a pole portion 211 applied on the surface of the substrate 1 and extending from the portion applied on the inner surface of the recessed portion. Therefore, the first magnetic film 21 includes a rather clear corner or pattern edge 210 at a transition from the portion applied on the inner surface 131 of the recessed portion 13 to the pole portion 211. The pattern edge 210 of the first magnetic film 21 corresponds to the edge 132 of the recessed portion 13.

The coil turn layers 241 and 242 are made of, for instance Cu, and are supported by the coil supporting and isolating insulating film 25. In the present embodiment, the thin film coil is formed by the two coil turn layers 241 and 242, but it may be formed by a single coil turn layer or more than two coil turn layers.

The gap film 22 is made of a non-magnetic material such as alumina ($Al_2O_3$), $SiO_2$ and SiN, has a substantially uniform thickness within a range of, for instance 1000–2000 Å, and is applied on the pole portion 211 of the first magnetic film 21 and the coil supporting and isolating insulating film 25. The second magnetic film 23 is applied on the gap film 22 and has a pole portion 231 which is opposed to the pole portion 211 of the first magnetic film 21 via the gap film 22. The second magnetic film 23 has further a portion 232 which is applied on a projection or island 14 of the insulating film 12 formed at a center of the recessed portion 13. The portion 232 of the second magnetic film 23 is magnetically coupled with the first magnetic film 21 at the island 14 which is remote from the pole portion 231. In this manner, the first and second magnetic films 21 and 23 constitute a magnetic circuit. It should be noted that the second magnetic film 23 also serves as the bottom shield for the MR reading element 3.

The third magnetic film 4 is made of a magnetic material such as permalloy and ferrite and is applied above the MR film 3 via the second shield gap layer 7. On the third magnetic film 4 is applied a protection film 26.

The MR film 3 is stacked on the second magnetic film 23 by means of the first shield gap film 6 made of a non-magnetic and electrically insulating material such as alumina. The MR element 3 may be formed by usual anisotropic magnetoresistive (AMR) film, giant magnetoresistive (GMR) film or ferromagnetic tunnel junction film. In the present specification, such films are generally called MR film for the sake of simplicity. The anisotropic MR film is generally made of a ferromagnetic material such as Ni—Fe and Ni—Co. When the anisotropic MR film is used, in order to improve a linearity of a detection signal with respect to an input magnetic field, it is preferable to apply a bias magnetic filed to the MR film. For this purpose, there have been proposed a shut-bias method and a magnet-bias method. In the shunt-bias method, a biasing conductor film is provided in the vicinity of the MR film and a biasing current is supplied to the conductor film to generate a biasing magnetic field. In magnet-bias method, a thin film magnet generating a biasing magnetic field is provided in the vicinity of the MR film. According to the invention, any one of the above mentioned biasing methods may be utilized. However, in the drawings, such biasing means is not shown for the sake of simplicity.

As the GMR film, there have been proposed spin bulb film, super lattice film and granular film. According to the invention, any one of these GMR films may be advantageously utilized. The ferromagnetic tunnel junction film has a multiple layer structure of ferromagnetic layer/insulating layer/ferromagnetic layer, and utilizes a tunneling effect appearing in dependence upon a relative angle of directions of magnetization of the two ferromagnetic layers.

In the present embodiment, the portion 232 of the second magnetic film 23 is magnetically coupled with the first magnetic film 21 at the island 14 formed in the recessed portion 13. The conductive coil turns of the layers 241 and 242 are wound around said island 14 in a spiral manner.

According to the first aspect of the invention, the MR reading element 3 is provided on the inductive recording element 2, and can be formed after the inductive recording element has been formed. Therefore, the MR reading element 3 can be effectively prevented from being affected by the manufacturing process for forming the inductive recording element 2.

Even if the MR reading element 3 is formed by the GMR film such as the spin bulb film, super lattice film and granular film, when the GMR film is to be formed, the inductive recording element 2 whose manufacturing process requires a heating treatment at a relatively high temperature has been formed, and thus the GMR film is not subjected to the thermal damage. In this manner, it is possible to form the magnetoresistive reading element having a high and stable sensitivity.

The substrate 1 has the recessed portion 13 formed in the surface thereof, and the thin-film coil layers 241 and 242 are formed within the recesses portion such that respective conductive coil turns are supported and isolated by the coil supporting and isolating insulating film 25. Therefore, the apex angle of the coil supporting and isolating insulating film 25 is precisely determined by the inclination angle of the side wall of the recessed portion 13, and at the same time, the throat height TH is determined with reference to the edge of the recessed portion. Therefore, the apex angle and throat height of the inductive recording element 2 can be accurately adjusted by controlling the configuration and depth of the recessed portion 13.

That is to say, since the first magnetic film 21 of the inductive recording element 2 is formed on the inner surface 131 of the recessed portion 13 as well as on the surface of the substrate extending from the recessed portion toward the air bearing surface 10, the first magnetic film 21 has the pattern edge 210 at the edge 132 of the recessed portion 13. The throat height TH can be precisely determined with reference to this pattern edge 210 upon polishing a side wall of the substrate 1 to form the air bearing surface 10.

Usually, the coil supporting and isolating insulating film 25 is made of a photoresist, and is subjected to a heating treatment at a temperature of about 250° C. in order to obtain a planer surface for forming the conductive coil turn layers 241 and 242. During this heating process, even if the photoresist is softened or melt, since the coil supporting and isolating insulating film 25 is in the recessed portion 13, the pattern of the coil supporting and isolating insulating film 25 is fixed by the pattern of the recessed portion 13 and could not be varied. Moreover, during the formation of the conductive coil turn layers 241 and 242, even if a milling process is carried out, the pattern of the coil supporting and isolating insulating film 25 is not change, but is fixed. Therefore, by forming the recessed portion 13 to have a precisely controlled configuration and depth, the apex angle and throat height TH can be accurately adjusted to desired values.

The pole portion 211 of the first magnetic film 21 is formed on the flat surface of the substrate 1, and thus can be formed also flat. On the pole portion 211 of the first magnetic film 21, there are formed the gap film 22 having a uniform thickness, and on this gap film, there is formed the pole portion 231 of the second magnetic film 23. Therefore, the degradation of the high frequency property due to the non-planer surface of the first magnetic film like as the conventional hybrid type thin film magnetic head in which the inductive recording element is formed on the MR reading element.

Furthermore, according to the invention, the planarizing process is not required, and therefore the manufacturing process can be simplified and shortened.

The gap film 22 applied on the coil supporting and isolating insulating film 25 has a uniform thickness, and therefore the second magnetic film 23 can be easily and precisely formed on a flat surface of the gap film to have a desired pattern.

In the conventional hybrid type thin film magnetic head having the inductive recording element formed on the MR reading element, in the vicinity of the pole portion, a large step is formed due to the configuration of the insulating film supporting and isolating the coil turn layers, and therefore it is difficult to form the top pole portion to have a precise pattern. It should be noted that said top pole portion has a large influence upon a recording characteristic. Contrary to this, according to the first aspect of the invention, the second magnetic film 23 can be formed on the flat surface of the gap film 22, and thus the pole portion 231 can be formed to have a precisely determined pattern and a superior recording characteristic can be obtained. Moreover, the MR element 3 can be formed also on the flat surface of the second magnetic film 23 with a precise photomask alignment.

In case of forming the MR element 3, the gap film 22, second magnetic film 23 and first shield gap film 6 have been formed on the pole portion 211 of the first magnetic film 21, but since these films have small thicknesses, the pattern edge 210 of the first magnetic film 21 can be clearly seen through these thin films. Therefore, a photomask for forming the MR element 3 can be aligned in position with reference to the pattern edge 210 of the first magnetic film 21. In this manner, the MR film 3 can be formed at a precise position relative to the inductive recording element 2, and a total balance of the hybrid type magnetic head can be improved.

Now an embodiment of the method of manufacturing the inverted hybrid type thin film magnetic head illustrated in FIGS. 1–3 will be explained in detail with reference to FIGS. 4–19.

As shown in FIGS. 4A and 4B, on a main body 11 made of $Al_2O_3TiC$ (AlTiC), an insulating film 12 made of $Al_2O_3$ or $SiO_2$ is provided, and a recessed portion 13 is formed in the surface of the insulating film 12. The insulating film 12 is formed to have a thickness of about 5–10 $\mu$m. The recessed portion 13 is formed by, for instance an ion milling such that the recessed portion has desired configuration and depth, by means of which the apex angle and throat height can be precisely formed as explained above. For instance, an inclination angle of the recessed portion 13 can be controlled by adjusting etching conditions. In the surface of the substrate 1 in the vicinity of an air bearing surface which will be formed later, there is formed a groove 15. This groove 15 is clearly seen in FIG. 5 which a cross sectional view cut along a line 5—5 in FIG. 4A. According to this embodiment, a width of a writing pole of the inductive recording element is defined by a width of this groove 15. Furthermore, at a center of the recessed portion 13, there is formed an island 14 and a groove 16 is formed in the surface of this island.

It should be noted that in an actual process, a large number of magnetic heads are formed from a single wafer constituting the substrate 1, and after almost all portions of the magnetic heads have been formed on the wafer, the wafer is divided into bars in which a plurality of magnetic heads are aligned. Then, after polishing a side wall of a bar to form air bearing surface, the bar is divided into respective magnetic heads. Therefore, the substrate 1 has not a side wall until said dividing process, but in the drawings the substrate is shown to have the side wall for the sake of simplicity.

Next, as illustrated in FIGS. 6 and 7, a first magnetic film 21 is formed on an inner surface 131 of the recessed portion 13 and inner surfaces of the grooves 15 and 16. This may be carried out by sputtering permalloy. It should be noted that a portion of the first magnetic film 21 formed in the groove 15 constitutes a pole portion 211. The first magnetic film 21 includes a pattern edge 210 between the pole portion 211 and a portion provided on the inner surface 131 of the recessed portion 13. This pattern edge 210 is utilized as a positional reference for the formation of the throat height TH and MR element.

Next, as shown in FIG. 8, conductive coil turn layers 241 and 242 are formed within the recessed portion 13 such that the coil turns are supported and isolated by an insulating film 25. In this case, a surface level of the coil supporting and isolating insulating film 25 does not exceed a surface level of the pole portion 211 of the first magnetic film 21. This may be carried out by a resist etch back method. In the present embodiment, the surfaces of the coil supporting and isolating insulating film 25 and pole portion 211 of the first magnetic film 21 are co-planar. The coil supporting and isolating insulating film 25 may be made of a photoresist and the coil turn layers 241 and 242 may be made of Cu. The thin film coil may be formed in a known manner. Upon the formation of the coil turn layers 241 and 242, a heating treatment is performed in order to obtain flat surfaces on which the coil turn layers are to be formed. Alternatively, the coil supporting and isolating insulating film 25 may be formed by the SOG (spin on glass) method which has been widely used for obtaining a flat surface in the semiconductor manufacturing method. The coil supporting and isolating insulating film 25 may be made of a silicon oxide film or a silicon nitride film deposited by CVD process.

During the heating process, the photoresist is softened or melt, but since the photoresist is existent within the recessed portion 13 formed in the surface of the substrate 1, the pattern of the finally formed coil supporting and isolating insulating film 25 is not varied, but is defined by the fixed pattern of the recessed portion 13. Further, even when the coil turn layers 241 and 242 are formed by using a patterning process such as milling, the pattern of the coil supporting and isolating insulating film 25 is not changed.

Next, as depicted in FIGS. 9 and 10, a gap film 22 having a uniform thickness is formed on the co-planar surfaces of the pole portion 211 of the first magnetic film 21 formed in the groove 15 and the coil supporting and isolating insulating film 25. As can be seen from FIG. 10, the gap film 22 is formed also on the exposed surface of the substrate 1. The gap film 22 may be made of a non-magnetic material such as alumina ($Al_2O_3$), silicon oxide and silicon nitride. A thickness of the gap film 22 is 1000–2000 Å.

Figure 11:
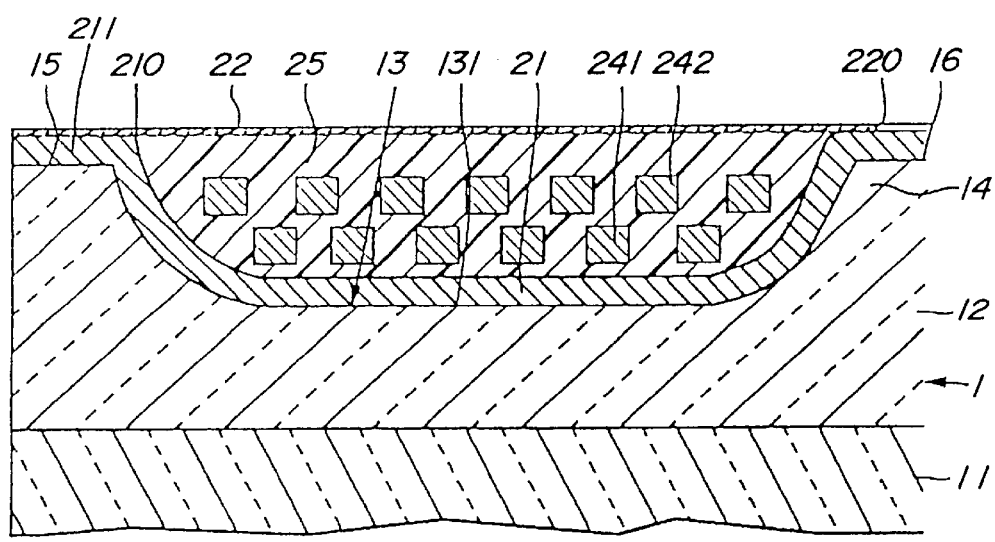

Then, as shown in FIG. 11, a through hole 220 is formed in a portion of the gap film 22 formed in the groove 16 at the island 14 in the recessed portion 13.

Next, as illustrated in FIGS. 12 and 13, a second magnetic film 23 is formed on the gap film 22. The second magnetic film 23 may be also formed by the permalloy sputtering. The second magnetic film 23 has a pole portion 231 which is opposed to the pole portion 211 of the first magnetic film 21 via the gap film 22, and the second magnetic film 23 also has a connecting portion 232 which is coupled with the first magnetic film 21 via the through hole 220 formed in the gap film 22 at the island 14. In this manner, a basic structure of the inductive magnetic converting element is completed. Since the second magnetic film 23 is formed on the flat surface of the gap film 22, the patterning of the second magnetic film by the photolithography can be performed very precisely.

Next, as shown in FIGS. 14 and 15, a first shield gap film 6 is formed on the second magnetic film 23, and then an MR film for constituting the MR element 3 is formed on the first shield gap film 6. This MR film is also denoted by the same reference numeral 3 of the MR element. The MR film 3 is formed to have a given pattern by the photolithography. Upon formation of the MR film 3 by the photolithography, the pattern edge 210 of the pole portion 211 of the first magnetic film 21 can be clearly seen through the gap film 22, second magnetic film 23 and first shield gap film 6, and thus a mask alignment for patterning the MR film can be performed with reference to the pattern edge 210 in an easy and precise manner. Since the pattern edge 210 serves as the positional reference for the throat height TH of the inductive recording element 2, the inductive recording element 2 and MR element 3 can be mutually positioned by means of the pattern edge 210.

Then, as illustrated in FIGS. 16 and 17, a second shield gap film 7 is formed on the MR film 3 and first shield gap film 6. The first and second shield gap film 6 and 7 may be made of a non-magnetic insulating material such as alumina, and may have a thickness of 1000–2000 Å.

Next, as shown in FIGS. 18 and 19, a third magnetic film 4 is formed on a portion of the second shield gap film 7. The third magnetic film 4 may be made of permalloy or ferrite. Then, the protection film 25 made of alumina is formed on the third magnetic film 4 and an exposed portion of the second shield gap film 7 as depicted in FIGS. 1–3.

Finally, the wafer is divided into a number of bars in which a plurality of magnetic heads are aligned, a side wall of a bar is polished to obtained the air bearing surface 10, and then the bar is divided into respective magnetic heads. Such processes are well known in the art, and thus their detailed explanations are dispensed with.

Characteristics of the MR element 3 might be varied due to a stress induced within the film and a stress induced by polishing. In order to mitigate such a stress-induced variation, the protection film 26 may be formed by a combination of silicon oxide and alumina films, a combination of silicon oxide and silicon nitride films, or a combination of an alumina film and a silicon oxide film highly doped with phosphor or boron, which has been widely used as a passivation film in semiconductor devices.

FIG. 20 is a cross sectional view showing a second embodiment of the hybrid type thin film magnetic head according to the first aspect of the present invention. In the following embodiments, portions similar to those shown in FIGS. 1–19 are denoted by the same reference numerals used in FIGS. 1–19. In this embodiment, a surface level of the coil supporting and isolating insulating film 25 is lower than a surface level of the pole portion 211 of the first magnetic film 21 by a distance $d_1$ to form a step. An inorganic insulating film 100 is formed such that said step having the distance $d_1$ is filled therewith to have a flat surface. The remaining structure of the present embodiment is substantially similar to that of the first embodiment shown in FIGS. 1–3. The present embodiment has an additional merit that the pattern edge 210 serving as the positional reference for the throat height and for the photomask alignment for patterning the MR film 3 can be seen much more clearly, because the surface of the coil supporting and isolating insulating film 25 situates lower than the pattern edge 210.

Now successive steps for manufacturing the magnetic head shown in FIG. 20 will be explained with reference to FIGS. 21–34.

At first, as illustrated in FIGS. 21 and 22, on a main body 11 made of AlTiC is formed an insulating film 12 made of $Al_2O_3$ or $SiO_2$, and a recessed portion 13 is formed in the surface of the insulating film 12.

Next, as depicted in FIGS. 23 and 24, a first magnetic film 21 is formed on an inner surface 131 of the recessed portion 13 and on the surface of the substrate 1. A portion of the first magnetic film 21 formed on the surface of the substrate 1 constitutes a pole portion 211 which includes an pattern edge 210 at a position corresponding to an edge 132 of the recessed portion 13 (FIG. 21).

Figure 25:
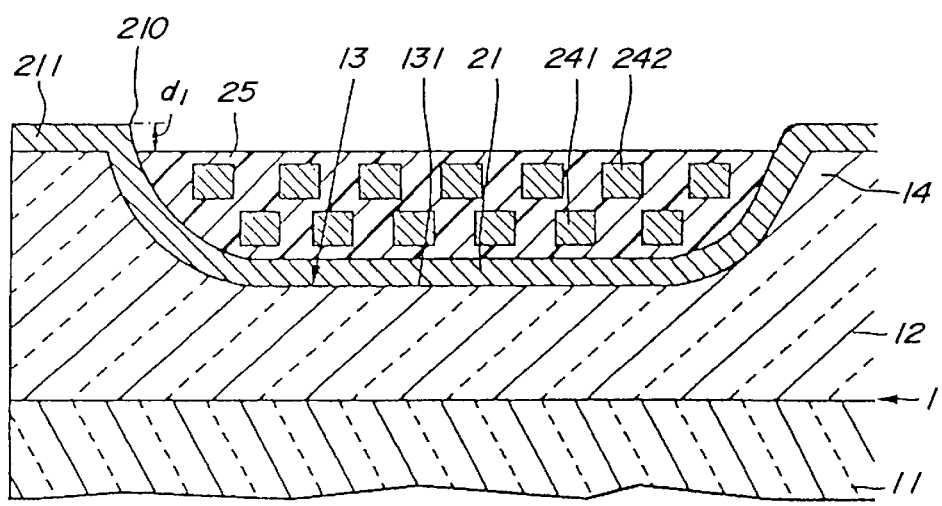

Then, as shown in FIG. 25, conductive coil turn layers 241 and 242 are formed within the recessed portion 13 such that they are supported and isolated by an insulating film 25. In the present embodiment, the coil supporting and isolating insulating film 25 is formed such that its surface level is lower than a surface level of the pole portion 211 of the first magnetic film 21 by a distance $d_1$.

Next, as illustrated in FIGS. 26 and 27, an inorganic insulating film 100 is formed on the coil supporting and isolating insulating film 25, pole portion 211 of the first magnetic film 21 and an exposed surface of the substrate 1. It should be noted that a thickness of the inorganic film 100 is larger than the distance $d_1$.

Next, as shown in FIGS. 28 and 29, the inorganic insulating film 100 is polished by the chemical-mechanical polishing to planarize the surfaces of the pole portion 211 and organic insulating film 100. By this planarizing process, the pattern edge 210 of the pole portion 211 of the first magnetic film 21 is further clarified.

Then, as depicted in FIG. 30, a gap film 22 is formed on the flat surface of the organic insulating film 100 and pole portion 211 of the first magnetic film 21. The inorganic insulating film 100 and gap film 22 may be made of alumina, silicon oxide or silicon nitride. In the gap film 22 is formed a through hole 220 at a portion of the island 14 within the recessed portion 13.

Next, as shown in FIG. 31, a second magnetic film 23 is formed on the gap film 22. The second magnetic film 23 includes a pole portion 231 which is opposed to the pole portion 211 of the first magnetic film 21 by means of the gap film 222, and a connecting portion 232 which is coupled with the first magnetic film 21 via the through hole 220 at the island 14. In this manner, the magnetic circuit of the inductive recording element is completed. Also in the present embodiment, the second magnetic film 23 can be formed on the flat surface of the gap film 22, and thus the patterning of the second magnetic film 23 by the photolithography can be performed very precisely.

Next, as illustrated in FIG. 32, a first shield gap film 6 is formed on the second magnetic film 23, and then an MR film or element 3 is formed on the first shield gap film. As stated before, since the pattern edge 210 of the pole portion 211 of the first magnetic film 21 can be clearly seen through the gap film 22, second magnetic film 23 and first shield gap film 6, a mask alignment for forming the MR film 3 can be performed precisely with reference to the pattern edge 210.

Then, as shown in FIG. 33, a second shield gap film 7 is formed on the MR film 3 and first shield gap film 6. The first and second shield gap films 6 and 7 may be made of alumina and may have a thickness of 1000–2000 Å.

Next, as depicted in FIG. 34, a third magnetic film 4 made of, for instance permalloy is formed on the second shield gap film 7. After forming a protection film 25 (see FIG. 20) on the third magnetic film 4 and exposed surface of the second shield gap film 7, the wafer is subjected to the dividing process and polishing process to obtain the hybrid type thin film magnetic head.

FIG. 35 is a cross sectional view showing a third embodiment of the inverted hybrid type thin film magnetic head according to the first aspect of the present invention. In the present embodiment, a recessed portion 13 is formed in a main body 11 of a substrate 1 and an insulating film 12 is formed on an inner surface 131 of the recessed portion 13 as well as on the surface of the main body 11. Therefore, a thickness of the insulating film 12 may be reduced, and this improve a heat dissipation property. The remaining construction is substantially identical with that of the second embodiment shown in FIG. 20.

FIG. 36 is a cross sectional view showing a first embodiment of the thin film magnetic head according to the second aspect of the invention. FIG. 37 is a cross sectional view illustrating a part of the magnetic head on an enlarged scale, and FIG. 38 is a cross sectional view cut along a line 38—38 in FIG. 37. In the present embodiment, the magnetic head is constructed as the inverted hybrid type thin film magnetic head having an inductive recording element provided on a substrate and an MR reading element formed on the inductive recording element, and a thin film coil of the inductive recording element is arranged within a recessed portion formed in the surface of the substrate. Therefore, the present embodiment includes the feature of the first aspect of the invention in addition to the second aspect of the invention. Therefore, the structure similar to the embodiments shown in FIGS. 1–35 is not explained in detail.

According to the second aspect of the invention, the second magnetic film 23 includes the pole portion 231 constituted by a protrusion which is formed on the surface of the second magnetic film facing to the substrate 1. This structure is best shown in FIG. 38. That is to say, the second magnetic film 23 has a T-shaped cross section at the pole portion 231. It should be noted that the gap film 22 is formed along the surface of this T-shaped cross section.

In the present embodiment, since the pole portion 231 of the second magnetic film 23 is formed to have the T-shaped cross section, the following advantages can be obtained.

Firstly, a width $P_w$ of a writing pole of the magnetic head can be defined by a width of the protrusion 231 of the second magnetic film 23, the writing pole can be minimized to improve the surface recording density and high frequency property.

Secondly, the pole portion of the second magnetic film 23 is formed by the protrusion 231 which extends from the lower surface of the second magnetic film 23, and therefore the magnetic field can be constricted much more effectively the writing pole. This also contributes to the improvement in the surface recording density and high frequency property.

Thirdly, the protrusion constituting the pole portion 231 of the second magnetic film 23 can be finely and precisely formed by using the photolithography during the formation of the second magnetic film to have a precisely defined width. Therefore, a width $P_w$ of the minimized writing pole can be obtained uniformly even in the mass production process.

Now an embodiment of the method of manufacturing the thin film magnetic head illustrated in FIGS. 36–38 will be explained with reference to FIGS. 39–54.

As shown in FIGS. 39 and 40, on a main body 11 made of $Al_2O_3TiC$ (AlTiC), an insulating film 12 made of $Al_2O_3$ or $SiO_2$ is provided, and a recessed portion 13 is formed in the surface of the insulating film 12. The insulating film 12 is formed to have a thickness of about 5–10 μm. The recessed portion 13 is formed by, for instance an ion milling such that the recessed portion has desired configuration and depth, by means of which the apex angle and throat height can be precisely formed. For instance, an inclination angle of the recessed portion 13 can be controlled by adjusting etching conditions. In the surface of the substrate 1 in the vicinity of an air bearing surface which will be formed later, there is formed a groove 15. This groove 15 is clearly seen in FIG. 40 which is a cross sectional view cut along a line 40—40 in FIG. 39. According to this embodiment, a width of the writing pole of the inductive recording element is defined by a width of this groove 15. Furthermore, a groove 16 is formed in a surface of a projection or island 14 provided at a center of the recessed portion 13.

Next, as illustrated in FIGS. 41 and 42, a first magnetic film 21 is formed on an inner surface 131 of the recessed portion 13 and inner surfaces of the grooves 15 and 16. The first magnetic film 21 may be deposited by sputtering permalloy. A portion of the first magnetic film 21 formed in the groove 15 constitutes a pole portion 211 having a width $P_w$ which is precisely determined by a width of the groove 15. The first magnetic film 21 includes a pattern edge 210 between the pole portion 211 and a portion provided on the inner surface 131 of the recessed portion 13. This pattern edge 210 is utilized as a positional reference for the throat height TH and MR film.

In the present embodiment, the surface of the pole portion 211 within the groove 15 is etched to form a step having a height $g_1$ between the surface of the substrate 1 and the surface of the pole portion 211. This etching process may be carried out by a sputter etching with an argon plasma.

Next, as shown in FIG. 43, conductive coil turn layers 241 and 242 are formed within the recessed portion 13 such that the coil turns are supported and isolated by an insulating film 25. In this case, a surface level of the coil supporting and isolating insulating film 25 does not exceed a surface level of the pole portion 211 of the first magnetic film 21 by using, for instance the resist etch back method. In this manner, the surfaces of the coil supporting and isolating insulating film 25 and pole portion 211 of the first magnetic film 21 are co-planarized. The coil supporting and isolating insulating film 25 may be made of a photoresist and the coil turn layers 241 and 242 may be formed in a known manner. Upon the formation of the coil turn layers 241 and 242, a heating treatment is performed in order to obtain flat surfaces on which the coil turn layers are to be formed. Alternatively, the coil supporting and isolating insulating film 25 may be formed by the SOG method. The coil supporting and isolating insulating film 25 may be made of a silicon oxide film or a silicon nitride film deposited by CVD process.

During the heating process, the photoresist is softened or melt, but since the photoresist is supported by the recessed portion 13 formed in the surface of the substrate 1, the pattern of the finally formed coil supporting and isolating insulating film 25 is not varied, but is defined by the fixed pattern of the recessed portion 13. Further, even when the coil turn layers 241 and 242 are formed by using a patterning process such as milling, the pattern of the coil supporting and isolating insulating film 25 is not changed.

Next, as depicted in FIGS. 44 and 45, a gap film 22 having a uniform thickness is formed on the co-planar surfaces of the pole portion 211 of the first magnetic film 21 formed in the groove 15 and the coil supporting and isolating insulating film 25. The gap film 22 may be made of a non-magnetic material such as alumina, silicon oxide and silicon nitride. A thickness of the gap film 22 is 1000–2000 Å. It should be noted that the surface of a portion of the gap film 22 formed within the groove 15 is still lower than the surface of a portion of the gap film formed on the substrate except for the groove 15 by a distance $g_2$ which corresponds to the distance $g_1$.

Then, as shown in FIG. 46, a through hole 220 is formed in a portion of the gap film 22 formed in the groove 16 at the island 14 in the recessed portion 13.

Next, as illustrated in FIGS. 47 and 48, a second magnetic film 23 is formed on the gap film 22. Upon the formation of the second magnetic film 23, the space having a depth $g_2$ within the groove 15 is filled with the magnetic material to form a protrusion 231 which constitutes a pole portion of the second magnetic film 23. The pole portion 231 is opposed to the pole portion 211 of the first magnetic film 21 via the gap film 22, and the second magnetic film 23 also has a connecting portion 232 which is coupled with the first magnetic film 21 via the through hole 220. In this manner, according to the second aspect of the invention, a width of the pole portion 231 of the second magnetic film 23 is also defined by a width of the groove 15, and therefore it is possible to form the writing pole having a minimized width. Therefore, the surface recording density and high frequency property of the magnetic head can be improved.

Since the second magnetic film 23 is formed on the flat surface of the gap film 22, the second magnetic film can be formed to have a precise pattern by the photolithography. Furthermore, since the second magnetic film 23 has a sufficiently large thickness, the surface of the second magnetic film becomes flat.

Next, as shown in FIGS. 49 and 50, a first shield gap film 6 is formed on the flat surface of the second magnetic film 23, and then an MR film 3 is formed on the first shield gap film 6. The MR film 3 is formed to have a given pattern by the photolithography, while the pattern edge 210 of the pole portion 211 of the first magnetic film 21 is used as the positional reference. Since the pattern edge 210 serves also as the positional reference for the throat height TH of the inductive recording element 2, the inductive recording element 2 and MR element 3 can be positioned relative to each other by utilizing the pattern edge 210 as a common positional reference.

Then, as illustrated in FIGS. 51 and 52, a second shield gap film 7 is formed on the MR film 3 and first shield gap film 6. The first and second shield gap film 6 and 7 may be made of a non-magnetic insulating material such as alumina, and may have a thickness of 1000–2000 Å.

Next, as shown in FIGS. 53 and 54, a third magnetic film 4 is formed on a portion of the second shield gap film 7. The third magnetic film 4 may be made of permalloy. Then, the protection film 25 made of alumina is formed on the third magnetic film 4 and an exposed portion of the second shield gap film 7 as depicted in FIGS. 36–38.

Finally, the wafer is divided into a number of bars in which a plurality of magnetic heads are aligned, a side of a bar is polished to obtained the air bearing surface 10, and then the bar is divided into respective magnetic heads. Such processes are well known in the art, and thus their detailed explanations are dispensed with.

Also in the present embodiment, in order to mitigate the variation in property due to the stresses, the protection film 25 may be formed by a combination of silicon oxide and alumina films, a combination of silicon oxide and silicon nitride films, or a combination of an alumina film and a silicon oxide film highly doped with phosphor or boron.

FIGS. 55 and 56 are cross sectional views showing a second embodiment of the inverted hybrid type thin film magnetic head according to the second aspect of the present invention. In this embodiment, a surface level of the coil supporting and isolating insulating film 25 is lower than a surface level of the pole portion 211 of the first magnetic film 21 by a distance $d_1$ to form a step. An inorganic insulating film 100 is formed such that said step having the distance $d_1$ is filled therewith to have a flat surface. The remaining structure of the present embodiment is substantially similar to that of the embodiment shown in FIGS. 36–54. The inorganic insulating film 100 may be made of the same material as the gap film 22. Also in the present embodiment, the pattern edge 210 serving as the positional reference for the throat height and for the photomask alignment for patterning the MR film 3 can be seen much more clearly.

Now successive steps for manufacturing the magnetic head shown in FIGS. 55 and 56 will be explained with reference to FIGS. 57–71.

At first, as illustrated in FIGS. 57 and 58, on a main body 11 of a substrate 1 made of AlTiC is formed an insulating film 12 made of $Al_2O_3$ or $SiO_2$, and a recessed portion 13 is formed in the surface of the insulating film 12.

Figure 59:
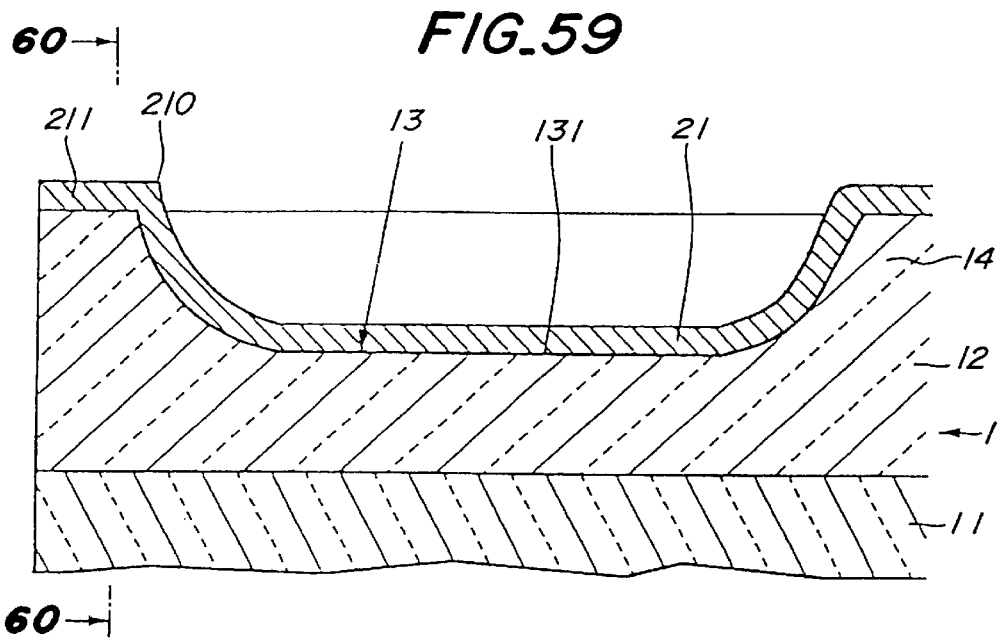
Figure 60:
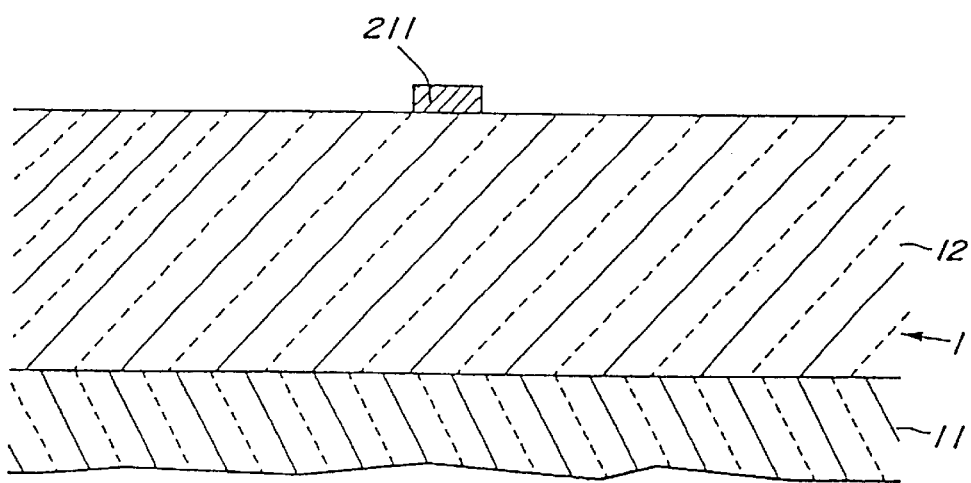

Next, as depicted in FIGS. 59 and 60, a first magnetic film 21 is formed on an inner surface 131 of the recessed portion 13 and on the surface of the substrate 1. A portion of the first magnetic film 21 formed on the surface of the substrate 1 constitutes a pole portion 211 which includes an pattern edge 210 at a position corresponding to an edge 132 of the recessed portion 13 (FIG. 57).

Then, as shown in FIG. 61, conductive coil turn layers 241 and 242 are formed within the recessed portion 13 such that they are supported and isolated by an insulating film 25. In the present embodiment, the coil supporting and isolating insulating film 25 is formed such that its surface level is lower than a surface level of the pole portion 211 of the first magnetic film 21 by a distance $d_1$.

Next, as illustrated in FIGS. 62 and 63, an inorganic insulating film 100 is formed on the coil supporting and isolating insulating film 25, pole portion 211 of the first magnetic film 21 and an exposed surface of the substrate 1. It should be noted that a thickness of the inorganic film 100 is larger than the distance $d_1$.

Next, as shown in FIGS. 64 and 65, the inorganic insulating film 100 is polished by the chemical-mechanical polishing to obtain a planar surfaces of the pole portion 211 and organic insulating film 100. By this planarizing process, the pattern edge 210 of the pole portion 211 of the first magnetic film 21 is further clarified.

Then, as depicted in FIGS. 66 and 67, the surface of the pole portion 211 is etched to form a step having a distance $g_1$ between the pole portion 211 and the surface of the inorganic insulating film 100. This etching process may be performed by the ion milling or sputter etching using argon plasma.

Next, as shown in FIGS. 68 and 69, a gap film 22 is formed on the organic insulating film 100 and pole portion 211 of the first magnetic film 21. The gap film 22 is formed along the step, and thus the surface of a portion of the gap film 22 formed on the pole portion 211 is lower than the surface of a portion of the gap film formed on the inorganic insulating film 100 by a distance $g_2$ corresponding to the distance $g_1$. In the gap film 22, there is also formed a through hole 220 at the island 14 in the recessed portion 13.

Next, as illustrated in FIGS. 70 and 71, a second magnetic film 23 is formed on the gap film 22. The groove having a depth $g_2$ is filled with the magnetic material to form a protrusion 231 which constitutes a pole portion of the second magnetic film 23. The pole portion 231 is opposed to the pole portion 211 of the first magnetic film 21 via the gap film 22, and the second magnetic film 23 also has a connecting portion 232 which is coupled with the first magnetic film 21 via the through hole 220. In this manner, according to the second aspect of the invention, a width of the pole portion 231 of the second magnetic film 23 is defined by a width of the pole portion 211 of the first magnetic film 21, and therefore it is possible to form the writing pole having a minimized width. Therefore, the surface recording density and high frequency property of the magnetic head can be improved.

Since the second magnetic film 23 is formed on the flat surface of the gap film 22, the second magnetic film can be formed to have a precise pattern by the photolithography.

Next, similar processes to those shown in FIGS. 49–54 are conducted to obtain the inverted hybrid type thin film magnetic film illustrated in FIGS. 55 and 56.

FIGS. 72–86 show successive steps of another embodiment of the method of manufacturing the inverted hybrid type thin film magnetic film shown in FIGS. 55 and 56.

As shown in FIGS. 72 and 73, a depressed portion 13 is formed in a surface of a substrate 1 by means of the previously explained process.

Then, as illustrated in FIGS. 74 and 75, after a first magnetic film 21 has been formed on an inner surface 131 of the recessed portion 13 and on a surface of the substrate 1, a metal film 200 is formed at least on a pole portion 211 of the first magnetic film 21, said metal film having a selective etching property with respect to the underlying first magnetic film 21. The metal film 200 may be made of Mo, Ti, TiN, Ta or Ni when the first magnetic film 21 is made of permalloy.

Next, as illustrated in FIG. 76, a thin film coil including coil turn layers 241, 242 and coil supporting and isolating insulating film 25 is formed within the recessed portion 13.

Next, as depicted in FIGS. 77 and 78, an inorganic film 100 is formed on the substrate 1, pole portion 211 of the first magnetic film 21 and metal film 200.

Then, as shown in FIGS. 79 and 80, the surface of the inorganic insulating film 100 is polished until the surface of the metal film 200 is exposed.

Next, as illustrated in FIGS. 81 and 82, the exposed metal film 200 is selectively etched away to expose the surface of the pole portion 211 of the first magnetic film 21. This selective etching may be performed by a dry etching using freon series gas when the first magnetic film 21 is made of permalloy and the metal film 200 is made of molybdenum. Then, as clearly shown in FIG. 82, a step having a distance $g_1$ is formed between the exposed surface of the pole portion 211 and the surface of the inorganic insulating film 100. Said distance $g_1$ corresponds to a thickness of the metal film 200.

Next, as shown in FIGS. 83 and 84, a gap film 22 is formed on the pole portion 211 of the first magnetic film 21 and the inorganic insulating film 100. The gap film 22 has a step having a distance $g_2$ corresponding to the distance $g_1$.

Then, as illustrated in FIGS. 85 and 86, a second magnetic film 23 is formed on the gap film 22. During the formation of the second magnetic film 23, a protrusion 231 is formed in said step. This protrusion 231 constitutes a pole portion of the second magnetic film 23. A connecting portion 232 of the second magnetic film 23 is connected to the first magnetic film 21 via a through hole 220 formed in the gap film 22.

After that, steps similar to those shown in FIGS. 49–54 are conducted to obtain the inverted hybrid type thin film magnetic film illustrated in FIGS. 55 and 56.

FIG. 87 is a cross sectional view showing a third embodiment of the thin film magnetic head according to the second aspect of the invention, and FIG. 88 is a cross sectional view cut along a line 88—88 in FIG. 87. The magnetic head of the present embodiment is also constituted as the inverted hybrid type thin film magnetic head.

In the present embodiment, the groove formed above the pole portion 211 of the first magnetic film 21 has inclined side walls and the gap film 22 and protrusion 231 constituting the pole portion of the second magnetic film 23 is formed in the thus tapered groove. Therefore, the writing pole of the inductive recording element 2 can be formed to have a minimized width.

Now a method of manufacturing the magnetic head illustrated in FIGS. 87 and 88 will be explained.

FIGS. 89–97 are cross sectional views showing successive steps of the method of manufacturing the magnetic head depicted in FIGS. 87 and 88.

In the present embodiment, a structure illustrated in FIGS. 89 and 90 is first formed by the same steps shown in FIGS. 57–65 of the previous embodiment. That is to say, the surface of the pole portion 211 of the first magnetic film 21 is etched to be lower that the surface of the inorganic insulating film 100 formed on the substrate 1. In this manner, the groove is formed to have a depth $g_1$.

Then, as shown in FIG. 91, side walls of the groove defined by the inorganic insulating film 100 are etched to form inclined side walls 101 and 102.

Next, as shown in FIGS. 92 and 93, the gap film 22 is formed on the pole portion 211 of the first magnetic film 21 and on the surface of the inorganic insulating film 100.

Then, as illustrated in FIGS. 94 and 95, the second magnetic film 23 is formed on the gap film 23. The protrusion 231 of the second magnetic film 23 constitutes the pole portion which is opposed to the pole portion 211 of the first magnetic film 21 via the gap film 22.

In this embodiment, the groove is defined by the upwardly opened side walls 101 and 102 of the inorganic insulating film 100, upon the formation of the gap film 22 and pole portion 231 of the second magnetic film 23, materials of these films can be effectively deposited within the groove. Therefore, the writing pole of the inductive recording element having a minimized width can be manufactured uniformly on a mass production scale.

Next, as depicted in FIGS. 96 and 97, the surface of the second magnetic film 23 is planarized by polishing. After that, the steps shown in FIGS. 49–54 are carried out to obtain the thin film magnetic head illustrated in FIGS. 87 and 88.

FIG. 98 is a cross sectional view showing a fourth embodiment of the thin film magnetic head according to the second aspect of the invention, and FIG. 99 is a cross sectional view cut along a line 99—99 in FIG. 98. In the present embodiment, the first magnetic film is formed by a plurality of magnetic films 233 and 234 having different saturation magnetic flux densities. At least one of said plurality of magnetic films is made of a magnetic material which has a higher saturation magnetic flux density than the remaining magnetic films. Preferably, the magnetic film having the highest saturation magnetic flux density (Hi-Bs material) is brought is contact with the gap film 22.

By constructing the second magnetic film as a multi-layer film, the magnetic flux can be constricted much more effectively to the minimized writing pole, and therefore the high frequency property and surface recording density can be further improved. When the magnetic film 234 is made of a usual permalloy, the magnetic film 233 may be made of permalloy of Ni-50% and Fe-50%. According to the invention, both the magnetic films 233 and 234 may be made of Hi-Bs magnetic material.

Now a method of manufacturing the magnetic head illustrated in FIGS. 98 and 99 will be explained with reference to FIGS. 100–108.

FIGS. 100 and 101 correspond to FIGS. 89 and 90, respectively of the previous embodiment. By etching the surface of the pole portion 211 of the first magnetic film 21, there is formed the groove having a depth of $g_1$ above the pole portion 211.

Next, as depicted in FIGS. 102 and 103, the gap film 22 is formed on the pole portion 211 and on the inorganic insulating film 100. It should be noted that above the pole portion 211, there is formed the groove having a depth $g_2$ corresponding to the depth $g_1$.

Then, as shown in FIGS. 104 and 105, a lower magnetic film 233 is formed on the gap film 22.

Next, as illustrated in FIGS. 106 and 107, the surface of the lower magnetic film 233 is etched until the gap film 22 on the insulating films 100 is exposed. In this manner, the lower magnetic film 233 is remained only within the groove. This etching may be conducted by an ion milling or sputter etching using argon plasma.

Next, as shown in FIG. 108, the upper magnetic film 234 is formed on the lower magnetic film 233 as well as the inorganic insulating film 100. In this manner, the second magnetic film consisting of the lower and upper magnetic films 233 and 234 can be obtained. It should be noted that the lower magnetic film 233 constitutes the pole portion of the second magnetic film, and thus the second magnetic film 233, 234 has a T-shaped cross section at the pole portion. Furthermore, also in this embodiment, the upper magnetic film 234 has the flat surface, which facilitates the precise formation of the MR element.

Succeeding steps are similar to those shown in FIGS. 49–54, and finally the basic structure of the inverted hybrid type thin film magnetic head illustrated in FIGS. 98 and 99 can be obtained.

FIG. 109 is a cross sectional view showing a fifth embodiment of the thin film magnetic head according to the second aspect of the invention. In this embodiment, the recessed portion 13 is formed in the surface of the main body 11 of the substrate 1, and then the insulating film 12 is formed on the inner surface 131 of the recessed portion 13 as well as on the surface of the main body 11. The remaining structure of the present embodiment is identical with that of the previous embodiment shown in FIGS. 55 and 56. In this embodiment, a thickness of the insulating film 12 may be very small, and therefore the heat dissipation property can be improved.

Figure 113:
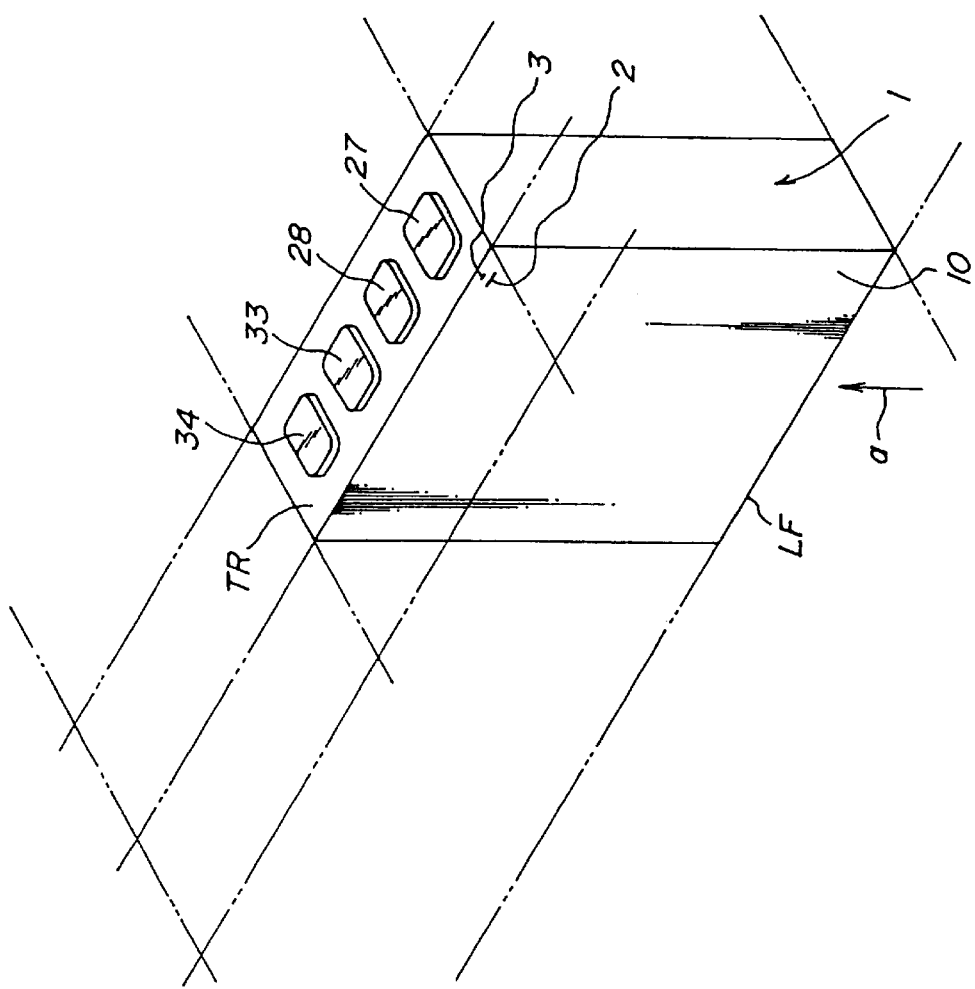
FIG. 113 is a perspective view showing the whole magnetic head of the present embodiment.

FIG. 110 is a cross sectional view showing an embodiment of the inverted hybrid type thin film magnetic head according to the third aspect of the present invention, FIG. 111 is a cross sectional view illustrating a part of the magnetic head shown in FIG. 110 on an enlarged scale and FIG. 112 is a cross sectional view cut along a line 112—112 in FIG. 111. FIG. 113 is a perspective view showing the magnetic head, and FIG. 114 is a plan view representing a position of a bonding pad relative to the thin film coil.

In the present embodiment, the structure of the inductive recording element 2 and magnetoresistive reading element is identical with that of the first embodiment of the thin film magnetic head according to the first aspect of the invention shown in FIGS. 1–3. In the present embodiment, on the third magnetic film 4 and second shield gap film 7, is provided a first protection film 261 made of, for instance alumina. On this first protection film 261, there is provided a bonding pad 27 at a portion substantially above the coil turn layers 241 and 242 of the thin film coil, said bonding pad consisting of an underlying metal layer 271 applied on the first protection film 261 and a metal film 272 applied on the underlying metal layer 272. As shown in FIG. 110, the underlying metal layer 271 is connected to a conductive plug 270 which is connected to one end of the thin film coil.

As illustrated in FIG. 113, the substrate 1 constitutes a slider having the air bearing surface 10 on which a tip of the writing pole of the inductive recording element 2 and a tip of the reading MR element 3 are exposed. In the present embodiment, the air bearing surface 10 is formed to be flat, but according to the invention, the air bearing surface may have any desired geometric configurations. The slider 1 is cut out of a wafer and the bearing air flows in a direction of a thickness of the wafer as indicated by an arrow a from a leading side wall LE to a trailing side wall TR. The above mentioned bonding pad 27 is provided on the trailing side wall TR of the slider 1. On this trailing side wall TR of the slider 1, there are further provided bonding pads 28, 33 and 34. As stated above, the bonding pad 27 is connected to the one end of the thin film coil and the bonding pad 28 is connected to the other end of the thin film coil. The bonding pads are connected to respective ends of the MR element 3.

Figure 114:
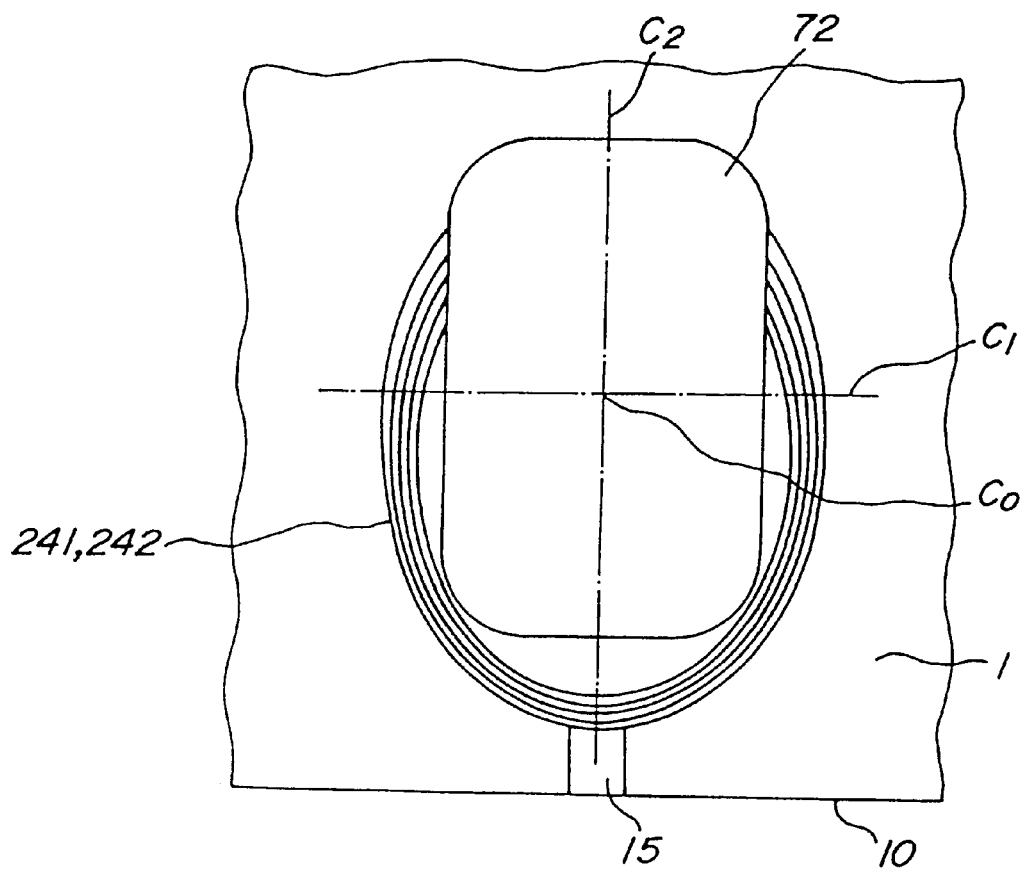
FIG. 114 is a plan view depicting a positional relation of the bonding pad with respect to the thin film coil.

According to the third aspect of the invention, the bonding pad 27 is provided above the thin film coil such that a center $C_0$ of the bonding pad 27 situates within the thin film coil as shown in FIG. 114, said center $C_0$ being defined by a crossing point of horizontal and vertical bisecting lines $C_1$ and $C_2$. In FIG. 114, in addition to the thin film coil 241, 242, the recessed portion 13 and groove 15 are also shown. In this manner, a surface area of the trailing side wall TR of the slider 1 can be utilized efficiently and can be reduced. Therefore, the slider 1 can be minimized, and thus a floating posture of the slider 1 can be stabilized, the number of thin film magnetic heads which can be manufactured from a single wafer can be increased, and the magnetic disk device using the magnetic head can be minimized. Since the hybrid type thin film magnetic head, the number of bonding pads requires a relatively large number of bonding pads, the provision of the bonding pad above the thin film coil is particularly advantageous.

Now a method of manufacturing the inverted hybrid type thin film magnetic head of the present embodiment will be explained with reference to FIGS. 115–119.

As stated above, the basic structure of the inductive recording element 2 and MR element 3 is identical with that of the embodiment shown in FIGS. 1–3, and therefore after carrying out the steps illustrated in FIGS. 4–19, the first protection film 261 is provided on the third magnetic film 4 and on the exposed surface of the second shield gap film 7 as depicted in FIGS. 115 and 116. The first protection film 261 may be formed by an alumina film, a combination of a silicon oxide film and an alumina film, a combination of a silicon oxide film and a silicon nitride film or a combination of an alumina film and a silicon oxide film doped with a large amount of phosphorus or boron.

Next, as illustrated in FIG. 117, on the flat surface of the first protection film 261, is provided the underlying metal layer 271 at a portion substantially above the thin film coil 241, 242. The underlying metal layer 271 may be deposited by any known method.

Then, as depicted in FIG. 118, a second protection film 262 is provided on the exposed surface of the first protection film 261 in the vicinity of the air bearing surface 10 and on a part of the underlying metal layer 271 except for a bonding pad forming region 260.

Next, as shown in FIG. 119, the metal film 272 is provided on the underlying metal layer 271 within the region 260 to form the bonding pad 27. The bonding pad 272 is formed by plating any suitable conductive metal such as aluminum and copper. It should be noted that when the bonding pad 27 is formed, the remaining bonding pads 28, 33 and 34 are also formed.

FIGS. 120 is a perspective view showing a slider of a first embodiment of the inverted hybrid type thin film magnetic head according to the fourth aspect of the invention, FIG. 121 is a cross sectional view, FIG. 122 is a cross sectional view cut along a line 122—122 in FIG. 121, and FIG. 124 is a plan view illustrating the positional relationship between the thin film coil and the bonding pad. The basic structure of the inductive recording element 2 and MR element 3 is identical with the embodiment illustrated in FIGS. 36–38. That is to say, the thin film coil 241, 242 are formed within the recessed portion 13 formed in the substrate 1, the first magnetic film 21 is provided on the inner surface 131 of the recessed portion 13 and has the pole portion 211 formed within the groove 15 formed in the substrate 1, the gap film 22 is formed on the co-planar surfaces of the pole portion 211 of the first magnetic film 21 and the coil supporting and isolating insulating film 25, the second magnetic film 23 is formed on the gap film 22 and has the pole portion 231 which is opposed to the pole portion 211 of the first magnetic film 21 via the gap film 22, the MR element 3 is formed on the third magnetic film 23 via the first shield gap film 6, and the third magnetic film 4 is formed on the second shield gap film 7. In the present embodiment, the first protection film 261 is formed on the third magnetic film 4 as well as on the second shield gap film 7, the underlying metal layer 271 is provided on the first protection film 261, the second protection film 262 is provided on the first protection film 261 except for the metal film 272 constituting the bonding pad 27 above the thin film coil 241, 242 as best shown in FIG. 124. The bonding pad 27 is connected to one end of the thin film coil.

As shown in FIG. 120, in the present embodiment, the air bearing surface 10 is formed by a pair of rails $R_1$ and $R_2$, which extend in the direction a of the bearing air flow. The inductive recording element 2 and MR element 3 are formed on a side of a trailing edge TR of the beating air flow, which is opposite to a leading edge LE from which the bearing air flow is taken into the space between the air bearing surface 10 and the magnetic record disk. The rails $R_1$ and $R_2$ are formed to have tapered ends on a side of the leading edge LE. Typically, the slider has a thickness smaller than 0.65 mm, a width of 1–2.5 mm, and a length of 1–3 mm, and the rail has a width of 0.3. Then, the slider can float stably above a magnetic disk with a very small air gap in the order of 0.1 μm.

The basic structure of the inductive recording element 2 and MR reading element 3 of the inverted hybrid type thin film magnetic head of the present embodiment may be manufactured by the steps illustrated in FIGS. 39–54. Then, the steps shown in FIGS. 115–119 are performed to form the bonding pad structure.

FIGS. 125 and 126 are cross sectional views showing a second embodiment of the inverted hybrid type thin film magnetic head according to the fourth aspect of the invention. The basic structure of the inductive recording element 2 and MR element 3 is identical with the embodiment illustrated in FIGS. 55 and 56. The thin film coil 241, 242 are formed within the recessed portion 13 formed in the substrate 1, the first magnetic film 21 is provided on the inner surface 131 of the recessed portion 13 and has the pole portion 211 formed on the substrate 1, the gap film 22 is formed on the inner surface of the groove defined by the pole portion 211 of the first magnetic film 21 and inorganic insulating film 100, the second magnetic film 23 is formed on the gap film 22 and has the pole portion 231 constructed by the protrusion extending from the lower surface of the second magnetic film 23 into the groove, the MR element 3 is formed on the third magnetic film 23 via the first shield gap film 6, and the third magnetic film 4 is formed on the second shield gap film 7. Also in the present embodiment, the first protection film 261 is formed on the third magnetic film 4 and second shield gap film 7, the underlying metal layer 271 is provided on the first protection film 261, the second protection film 262 is provided on the first protection film 261 except for the metal film 272 constituting the bonding pad 27 above the thin film coil 241, 242. The bonding pad 27 is connected to one end of the thin film coil.

The inverted hybrid type thin film magnetic head illustrated in FIGS. 125 and 126 may be formed by conducting the steps shown in FIGS. 57–71 and steps illustrated in FIGS. 115–119 successively or by performing the steps shown in FIGS. 72–86 and FIGS. 115–119.

FIGS. 127 and 128 are cross sectional views depicting a third embodiment of the inverted hybrid type thin film magnetic head according to the fourth aspect of the present invention. The basic structure of the inductive recording element 2 and MR element 3 is identical with the embodiment illustrated in FIGS. 87 and 88. In this embodiment, the groove defined by the pole portion 211 of the first magnetic film 21 and inorganic insulating film 100 has the tapered side walls, and the gap film 22 and protrusion 231 of the second magnetic film 23 are formed in such a groove. The remaining structure is same as that of the embodiment shown in FIGS. 125 and 126. Also in the present embodiment, the bonding pad 27 is formed in the pattern of the thin film coil 241, 242.

The inverted hybrid type thin film magnetic head illustrated in FIGS. 127 and 128 may be formed through the steps shown in FIGS. 89–97 and steps illustrated in FIGS. 115–119.

FIGS. 127 and 128 are cross sectional views depicting a third embodiment of the inverted hybrid type thin film magnetic head according to the fourth aspect of the present invention. The basic structure of the inductive recording element 2 and MR element 3 is identical with the embodiment illustrated in FIGS. 87 and 88. In this embodiment, the groove defined by the pole portion 211 of the first magnetic film 21 and inorganic insulating film 100 has the tapered side walls, and the gap film 22 and protrusion 231 of the second magnetic film 23 are formed in such a groove. The remaining structure is same as that of the embodiment shown in FIGS. 125 and 126. Also in the present embodiment, the bonding pad 27 is formed in the pattern of the thin film coil 241, 242.

The inverted hybrid type thin film magnetic head illustrated in FIGS. 127 and 128 may be formed through the steps shown in FIGS. 89–97 and steps illustrated in FIGS. 115–119.

FIGS. 127 and 128 are cross sectional views depicting a third embodiment of the inverted hybrid type thin film magnetic head according to the fourth aspect of the present invention. The basic structure of the inductive recording element 2 and MR element 3 is identical with the embodiment illustrated in FIGS. 87 and 88. In this embodiment, the groove defined by the pole portion 211 of the first magnetic film 21 and inorganic insulating film 100 has the tapered side walls, and the gap film 22 and protrusion 231 of the second magnetic film 23 are formed in such a groove. The remaining structure is same as that of the embodiment shown in FIGS. 125 and 126. Also in the present embodiment, the bonding pad 27 is formed in the pattern of the thin film coil 241, 242.

The inverted hybrid type thin film magnetic head illustrated in FIGS. 127 and 128 may be formed through the steps shown in FIGS. 89–97 and steps illustrated in FIGS. 115–119.

FIGS. 127 and 128 are cross sectional views depicting a third embodiment of the inverted hybrid type thin film magnetic head according to the fourth aspect of the present invention. The basic structure of the inductive recording element 2 and MR element 3 is identical with the embodiment illustrated in FIGS. 87 and 88. In this embodiment, the groove defined by the pole portion 211 of the first magnetic film 21 and inorganic insulating film 100 has the tapered side walls, and the gap film 22 and protrusion 231 of the second magnetic film 23 are formed in such a groove. The remaining structure is same as that of the embodiment shown in FIGS. 125 and 126. Also in the present embodiment, the bonding pad 27 is formed in the pattern of the thin film coil 241, 242.

The inverted hybrid type thin film magnetic head illustrated in FIGS. 127 and 128 may be formed through the steps shown in FIGS. 89–97 and steps illustrated in FIGS. 115–119.

FIGS. 129 and 130 are cross sectional views depicting a fourth embodiment of the inverted hybrid type thin film magnetic head according to the fourth aspect of the present invention. The basic structure of the inductive recording element 2 and MR element 3 is identical with the embodiment shown in FIGS. 98 and 99. The pole portion of the second magnetic film 23 is formed by the lower magnetic film 233 formed within the groove and the upper magnetic film 234 formed on the lower magnetic film 233 and the gap film 22. The remaining structure is same as that of the embodiment shown in FIGS. 125 and 126. Also in the present embodiment, the bonding pad 27 is formed in the pattern of the thin film coil 241, 242.

The inverted hybrid type thin film magnetic head illustrated in FIGS. 129 and 130 may be formed by conducting the steps shown in FIGS. 100–108 followed by the steps illustrated in FIGS. 115–119.

FIG. 131 is a cross sectional view depicting a fifth embodiment of the inverted hybrid thin film magnetic head according to the fourth aspect of the invention. The basic structure of the inductive recording element 2 and MR element 3 is identical with the embodiment shown in FIG. 35. In the this embodiment, the recessed portion 13 is formed in the surface of the main body 11 of the substrate 1, and the insulating film 12 is formed on the inner surface 131 of the recessed portion 13 as well as on the surface of the main body 11. Then, the first magnetic film 21 is provided on the surface of the insulating film 12.

What is claimed is:

1. An inverted hybrid thin film magnetic head comprising:

a substrate made of a non-magnetic insulating material and having a surface in which a recessed portion is formed, a groove being formed in the substrate such that the groove extends from the recessed portion to an air bearing surface;

an inductive recording element formed to be supported by said substrate; and a magnetoresistive reading element formed to be supported by said inductive recording element;

wherein said inductive recording element includes:
a first magnetic film having a portion formed on an inner surface of said recessed portion and a pole portion formed within said groove to extend from said portion formed on the inner surface of the recessed portion up to the air bearing surface;

a thin film coil formed within said recessed portion and having a plurality of conductive coil turns;

an insulating film formed within said recessed portion such that said conductive turns of the thin film coil are supported and isolated by said insulating film;

a gap film made of a non-magnetic material and including a portion formed within said groove on said pole portion of the first magnetic film; and a second magnetic film formed on said gap film and having a pole portion which is within said groove opposed to said pole portion of the first magnetic film via said portion of the gap film formed within the groove and a portion which is magnetically coupled with said first magnetic film at a position remote from said pole portion; and said magnetoresistive reading element includes:

a first shield gap film made of a non-magnetic insulating material and formed on said second magnetic film;

a magnetoresistive film formed on said first shield gap film such that a side edge of the magnetoresistive film is exposed on said air bearing surface;

a second shield gap film made of a non-magnetic insulating material and formed on the magnetoresistive film and first shield gap film; and a third magnetic film formed on said second shield gap film.

2. The magnetic head according to claim 1, wherein said insulating film is embedded within the recessed portion to have a co-planar surface with said pole portion of the first magnetic film, and said gap film is formed on the co-planar surfaces of the pole portion of the first magnetic film and of the coil supporting and isolating insulating film.

3. The magnetic head according to claim 1, wherein said coil supporting and isolating insulating film is embedded within the recessed portion to have a surface which is closer to said substrate than the surface of said pole portion on which said gap film is provided, an inorganic insulating film is provided on said surface of the coil supporting and isolating insulating film to have a co-planar surface with said pole portion of the first magnetic film.

4. The magnetic head according to claim 3, wherein said inorganic insulating film has a thickness which is equal to a thickness of said pole portion of the first magnetic film.

5. The magnetic head according to claim 1, wherein said thin film coil comprises a stack of a plurality of coil turn layers provided within said recessed portion.

6. The magnetic head according to claim 1, wherein said magnetoresistive film of the magnetoresistive element is formed by one of an anisotropic magnetoresistive film, a giant magnetoresistive film and a ferromagnetic tunnel junction film.

7. The magnetic head according to claim 1, wherein said substrate comprises a main body and an insulating film formed on said main body, and said recessed portion is formed in the insulating film.

8. The magnetic head according to claim 1, wherein said substrate comprises a main body having a depressed portion formed in a surface and an insulating film formed on said surface of the main body and an inner surface of said depressed portion to form said recessed portion.

9. A thin film magnetic head comprising:

a substrate having a surface in which a recessed portion is formed, a groove being formed in the substrate, said groove extending from said recessed portion to an air bearing surface; and an inductive recording element formed on said surface of the substrate;

wherein said inductive recording element includes:

a first magnetic film formed within said groove and having a pole portion extending from the air bearing surface, said pole portion of the first magnetic film being provided within said groove;

a thin film coil having a plurality of conductive coil turns each of which includes a portion formed on said first magnetic film;

an insulating film formed to isolate said conductive coil turns of the thin film coil from each other;

a gap film made of a non-magnetic material and having a pole portion formed within said groove and opposed to said pole portion of the first magnetic film; and a second magnetic film having a pole portion which is within said groove opposed to said pole portion of the first magnetic film via said pole portion of the gap film formed within the groove and a portion which is magnetically coupled with said first magnetic film at a position remote from said pole portion, said pole portion of the second magnetic film comprising a protrusion which is formed in a surface of the second magnetic film contacted with said gap film and protrudes toward said pole portion of the first magnetic film.

10. The magnetic head according to claim 9, wherein at least one of said pole portions of the first and second magnetic film is formed by a stack of a plurality of magnetic layers having different saturation magnetic flux densities.

11. The magnetic head according to claim 10, wherein a magnetic layer having the highest saturation magnetic flux density is arranged adjacent to said gap film.

12. The magnetic head according to claim 9, wherein, said first magnetic film has the pole portion formed on the surface of the substrate and a portion formed on an inner surface of the recessed portion, said thin film coil is formed within the recessed portion, and said gap film is provided on the surfaces of the pole portion of the first magnetic film and the insulating film.

13. The magnetic head according to claim 9, wherein said insulating film is embedded within the recessed portion to have a surface which is closer to said substrate than the surface of said pole portion on which said gap film is provided, an inorganic insulating film is provided on said surface of the insulating film to have a co-planar surface with said pole portion of the first magnetic film.

14. The magnetic head according to claim 13, wherein said inorganic insulating film has a thickness which is equal to a thickness of said pole portion of the first magnetic film.

15. The magnetic head according to claim 9, wherein said thin film coil comprises a stack of a plurality of coil turn layers provided within said recessed portion.

16. The magnetic head according to claim 9, wherein said magnetic head further comprises a magnetoresistive element which includes:

a first shield gap film made of a non-magnetic insulating material and formed on said second magnetic film;

a magnetoresistive film formed on said first shield gap film such that a side edge of the magnetoresistive film is exposed on said air bearing surface;

a second shield gap film made of a non-magnetic insulating material and formed on the magnetoresistive film and first shield gap film; and a third magnetic film formed on said second shield gap film.

17. The method according to claim 16, wherein said magnetoresistive film is formed by one of an anisotropic magnetoresistive film, a giant magnetoresistive film and a ferromagnetic tunnel junction film.

18. The magnetic head according to claim 9, wherein said substrate comprises a main body having a surface and an insulating film formed on said surface of the main body and having a surface, and said recessed portion is formed in said surface of the insulating film.

19. The magnetic head according to claim 9, wherein said substrate comprises a main body having a depressed portion formed in a surface and an insulating film formed on said surface of the main body and an inner surface of said depressed portion to form said recessed portion.

* * * * *